(12) United States Patent
Gray et al.

(10) Patent No.: US 9,727,427 B2
(45) Date of Patent: Aug. 8, 2017

(54) SYNCHRONIZING STORAGE OF DATA COPIES IN A DISPERSED STORAGE NETWORK

(71) Applicant: CLEVERSAFE, INC., Chicago, IL (US)

(72) Inventors: Adam Michael Gray, Chicago, IL (US); Greg Dhuse, Chicago, IL (US); Andrew Baptist, Mt. Pleasant, WI (US); Ravi Khadiwala, Bartlett, IL (US); Wesley Leggette, Chicago, IL (US); Scott Michael Horan, Clarendon Hills, IL (US); Franco Vincent Borich, Naperville, IL (US); Bart Cilfone, Chicago, IL (US); Daniel Scholl, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 74 days.

(21) Appl. No.: 14/927,446

(22) Filed: Oct. 29, 2015

(65) Prior Publication Data
US 2016/0188218 A1    Jun. 30, 2016

Related U.S. Application Data

(60) Provisional application No. 62/098,449, filed on Dec. 31, 2014.

(51) Int. Cl.
*G06F 12/00* (2006.01)
*G06F 11/20* (2006.01)
(Continued)

(52) U.S. Cl.
CPC .......... *G06F 11/20* (2013.01); *G06F 11/1092* (2013.01); *H04L 67/1097* (2013.01); *G06F 2211/1028* (2013.01)

(58) Field of Classification Search
CPC ............ H04L 67/1097; G06F 11/1092; G06F 11/1028
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Mark Giardino, Jr.
(74) *Attorney, Agent, or Firm* — Garlick & Markison; Timothy W. Markison

(57) ABSTRACT

A method begins with storage units receiving a request to transfer a copy of a set of encoded data slices from two or more source virtual storage vaults to a destination virtual storage vault. The method continues with each storage unit obtaining a slice transfer map and determining whether the storage unit supports one of the two or more source virtual storage vaults. For each supporting storage unit, the method continues with each supporting storage unit determining, based on the slice transfer map, a sub-set of encoded data slices of the set of encoded data slices that is stored within the one of the two or more source virtual storage vaults by the supporting storage unit. The method continues with the supporting storage unit sending the sub-set of encoded data slices to a corresponding storage unit that is supporting the destination virtual storage vault.

18 Claims, 54 Drawing Sheets

(51) Int. Cl.
H04L 29/08 (2006.01)
G06F 11/10 (2006.01)
G06F 13/00 (2006.01)
G06F 13/28 (2006.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,341,626 | B1 * | 12/2012 | Gardner ............... G06F 9/4856 718/1 |
| 8,832,683 | B2 * | 9/2014 | Heim ............... G06F 9/45558 718/1 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2012/0137091 | A1 * | 5/2012 | Grube ............... G06F 12/0638 711/158 |
| 2014/0223435 | A1 * | 8/2014 | Chang ............... G06F 9/45533 718/1 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed computing system 10

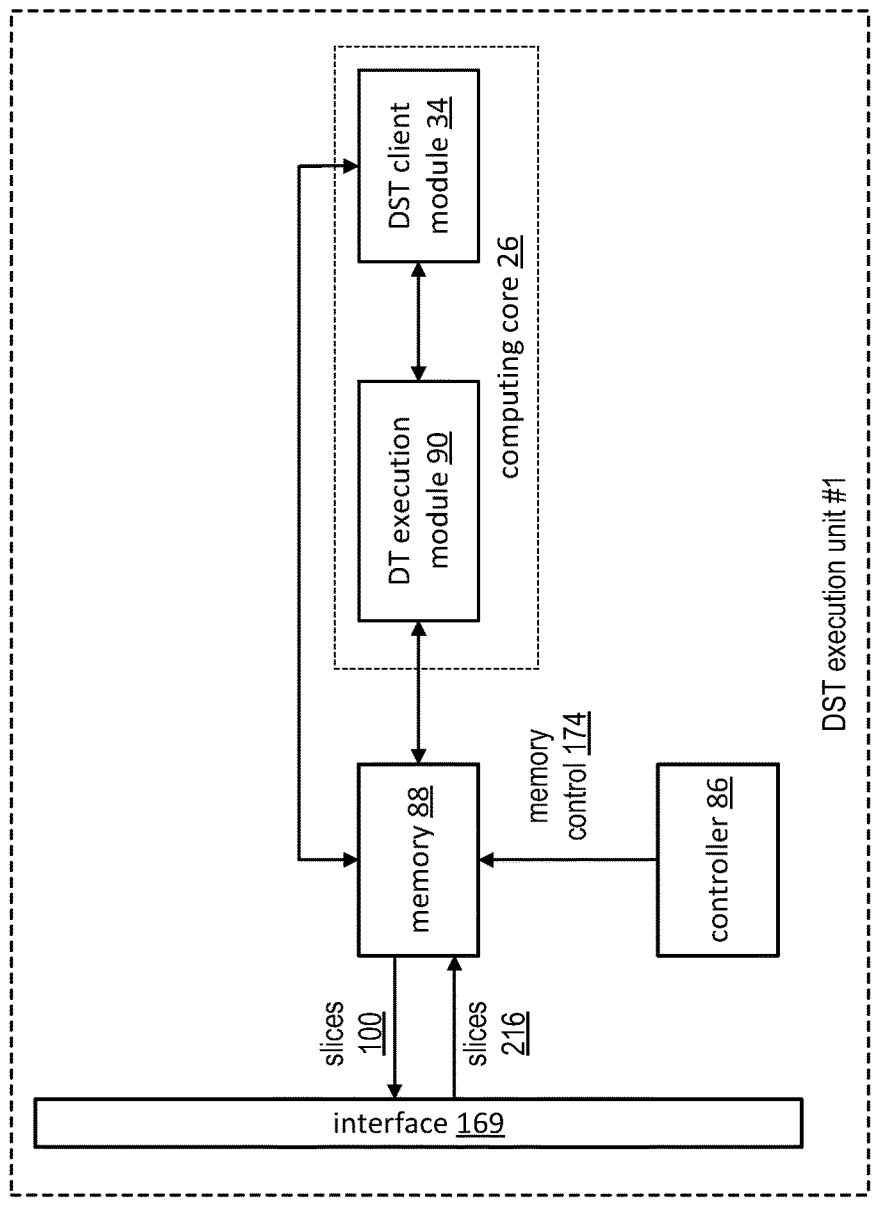
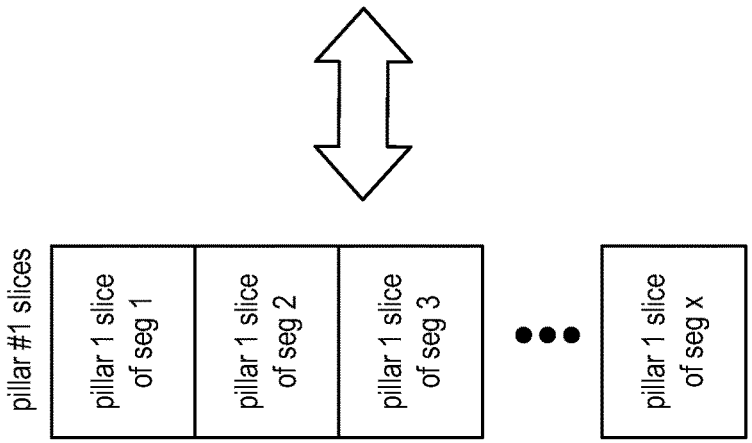
FIG. 24

DST allocation info 242 | data partition info 320: data ID; No. of partitions; Addr. info for each partition; format conversion indication

| task 326 | task ordering 328 | task execution info 322 |  | Name 334 | intermediate result info 324 |  |  |
|---|---|---|---|---|---|---|---|
| | | data partition 330 | set of DT EX mods 332 | | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

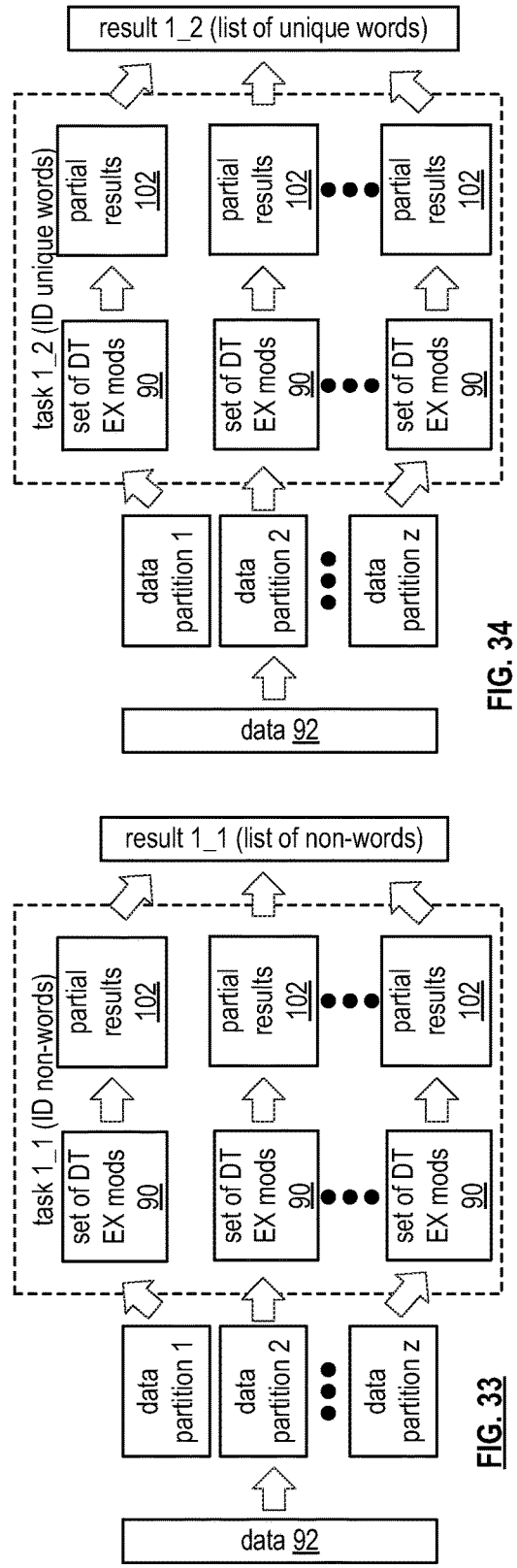
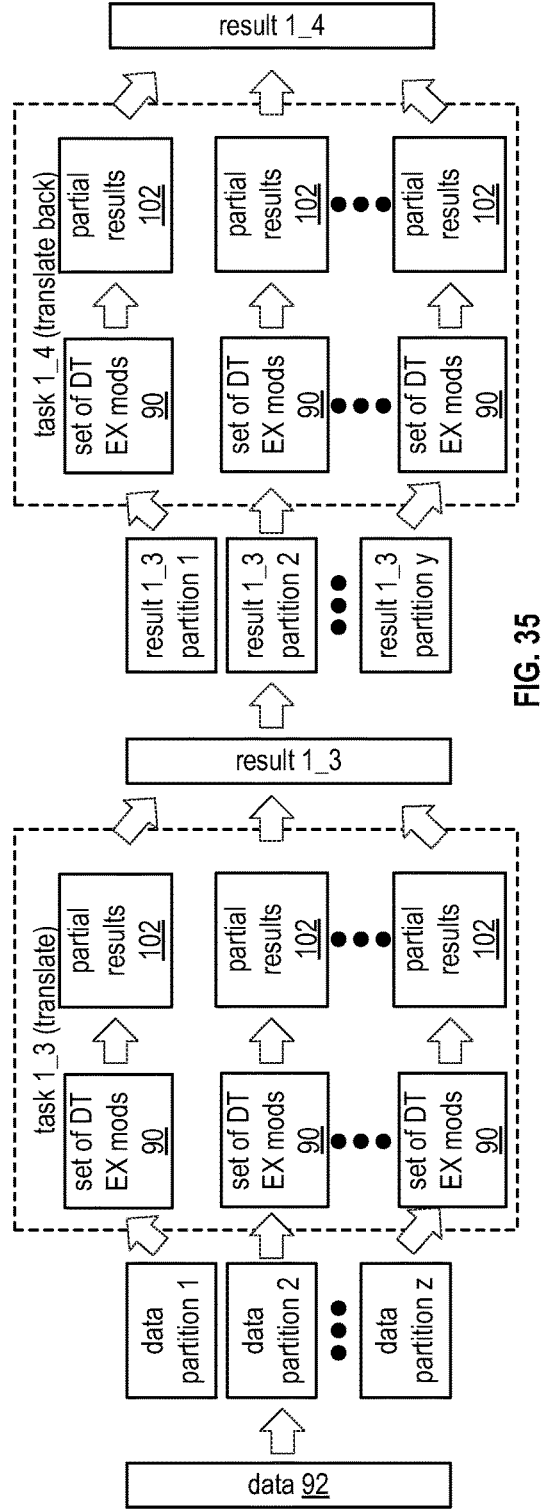
FIG. 33
FIG. 34
FIG. 35

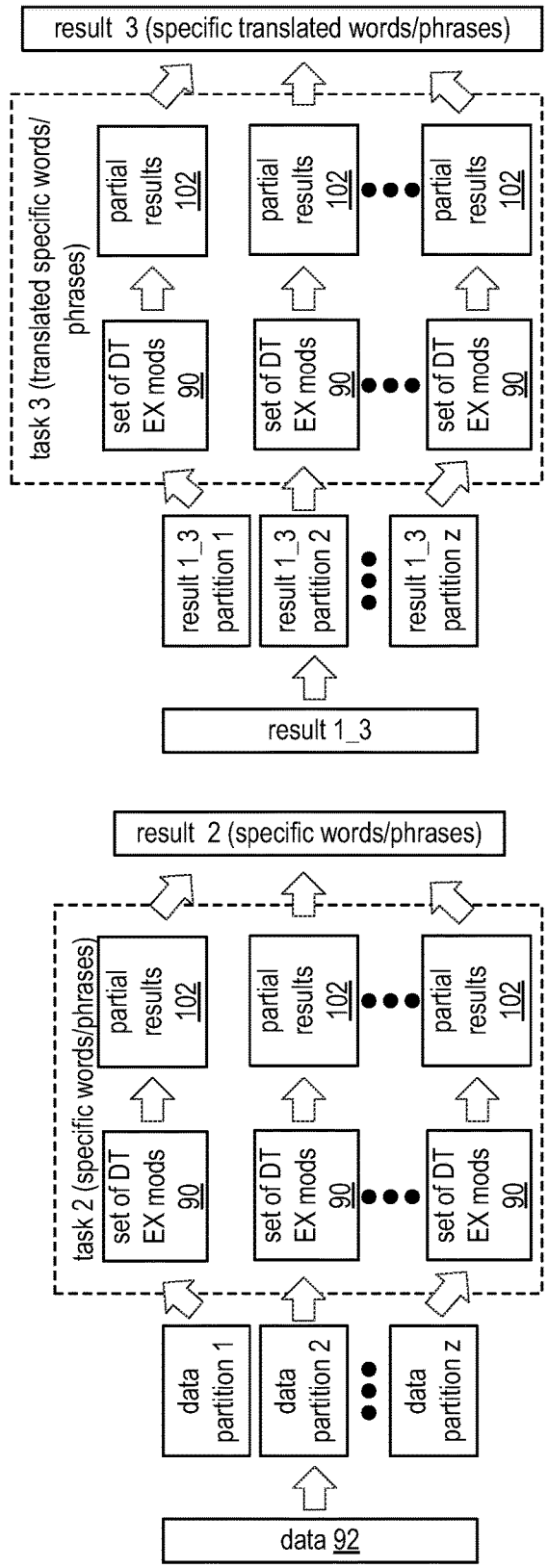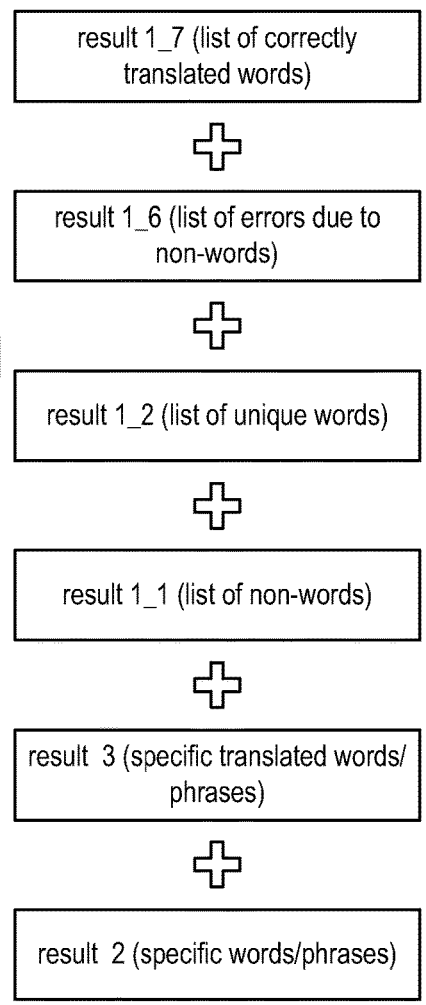

SYNCHRONIZING STORAGE OF DATA COPIES IN A DISPERSED STORAGE NETWORK

CROSS REFERENCE TO RELATED PATENTS

The present U.S. Utility patent application claims priority pursuant to 35 U.S.C. §119(e) to U.S. Provisional Application No. 62/098,449, entitled "SYNCHRONOUSLY STORING DATA IN A PLURALITY OF DISPERSED STORAGE NETWORKS," filed Dec. 31, 2014, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 42A:
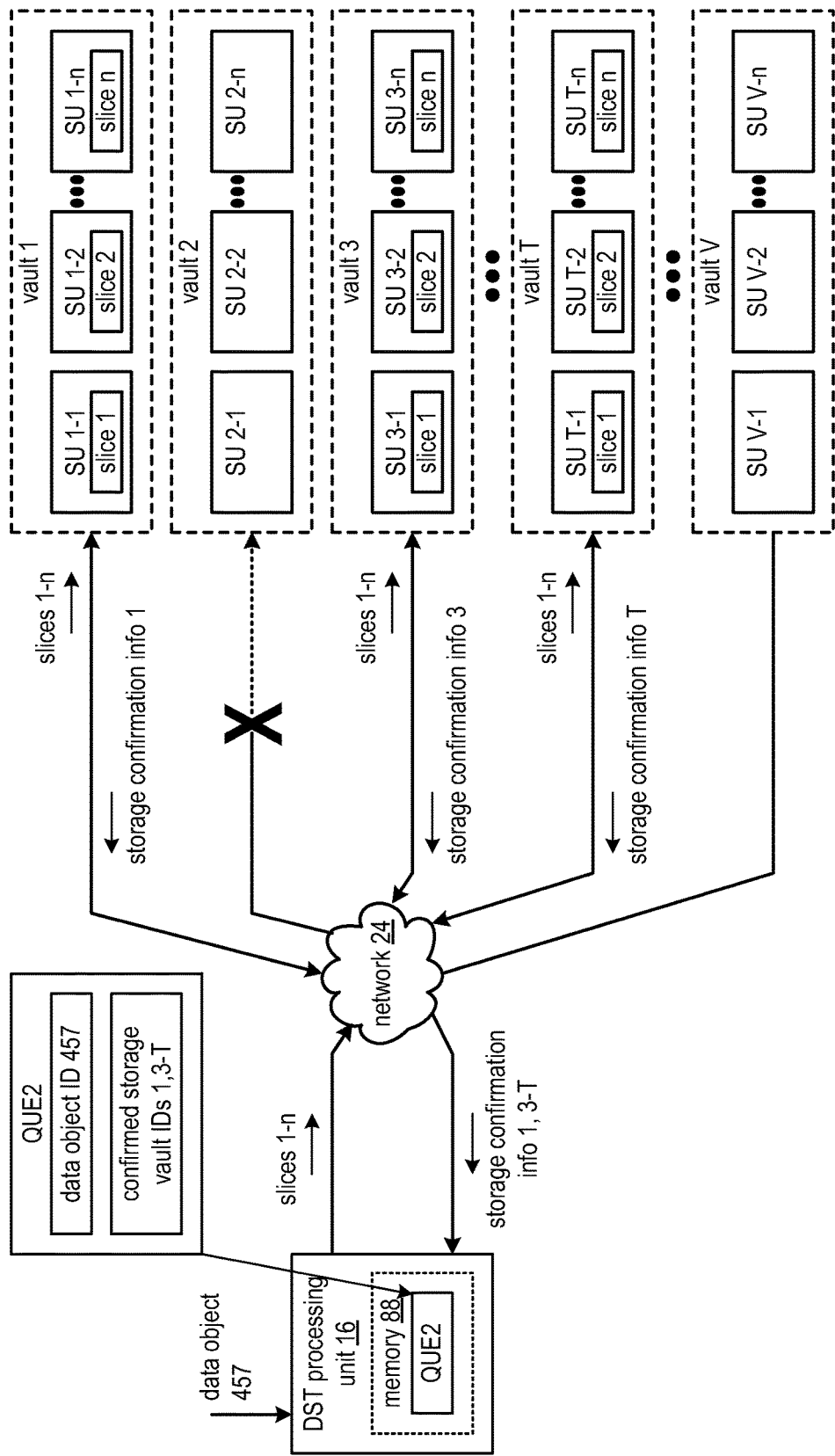
Figure 42B:
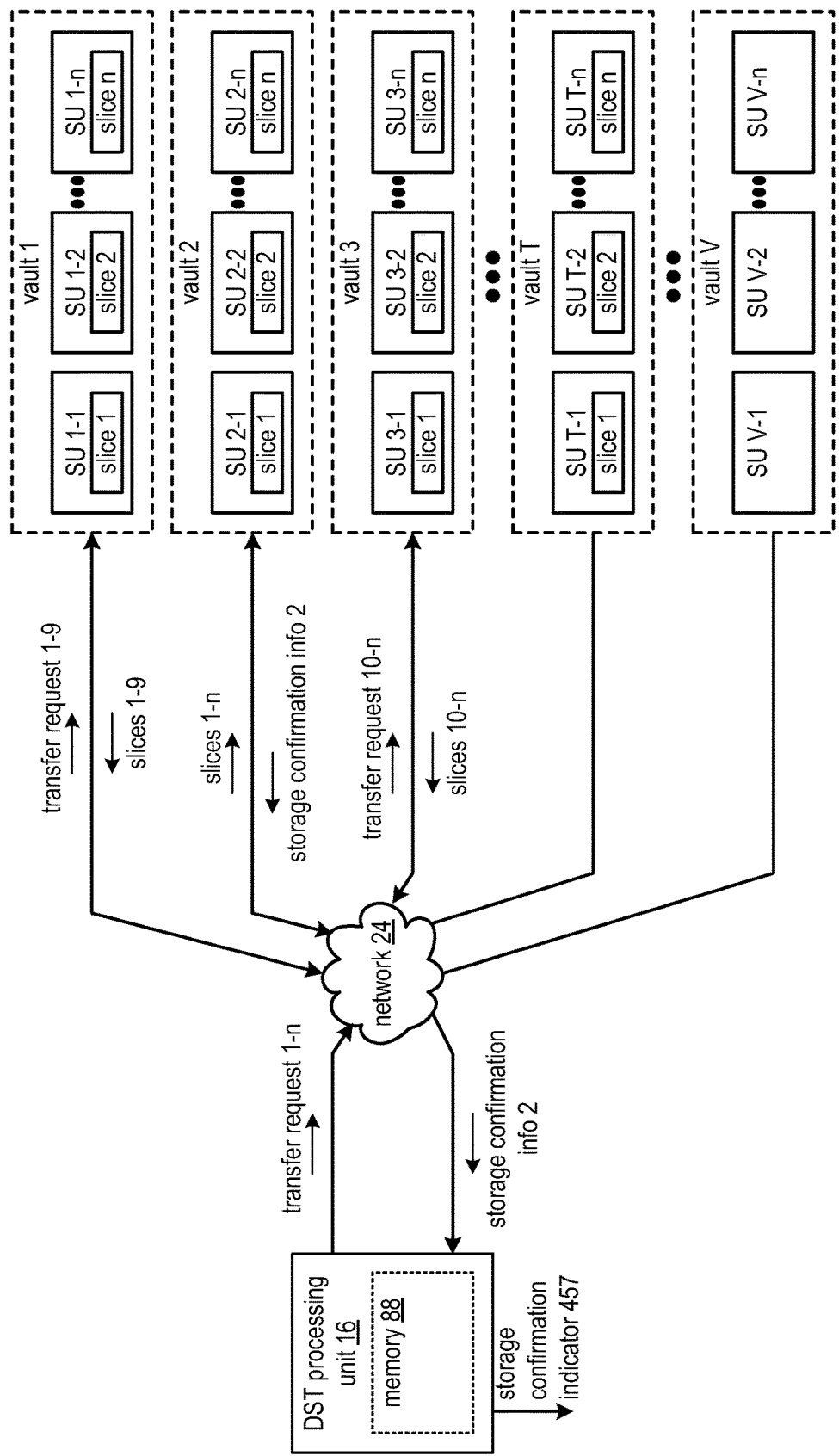
Figure 42C:
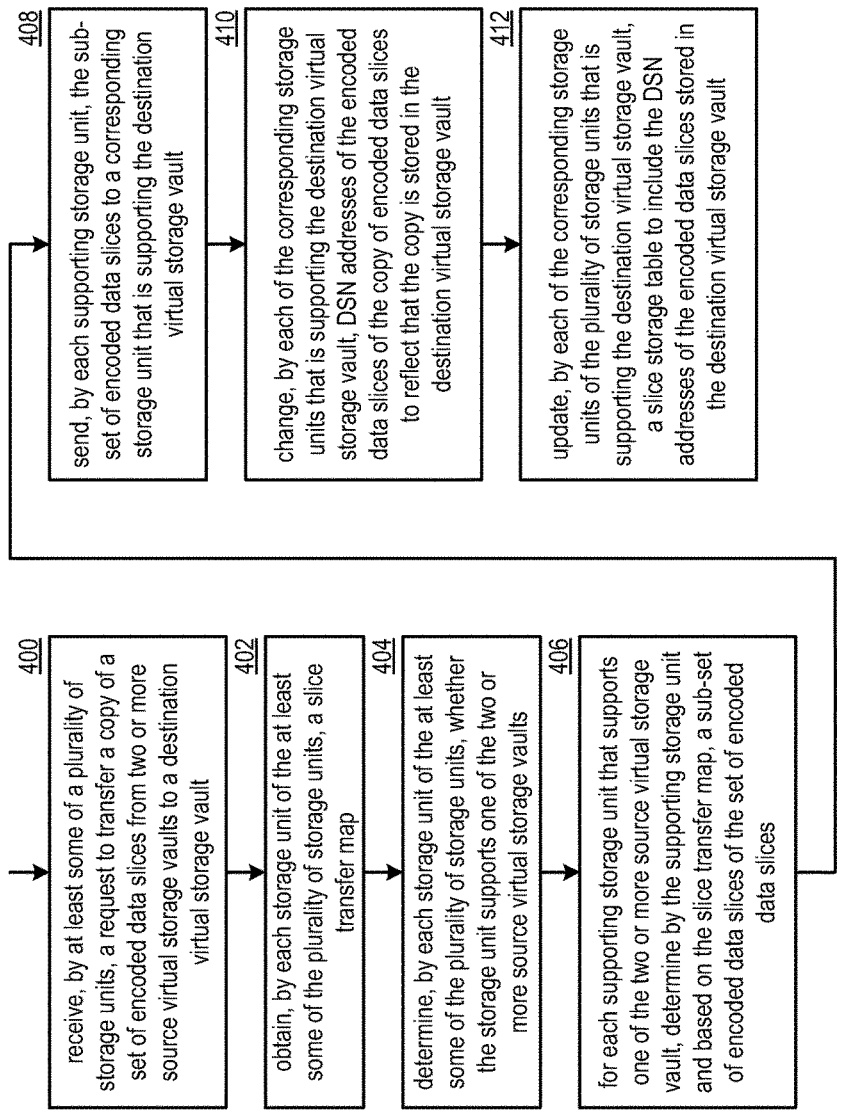
Figure 43A:
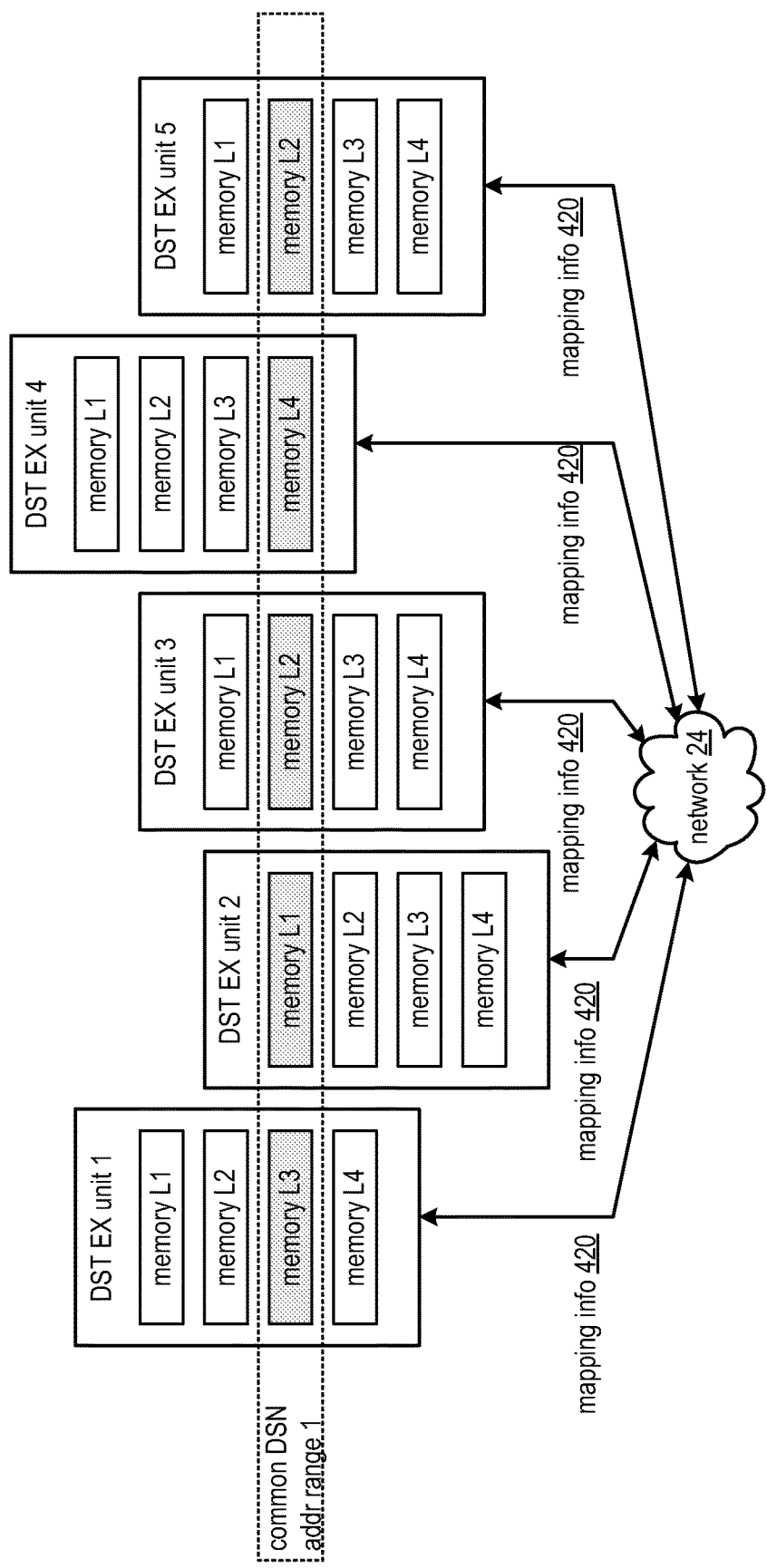
Figure 43B:
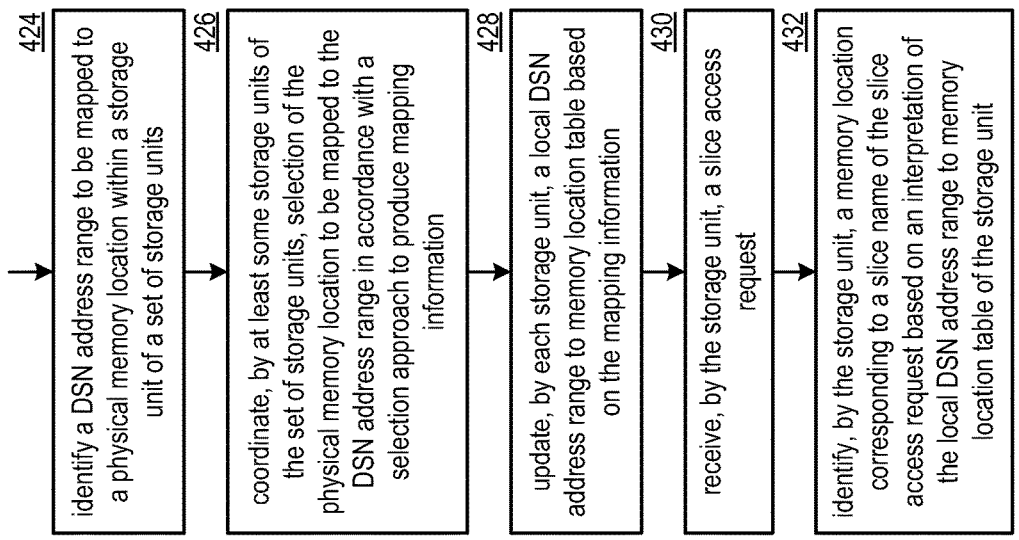
Figure 44A:
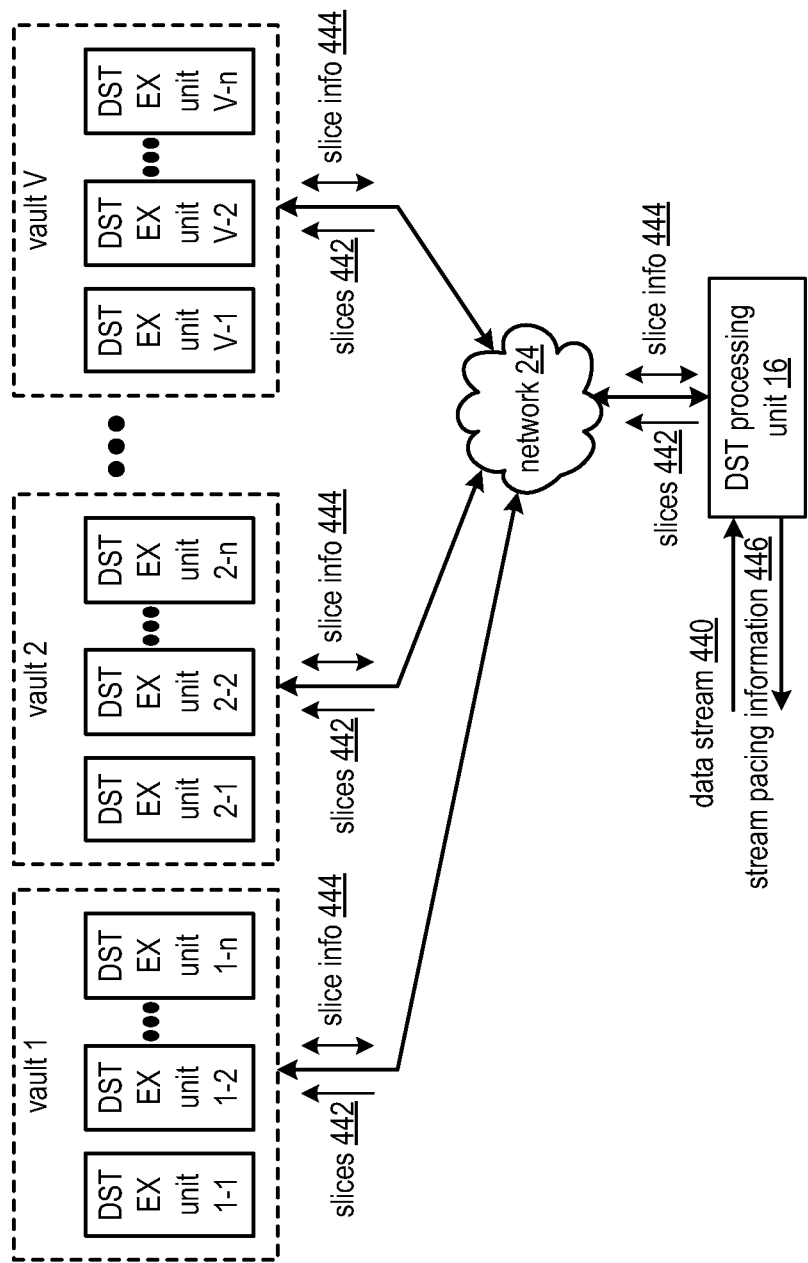
Figure 44B:
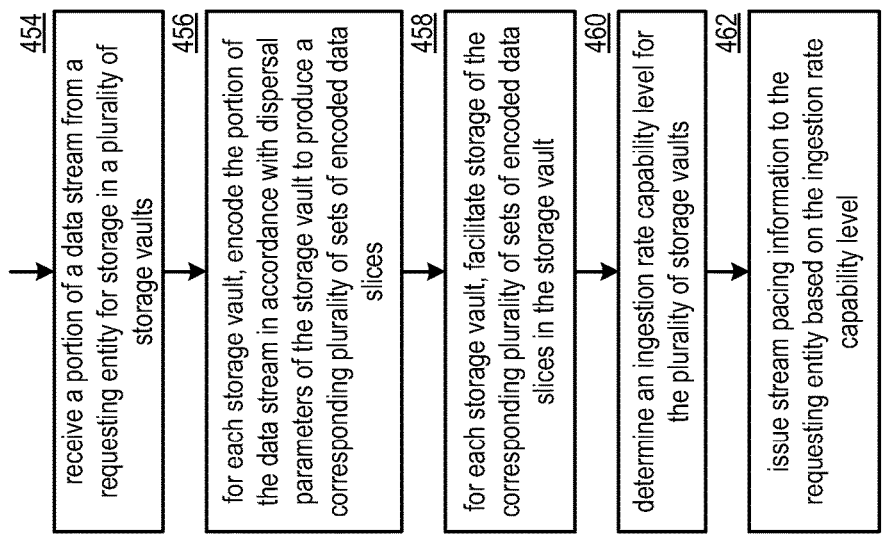
Figure 45A:
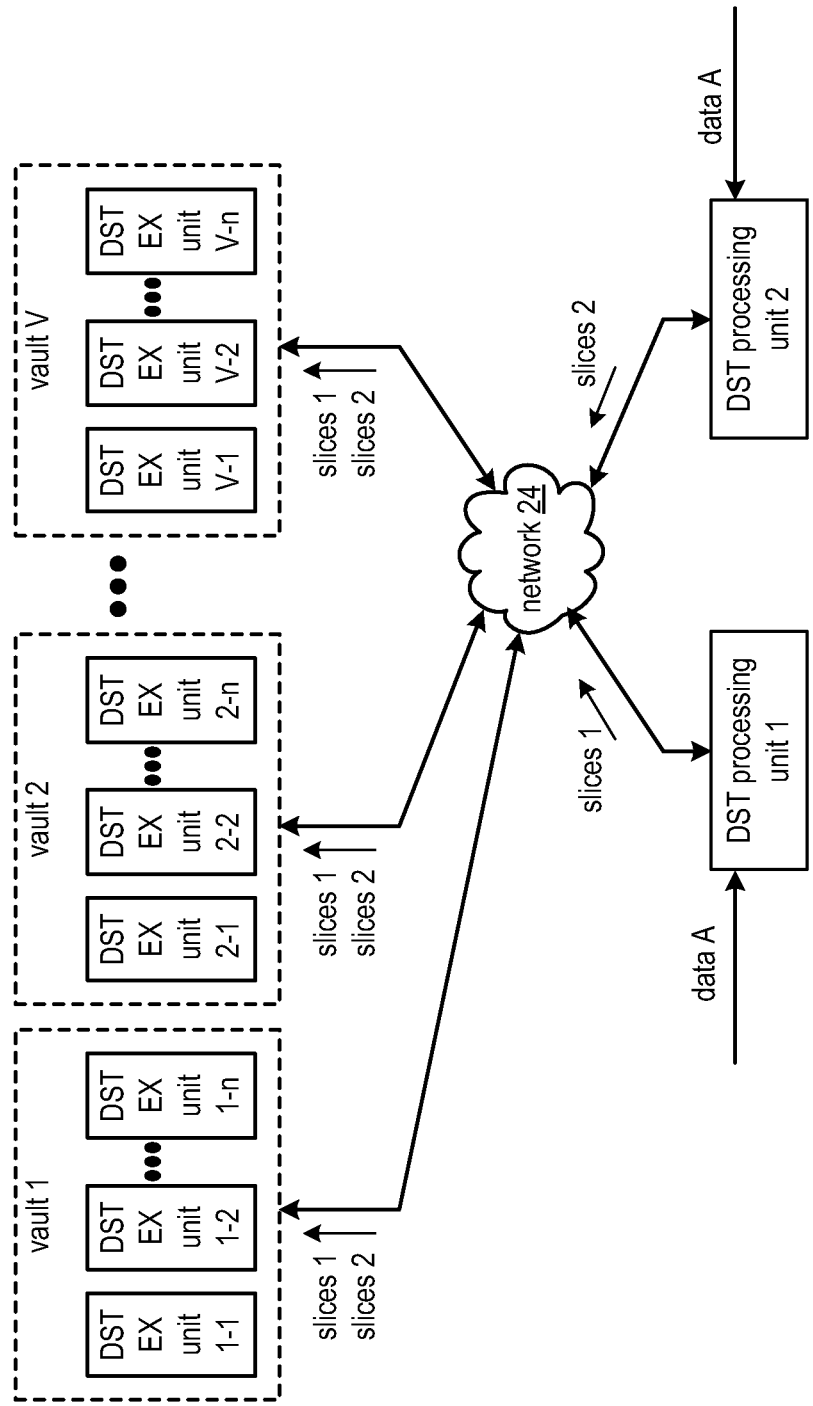
Figure 45B:
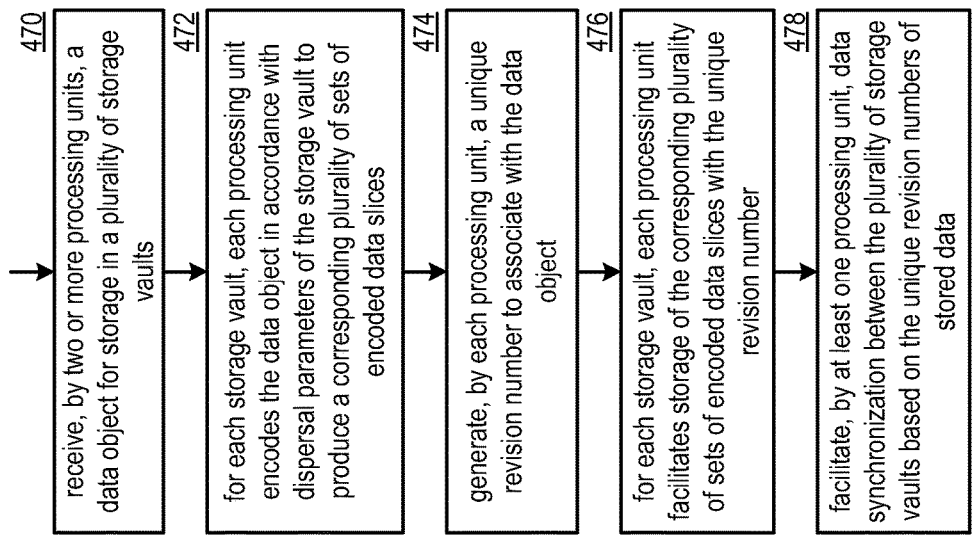
Figure 46A:
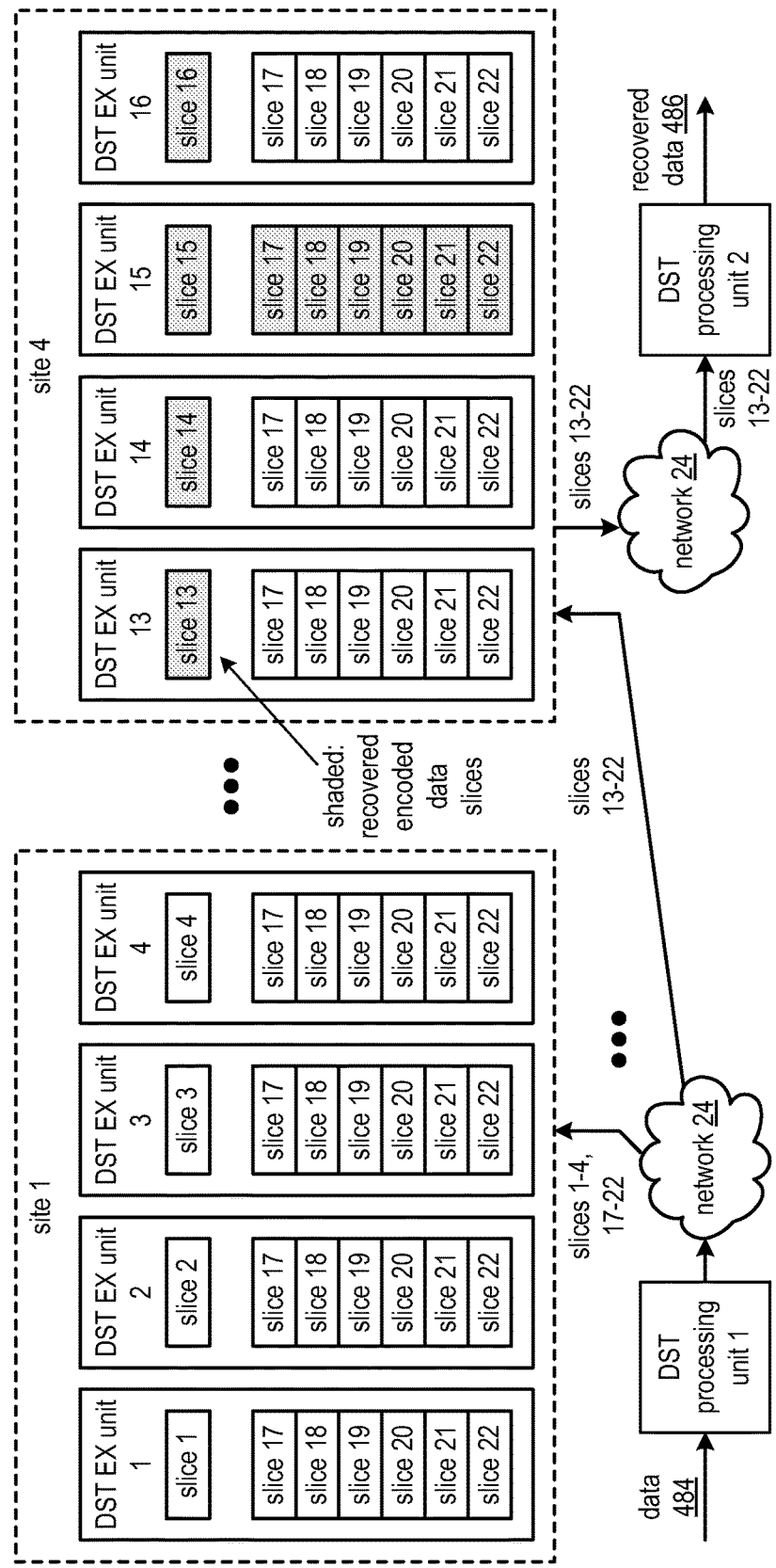
Figure 46B:
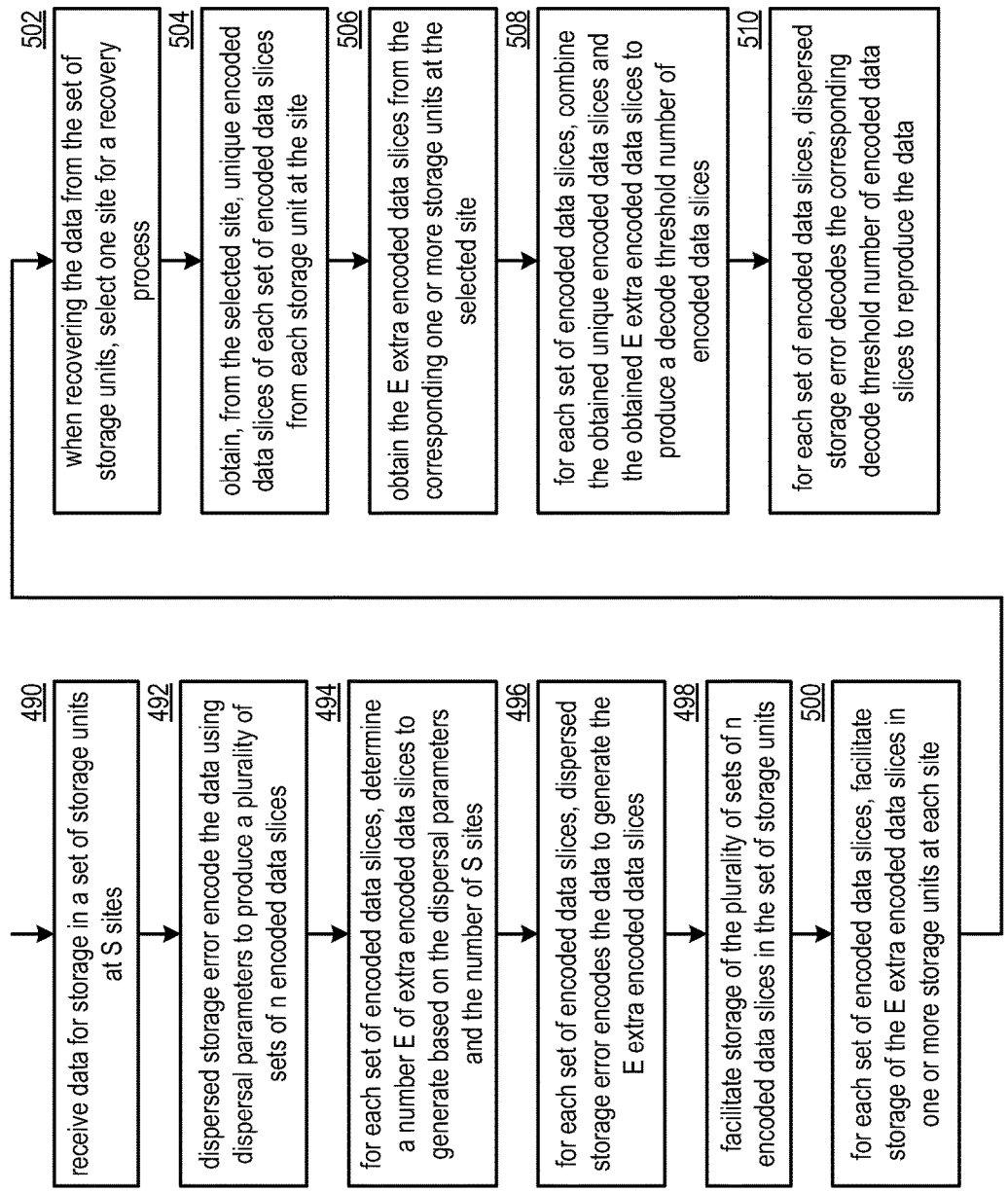
Figure 47A:
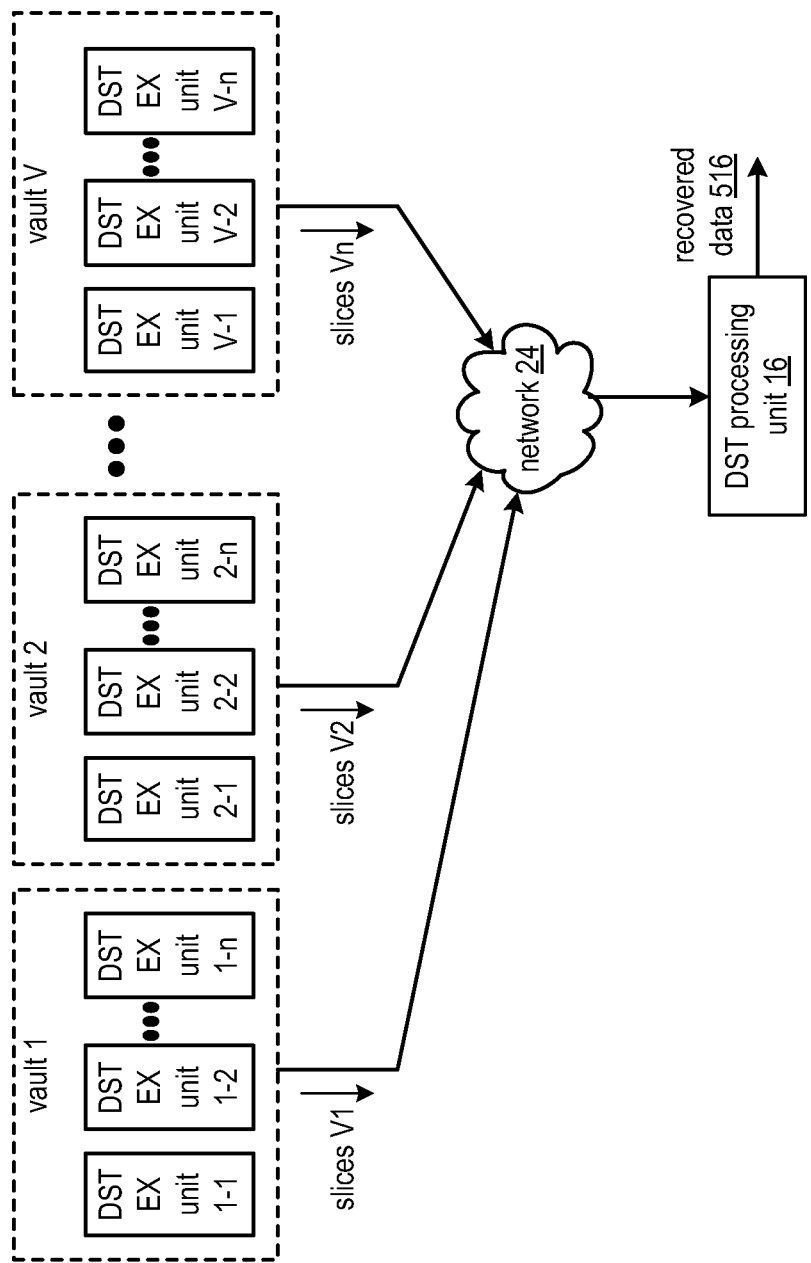
Figure 47B:
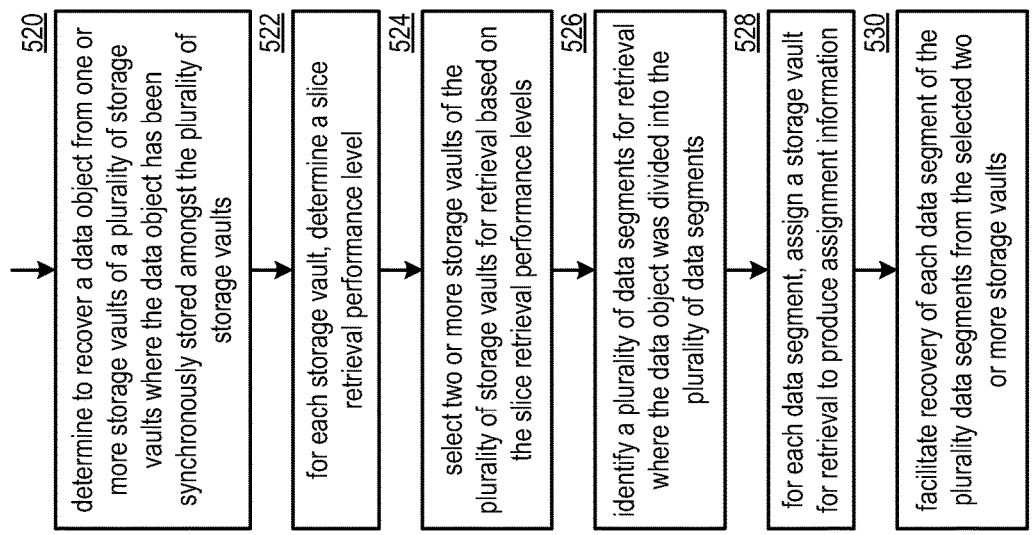
Figure 48A:
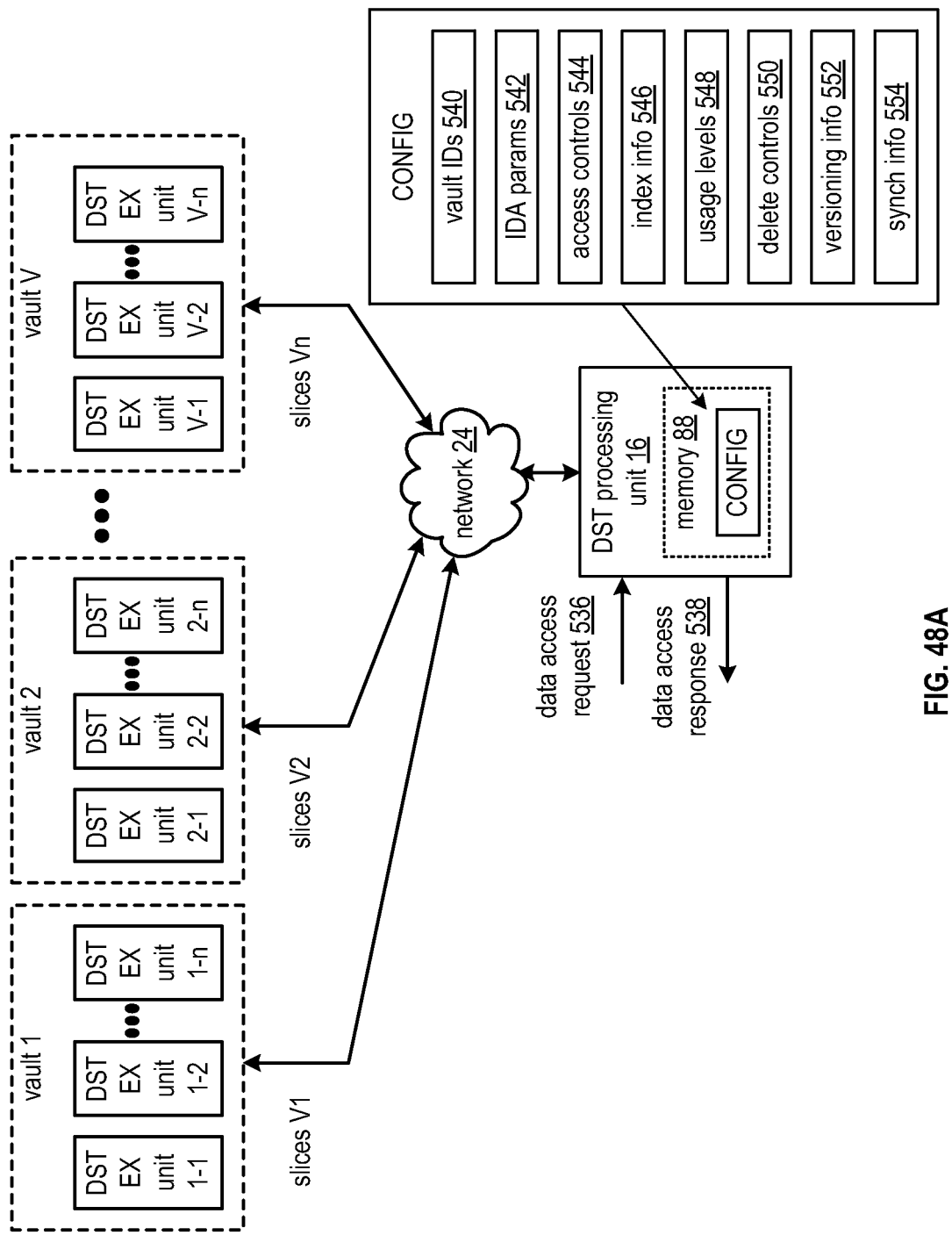
Figure 48B:
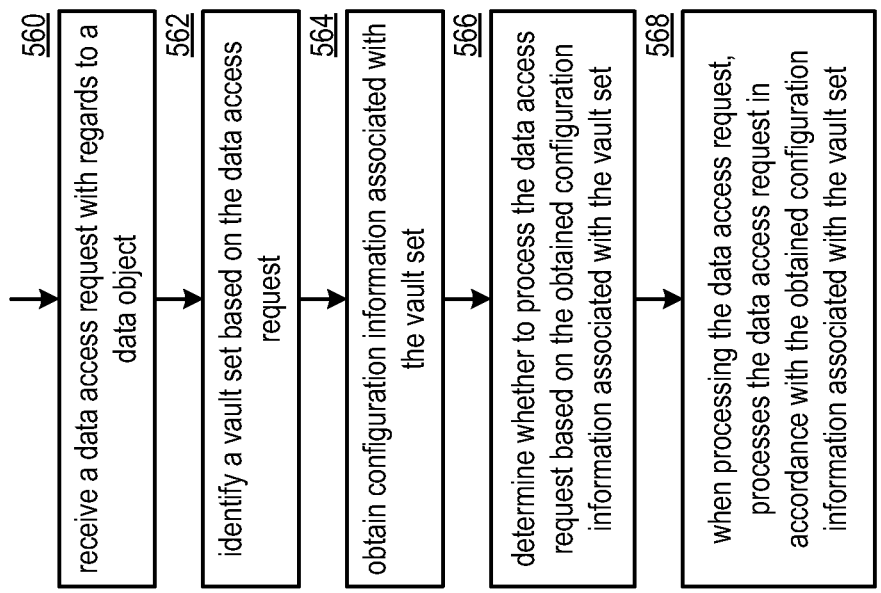

FIGS. 42A-B are schematic block diagrams of another dispersed storage network in accordance with the present invention;

FIG. 42C is a flowchart illustrating another example of synchronizing storage of data copies in accordance with the present invention;

FIG. 43A is a schematic block diagram of another dispersed storage network in accordance with the present invention;

FIG. 43B is a flowchart illustrating an example of associating virtual addressing with physical storage in accordance with the present invention;

FIG. 44A is a schematic block diagram of another dispersed storage network in accordance with the present invention;

FIG. 44B is a flowchart illustrating an example of pacing ingestion of data into a plurality of storage vaults in accordance with the present invention;

FIG. 45A is a schematic block diagram of another dispersed storage network in accordance with the present invention;

FIG. 45B is a flowchart illustrating an example of synchronously storing similar data in accordance with the present invention;

FIG. 46A is a schematic block diagram of another dispersed storage network in accordance with the present invention;

FIG. 46B is a flowchart illustrating an example of accessing data in accordance with the present invention;

FIG. 47A is a schematic block diagram of another dispersed storage network in accordance with the present invention;

FIG. 47B is a flowchart illustrating an example of recovering stored data in accordance with the present invention;

FIG. 48A is a schematic block diagram of another dispersed storage network in accordance with the present invention; and FIG. 48B is a flowchart illustrating an example of processing data access requests in accordance with the present invention.

DETAILED DESCRIPTION OF THE INVENTION

Figure 1:
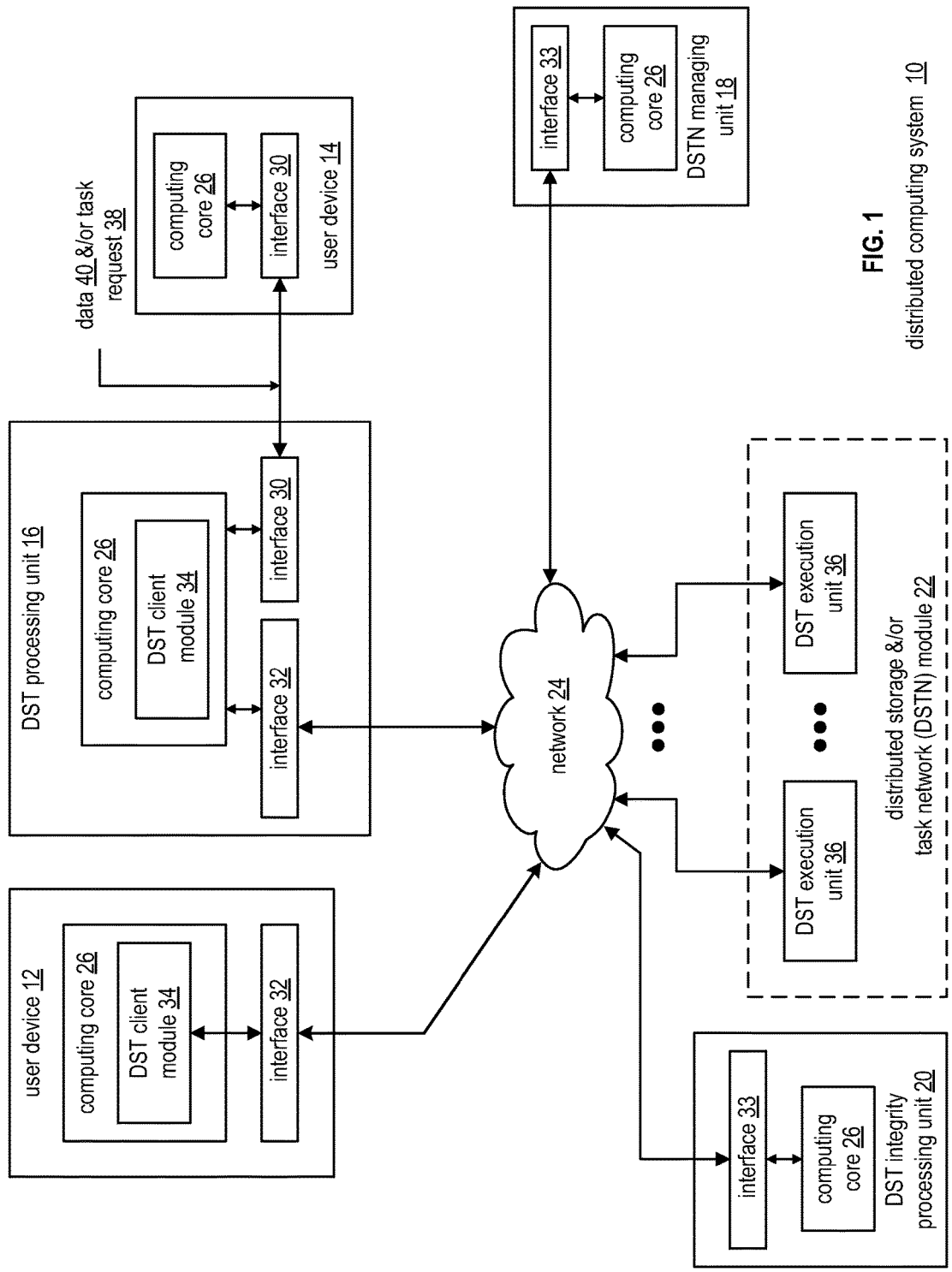
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
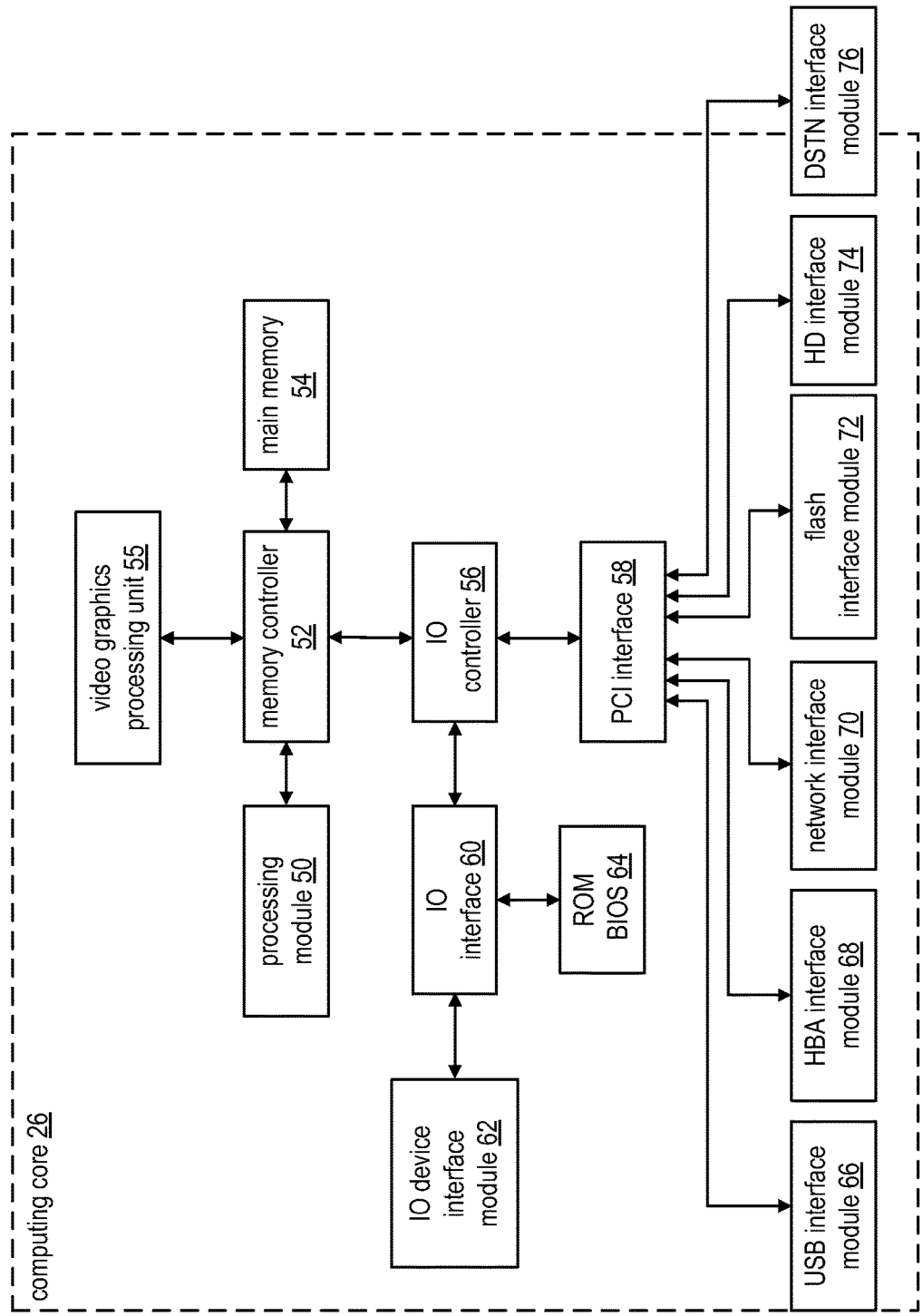
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
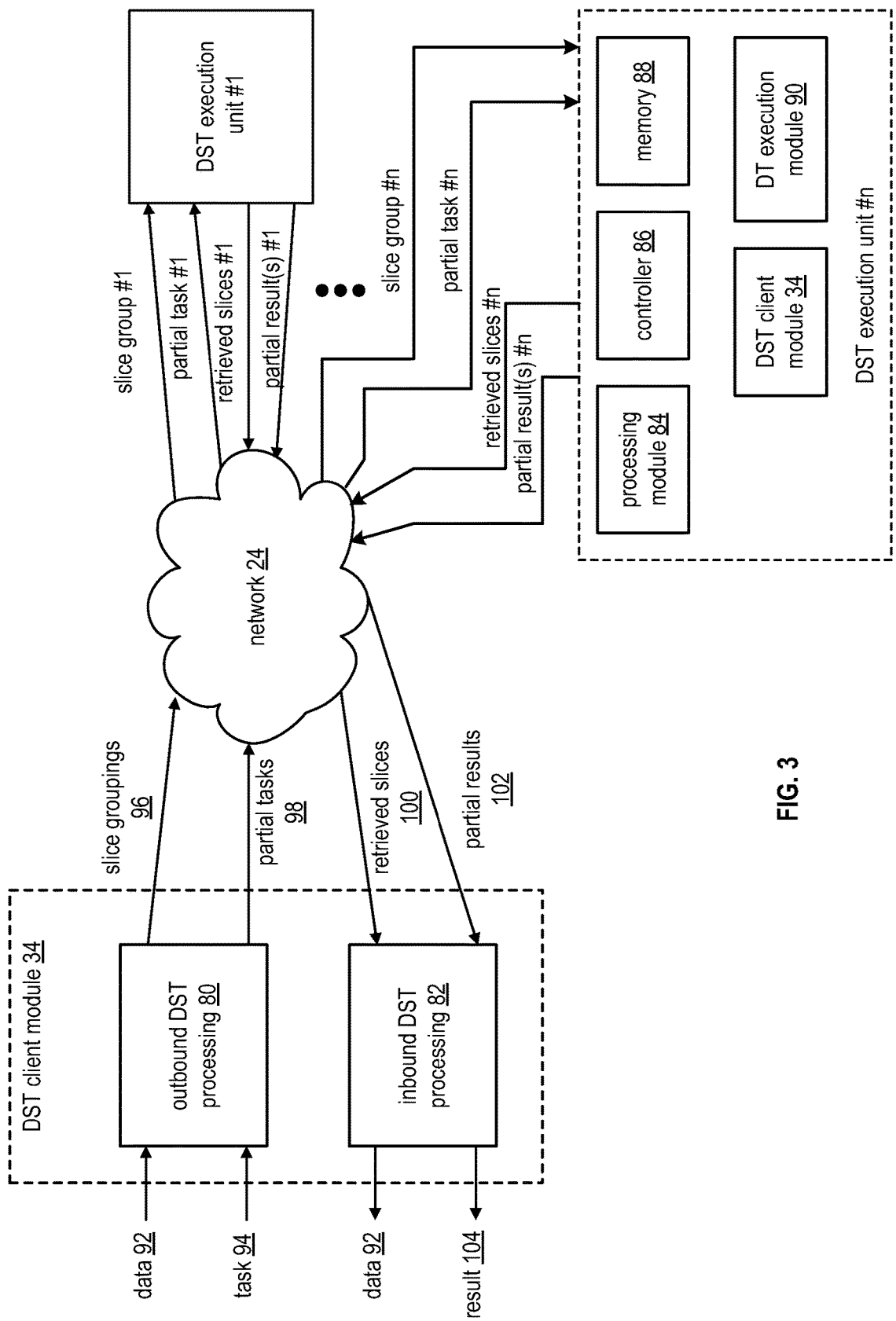
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
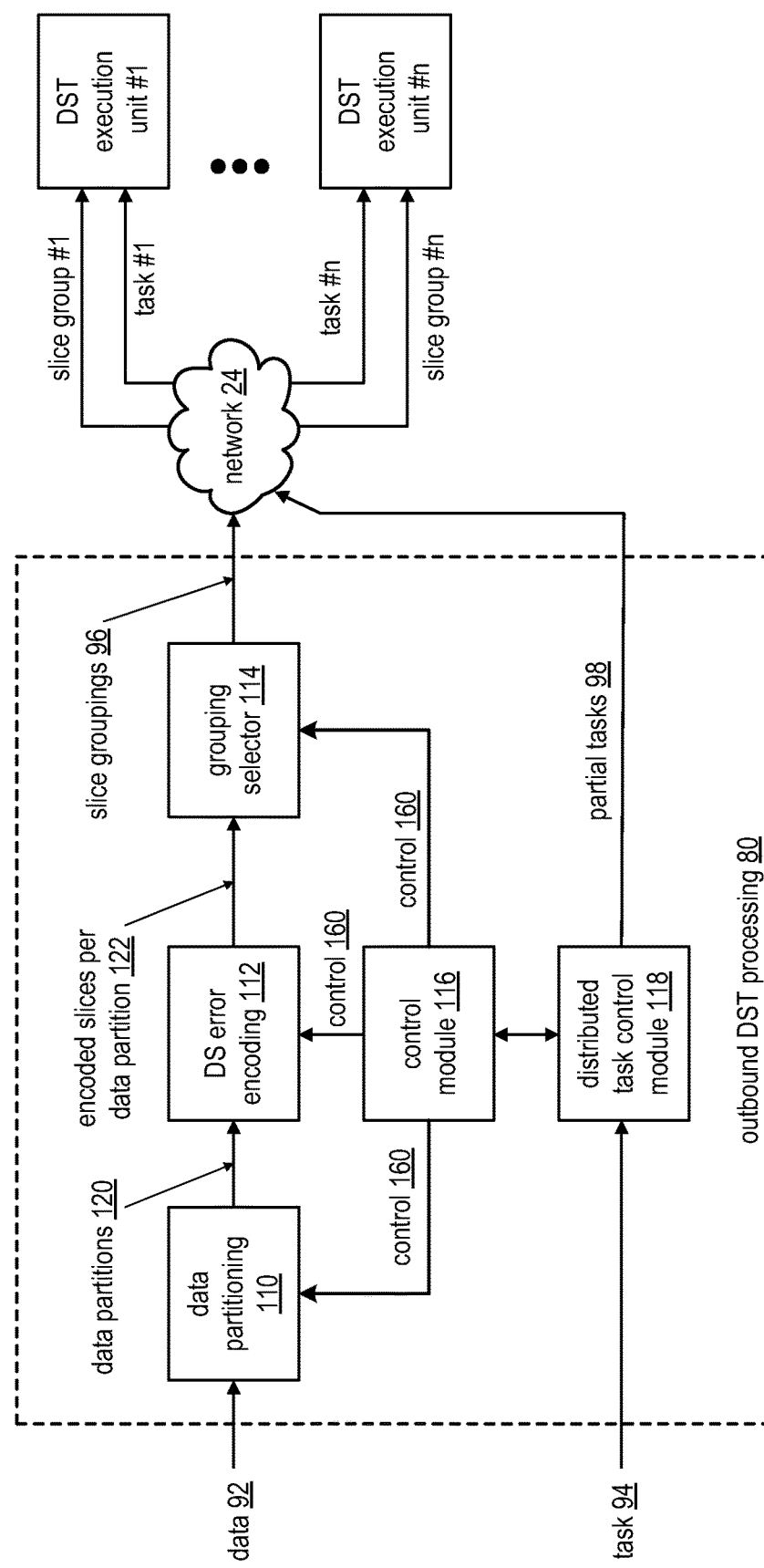
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
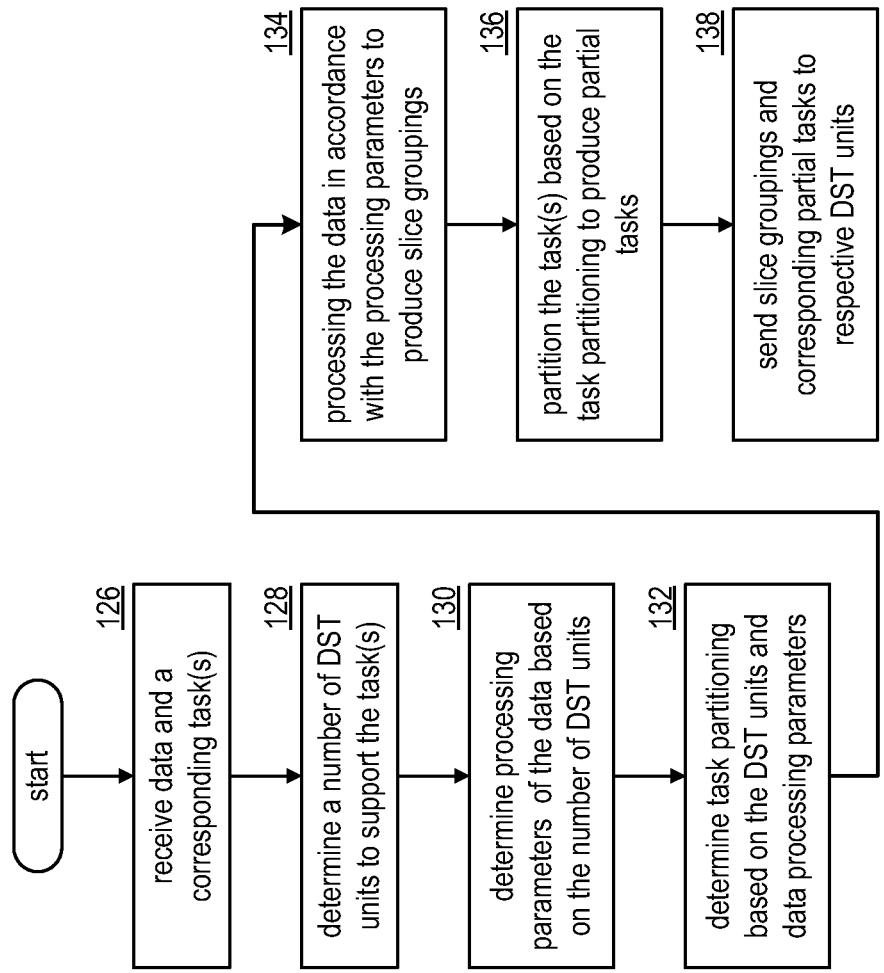
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
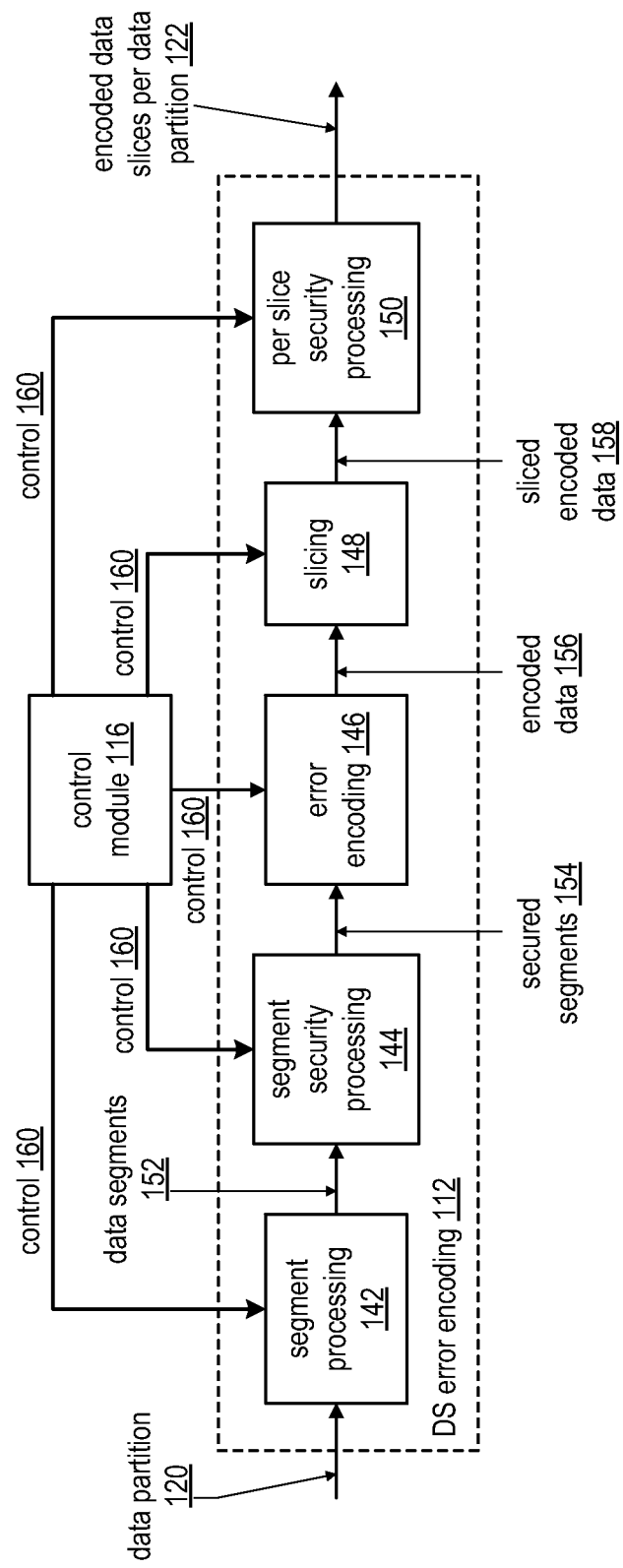
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
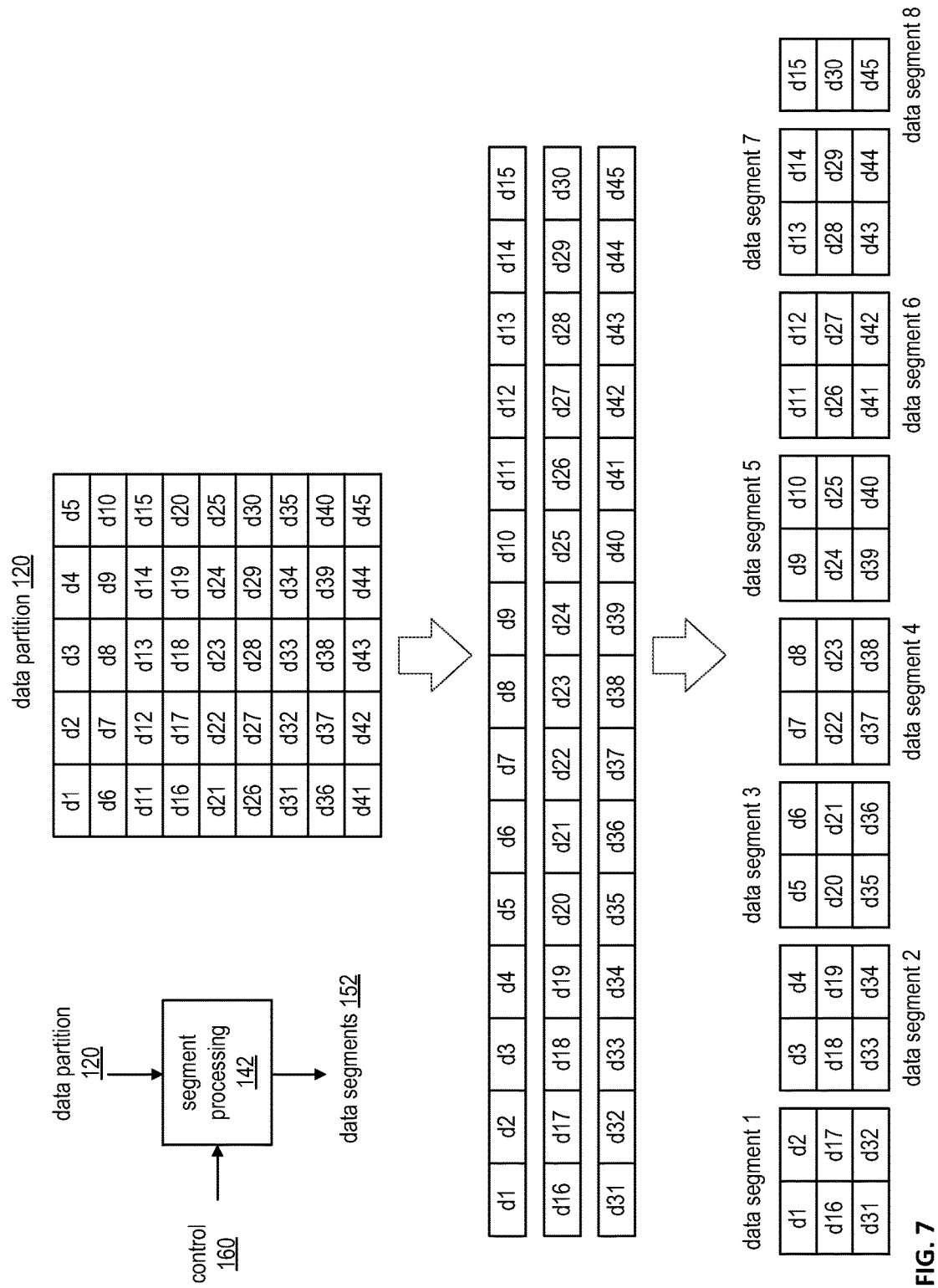
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
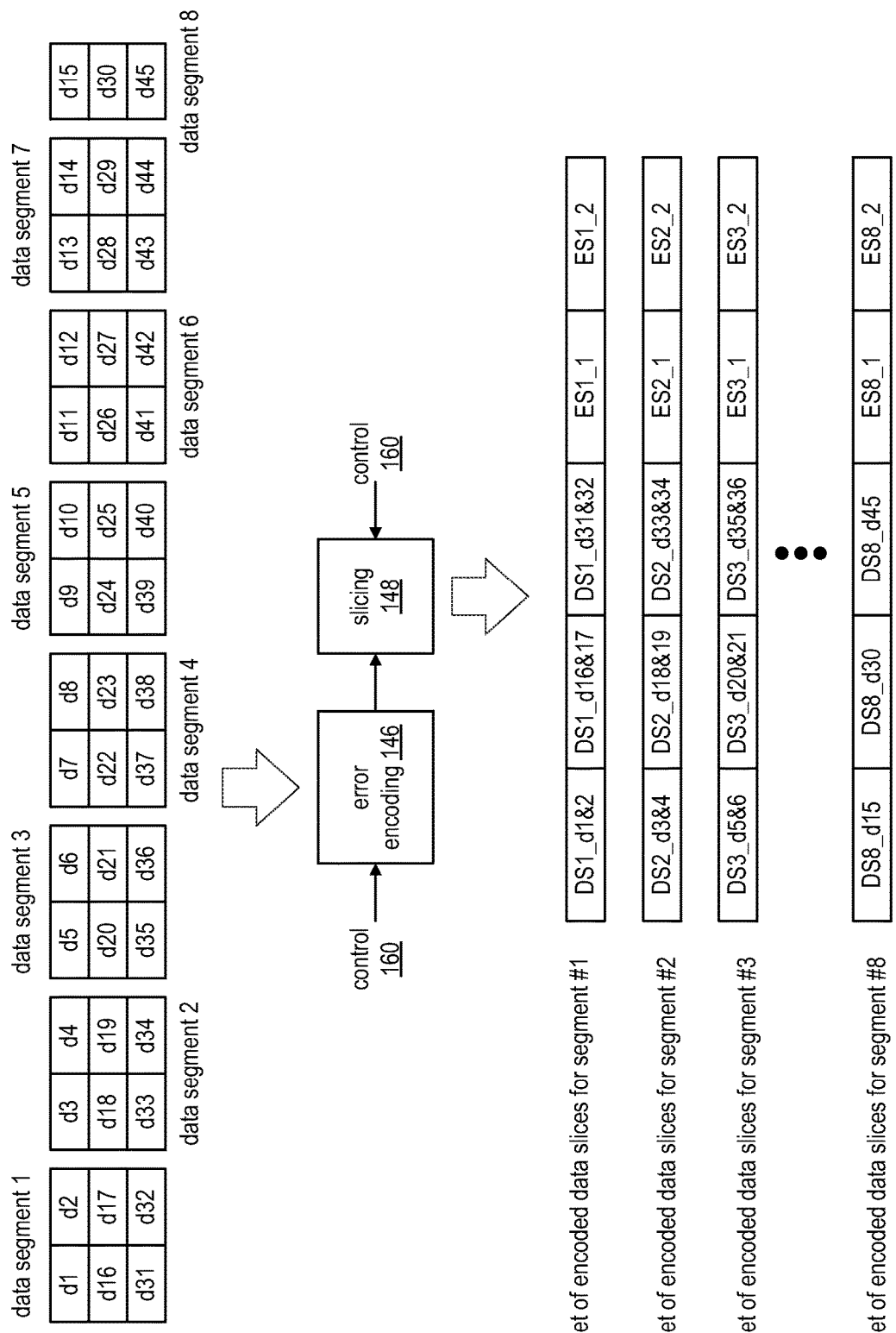
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
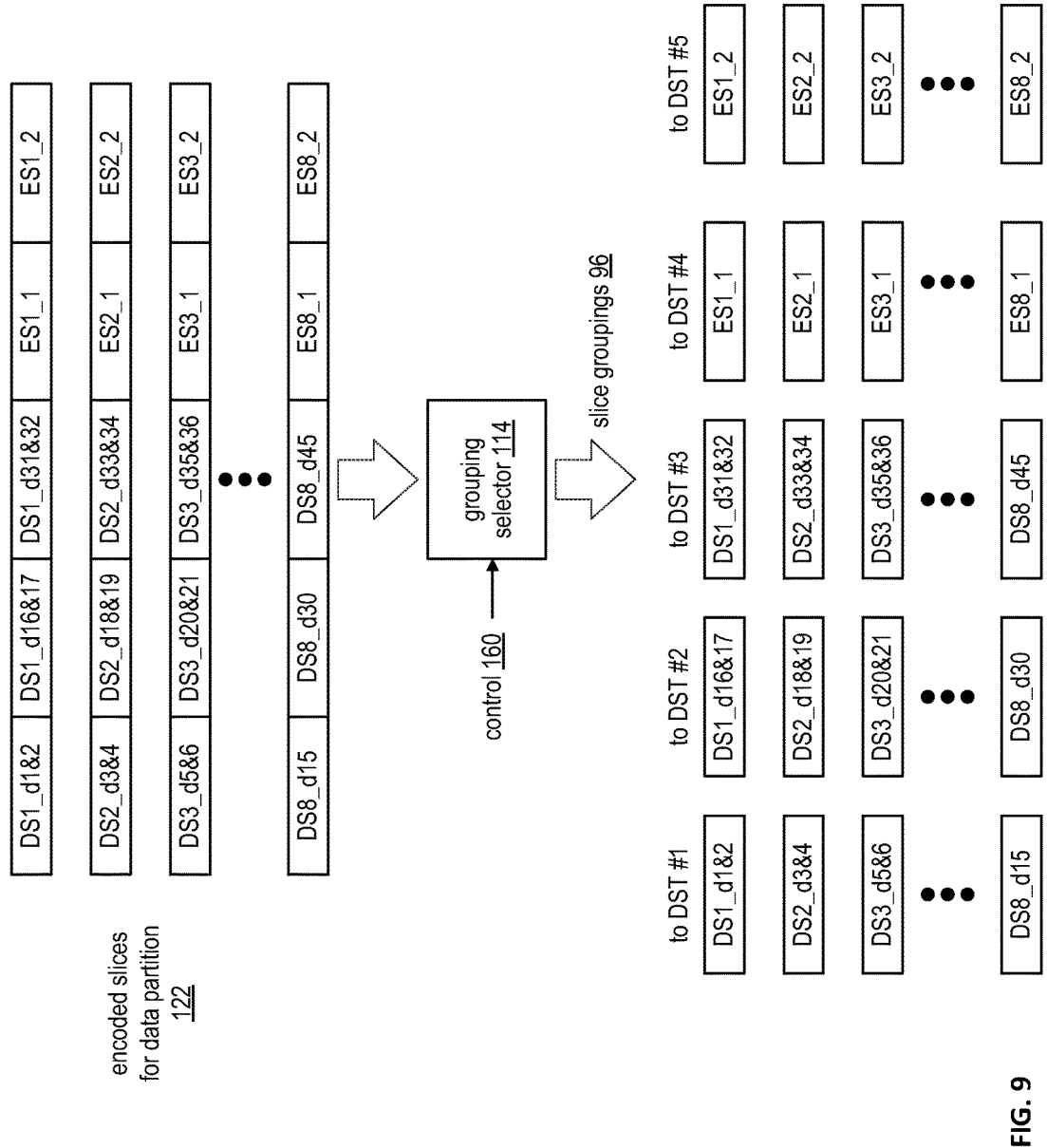
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with grouping selector information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
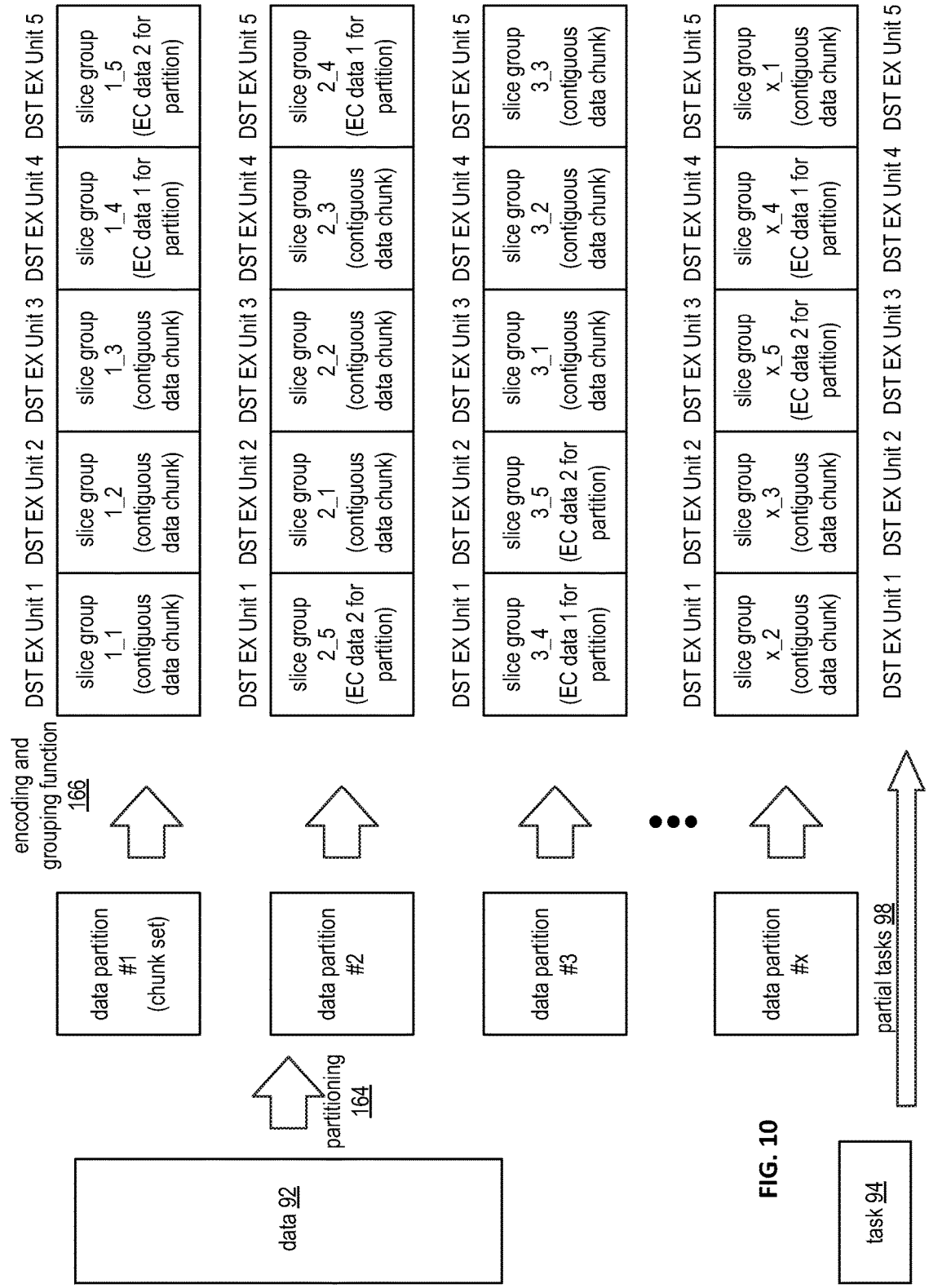
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
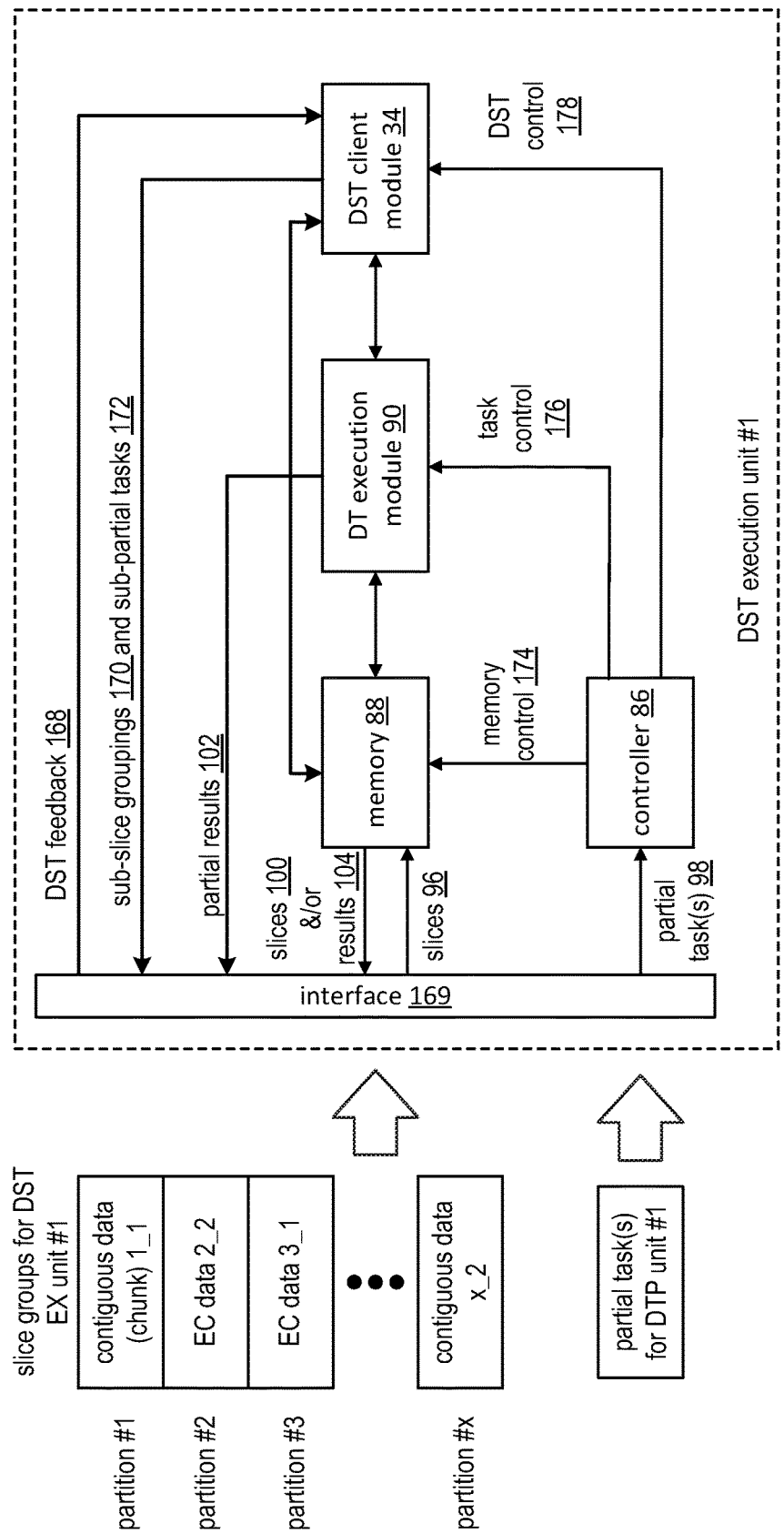
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
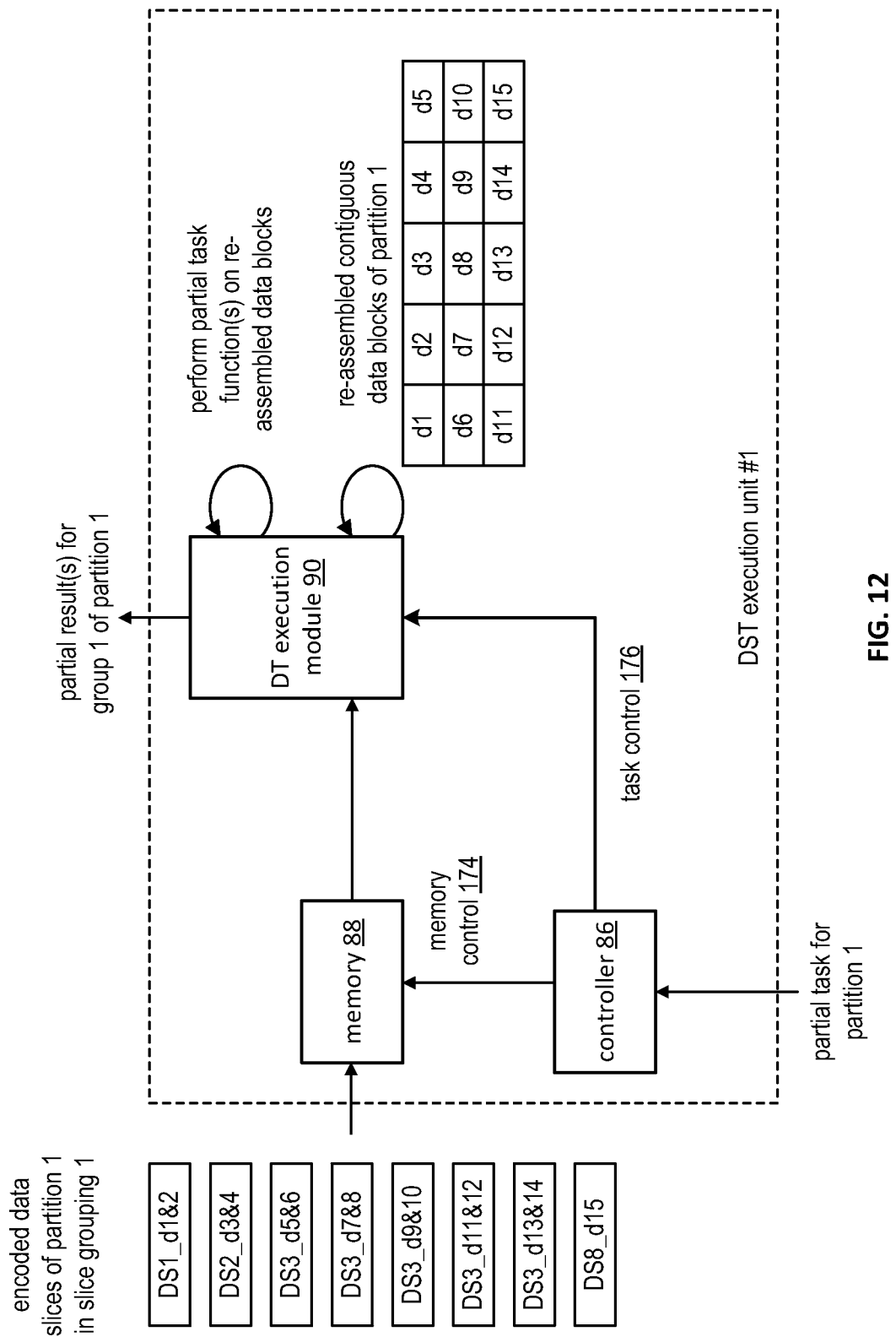
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
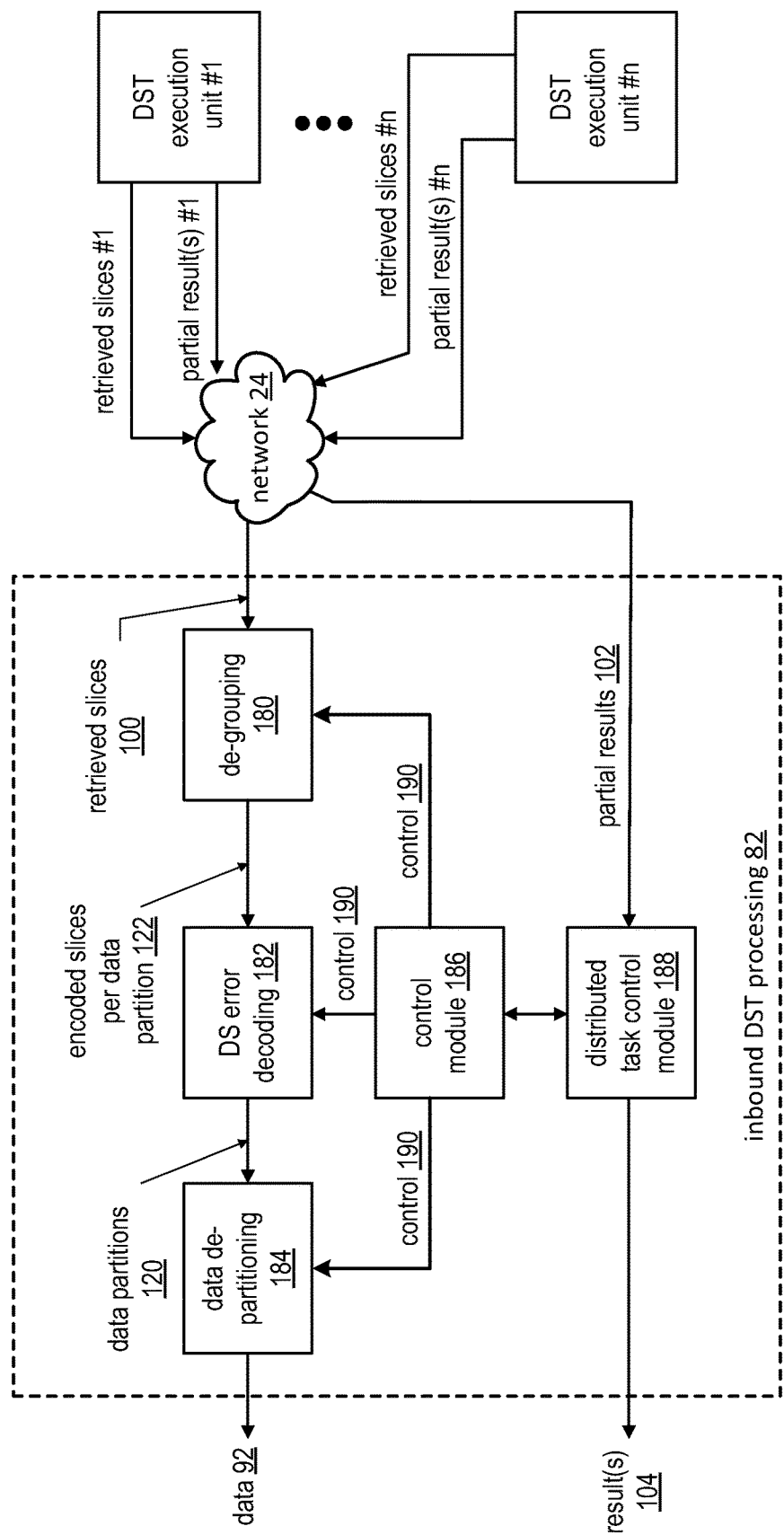
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
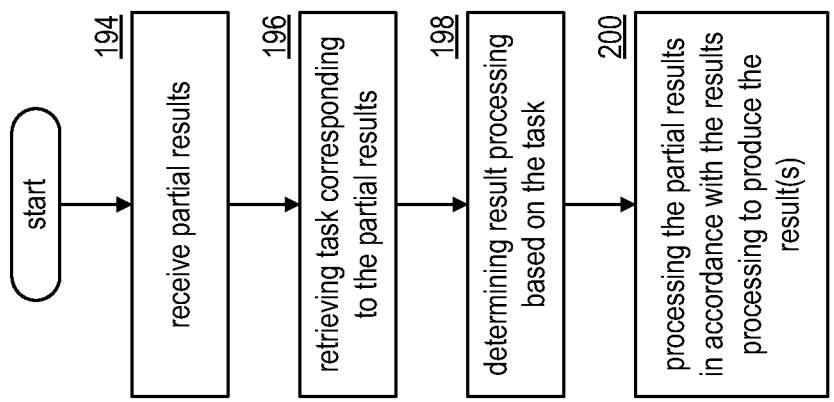
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
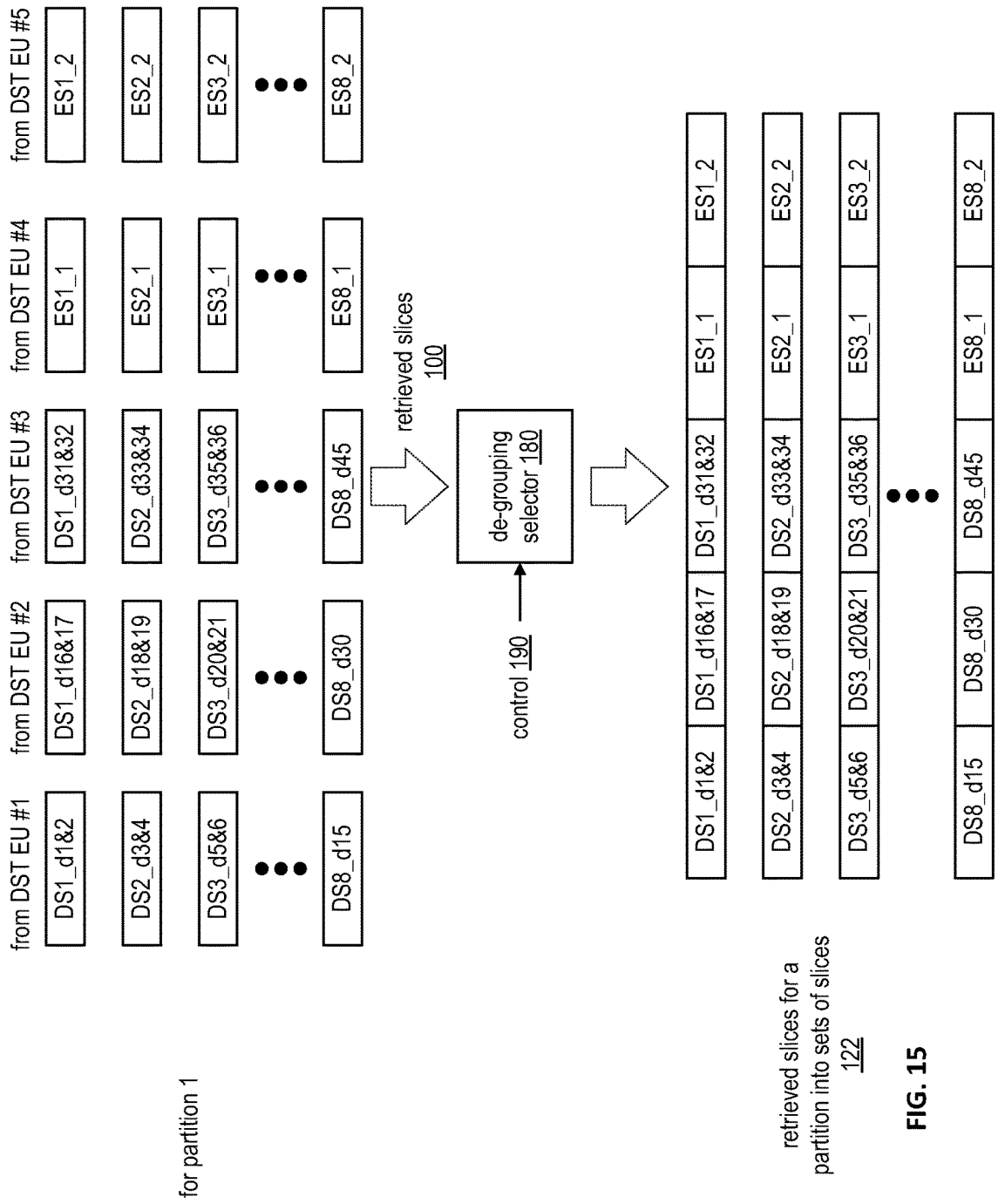
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
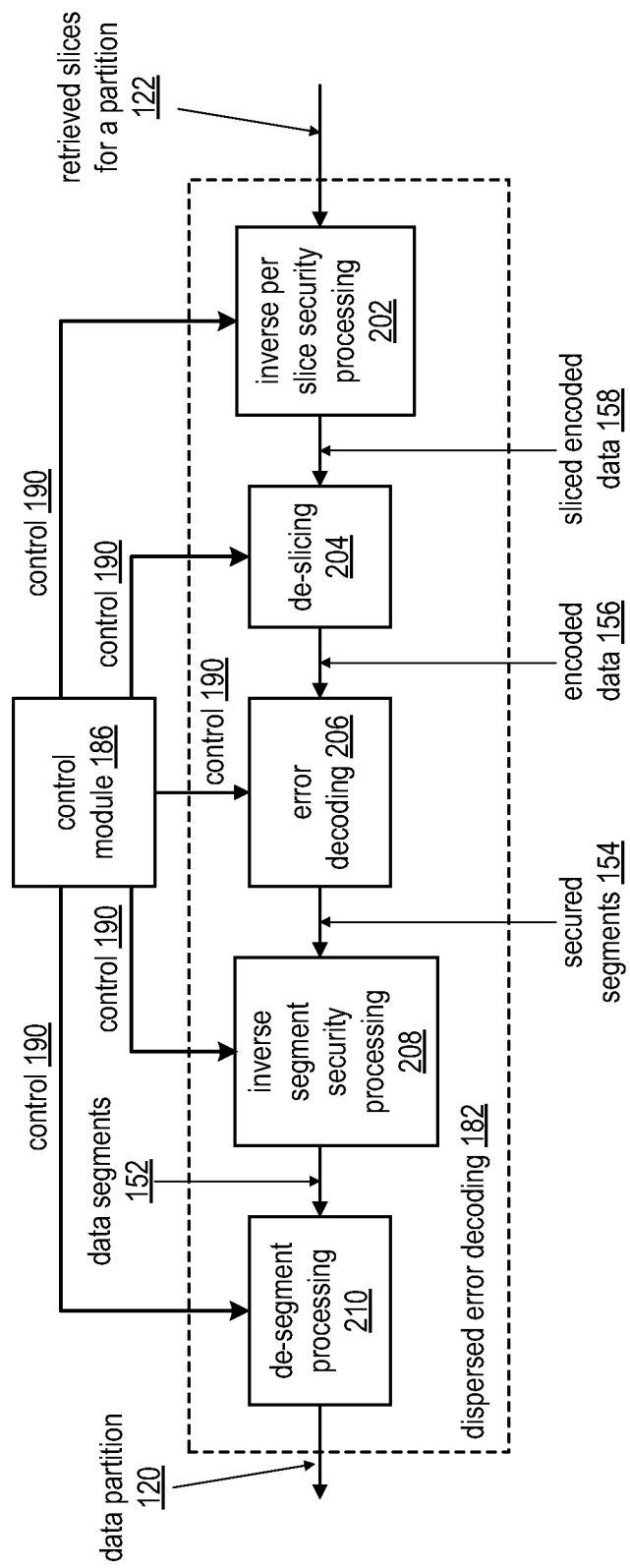
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
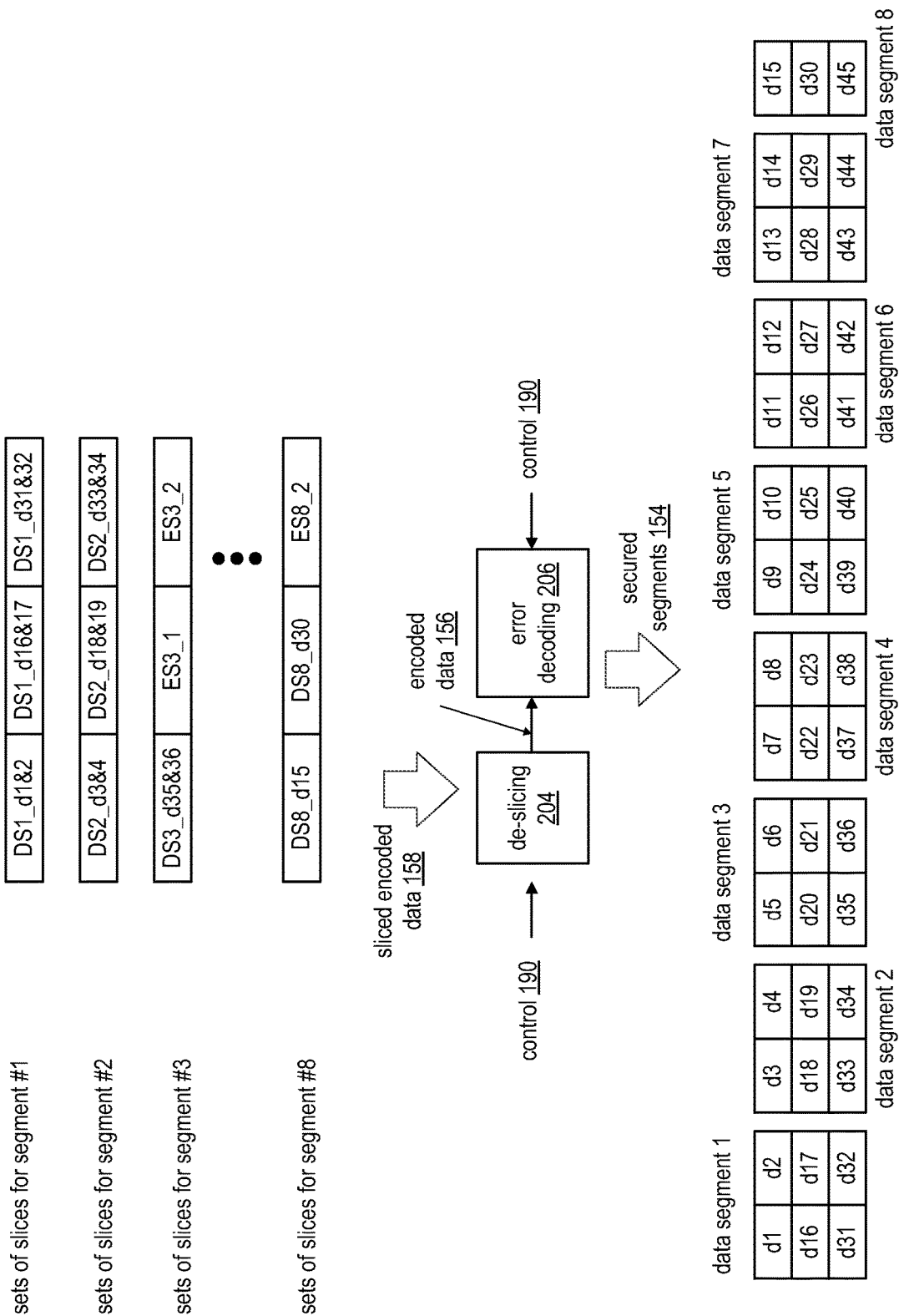
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
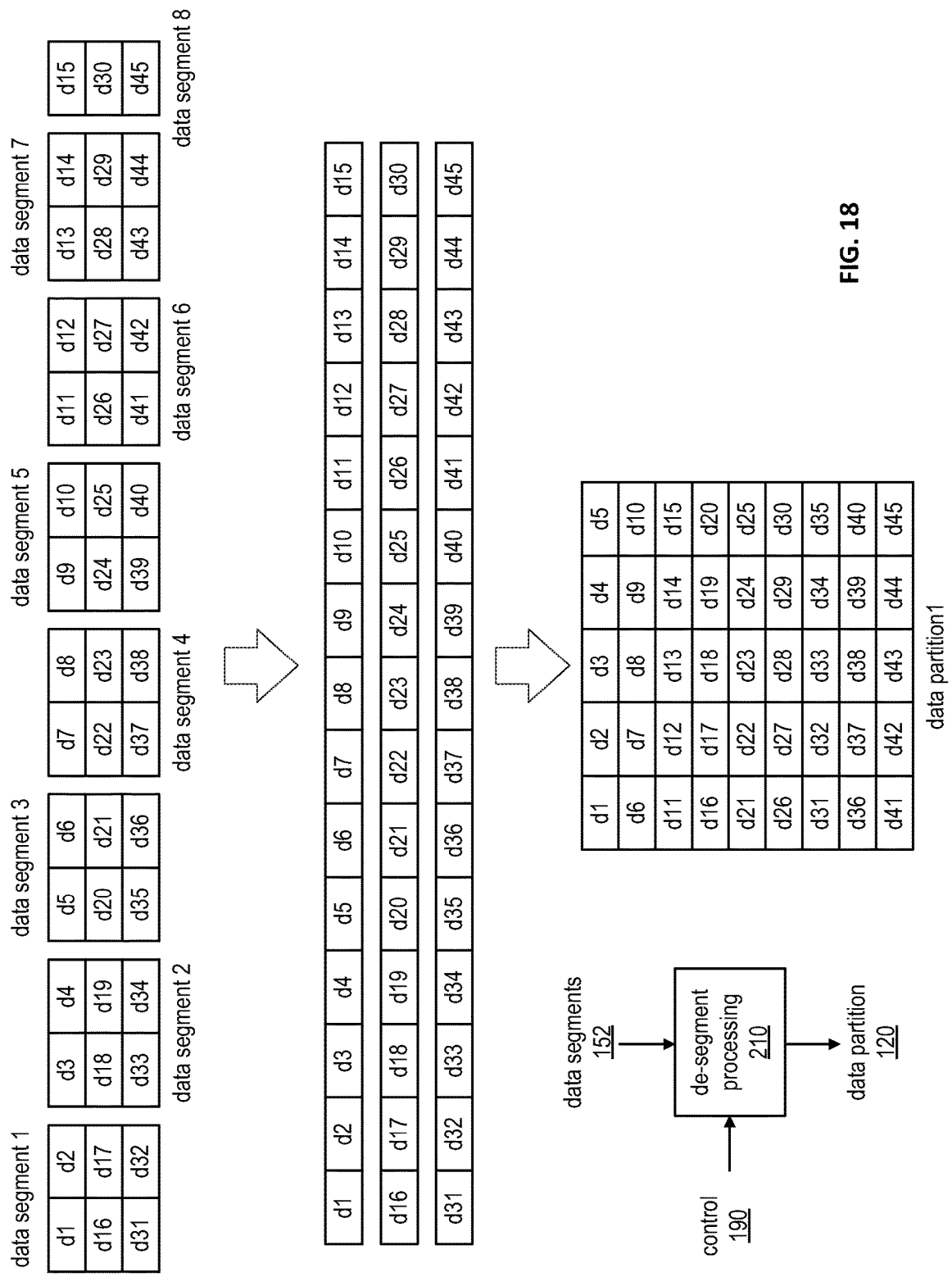
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
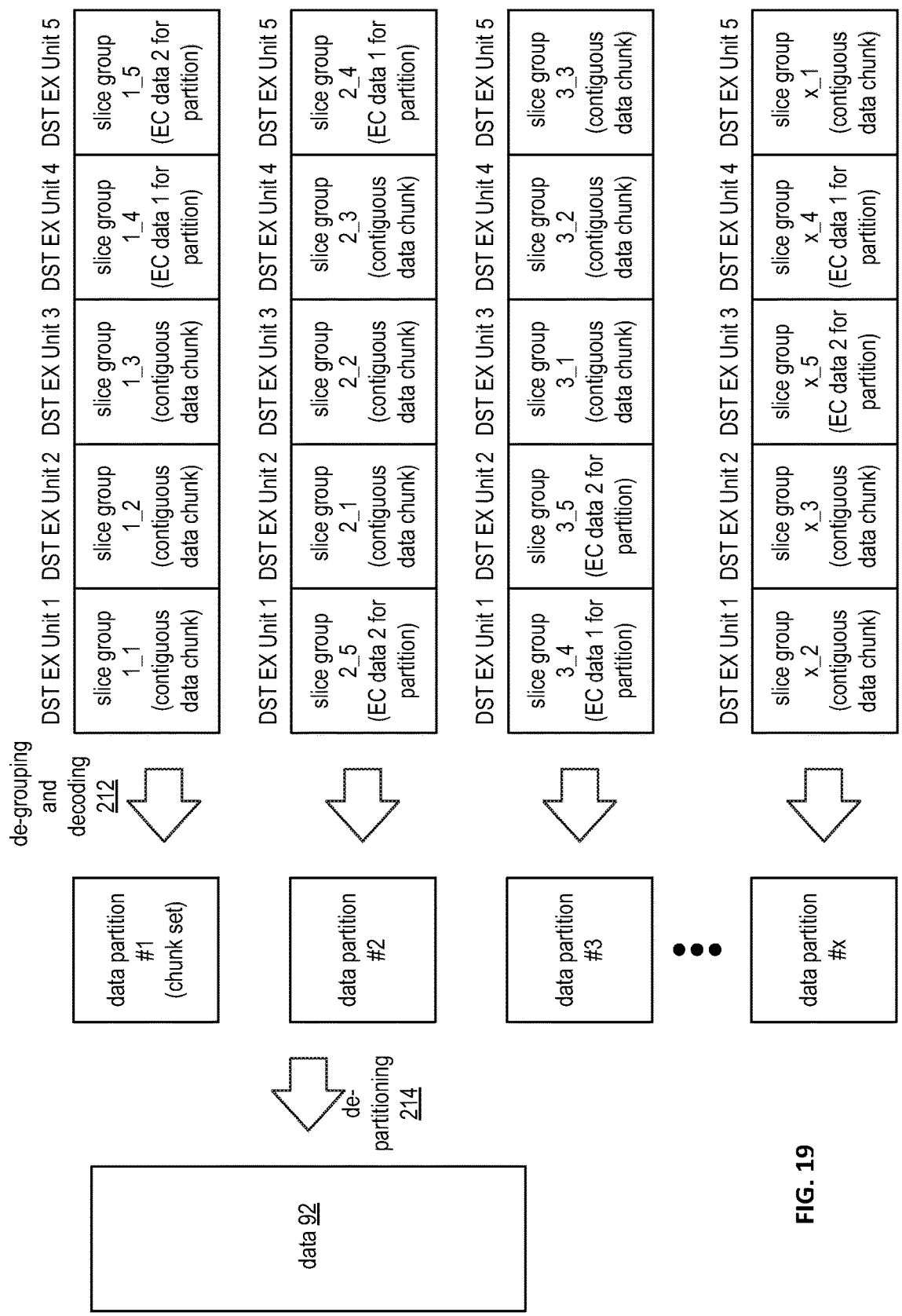
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
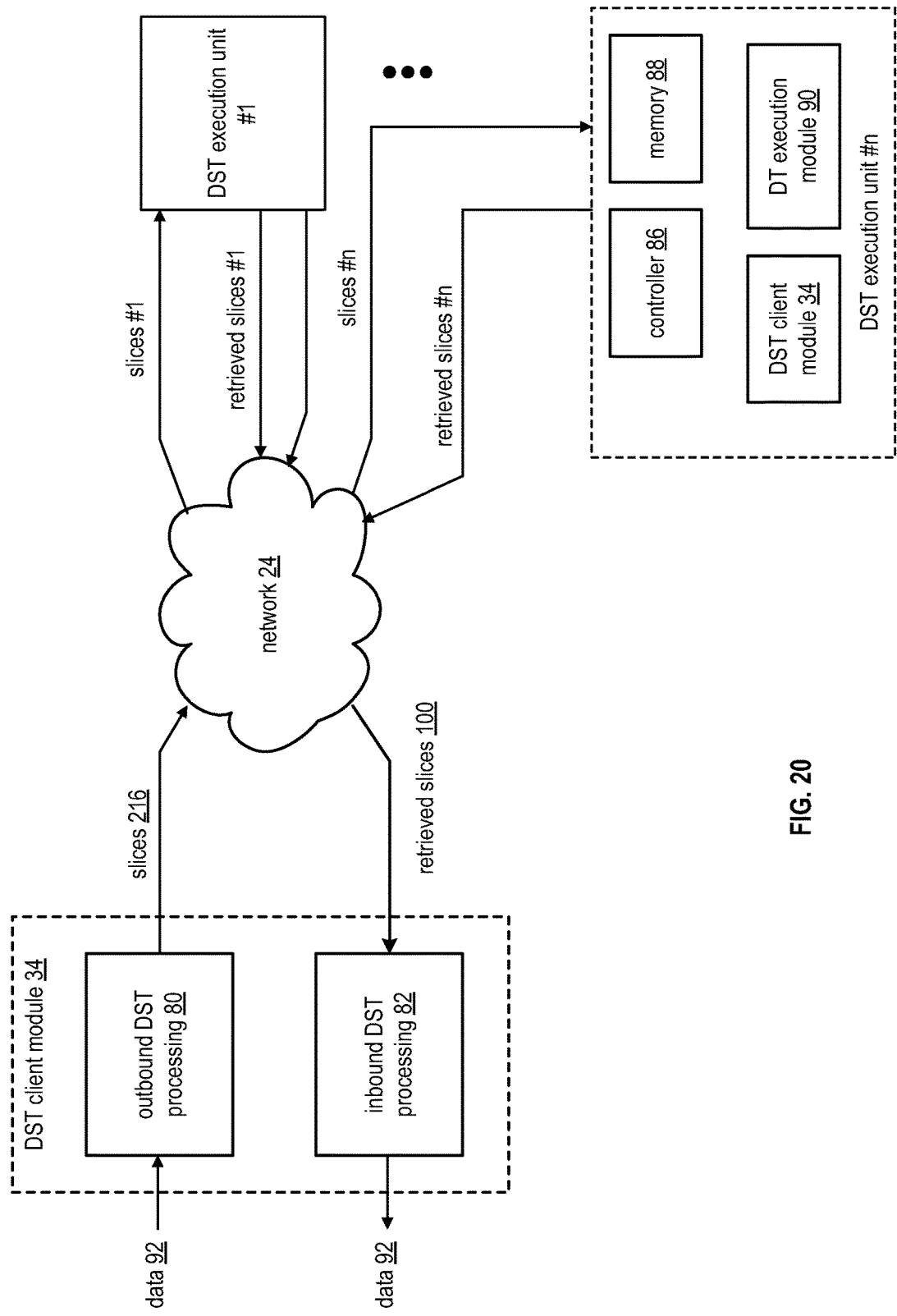
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
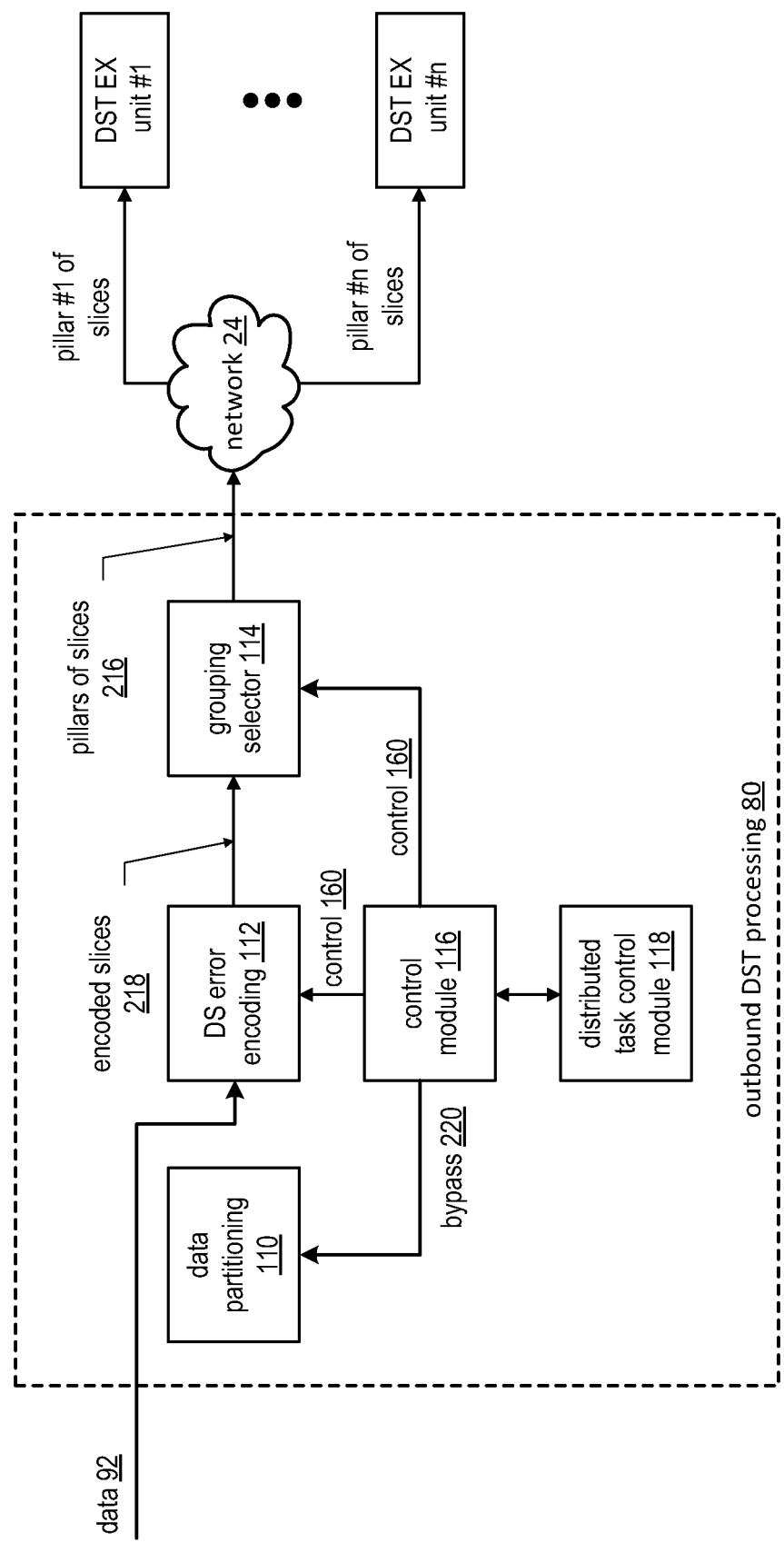
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
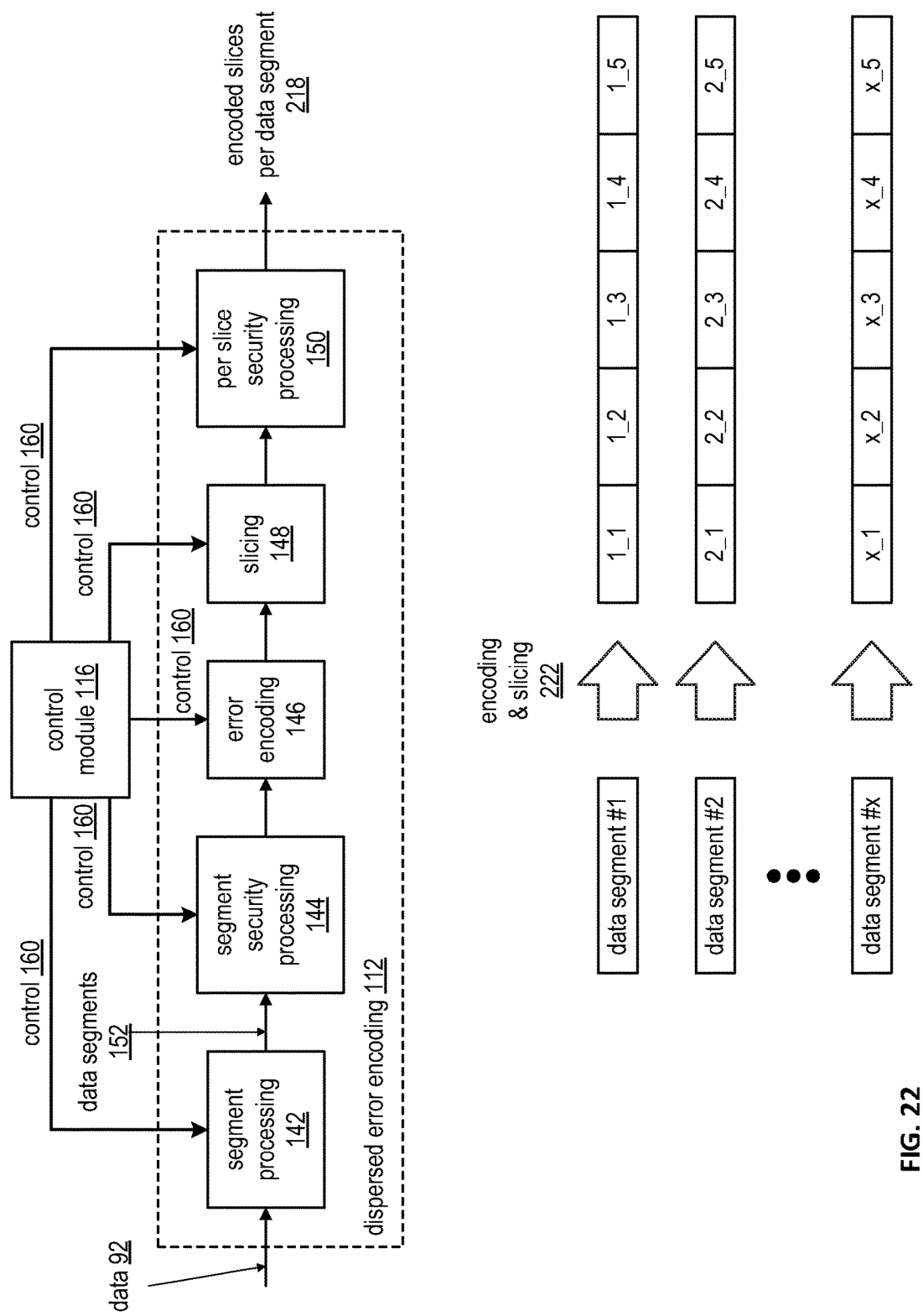
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
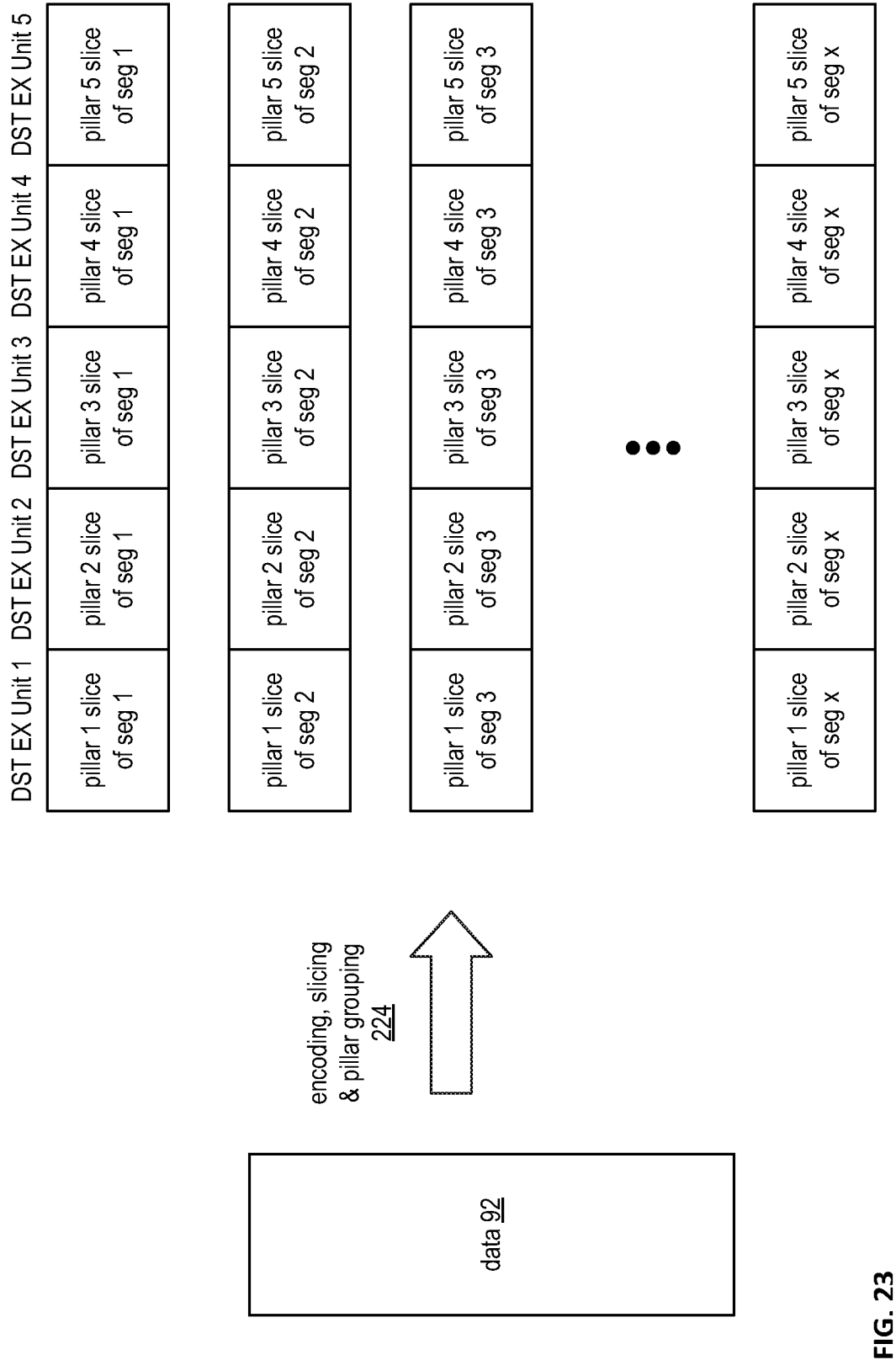
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
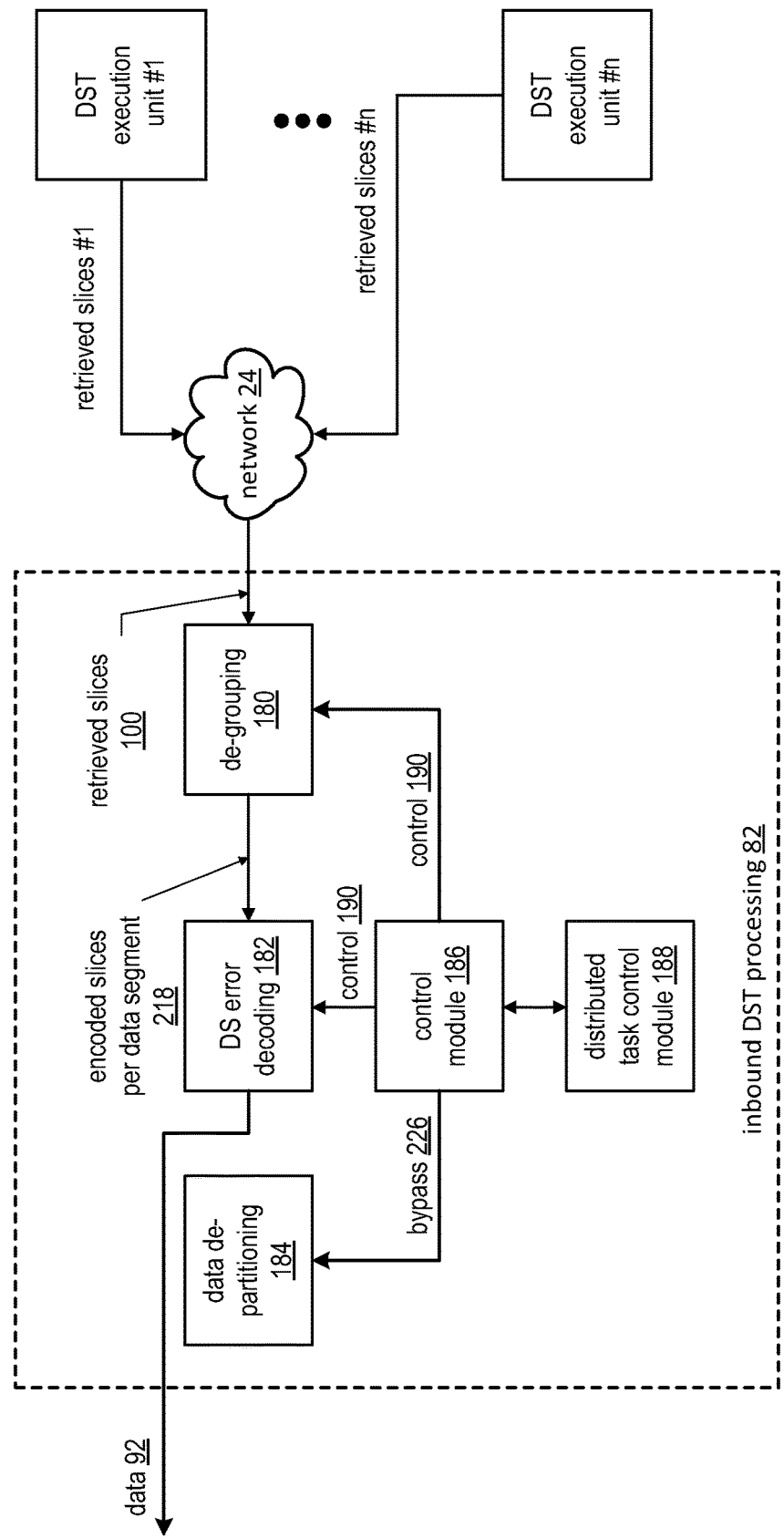
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
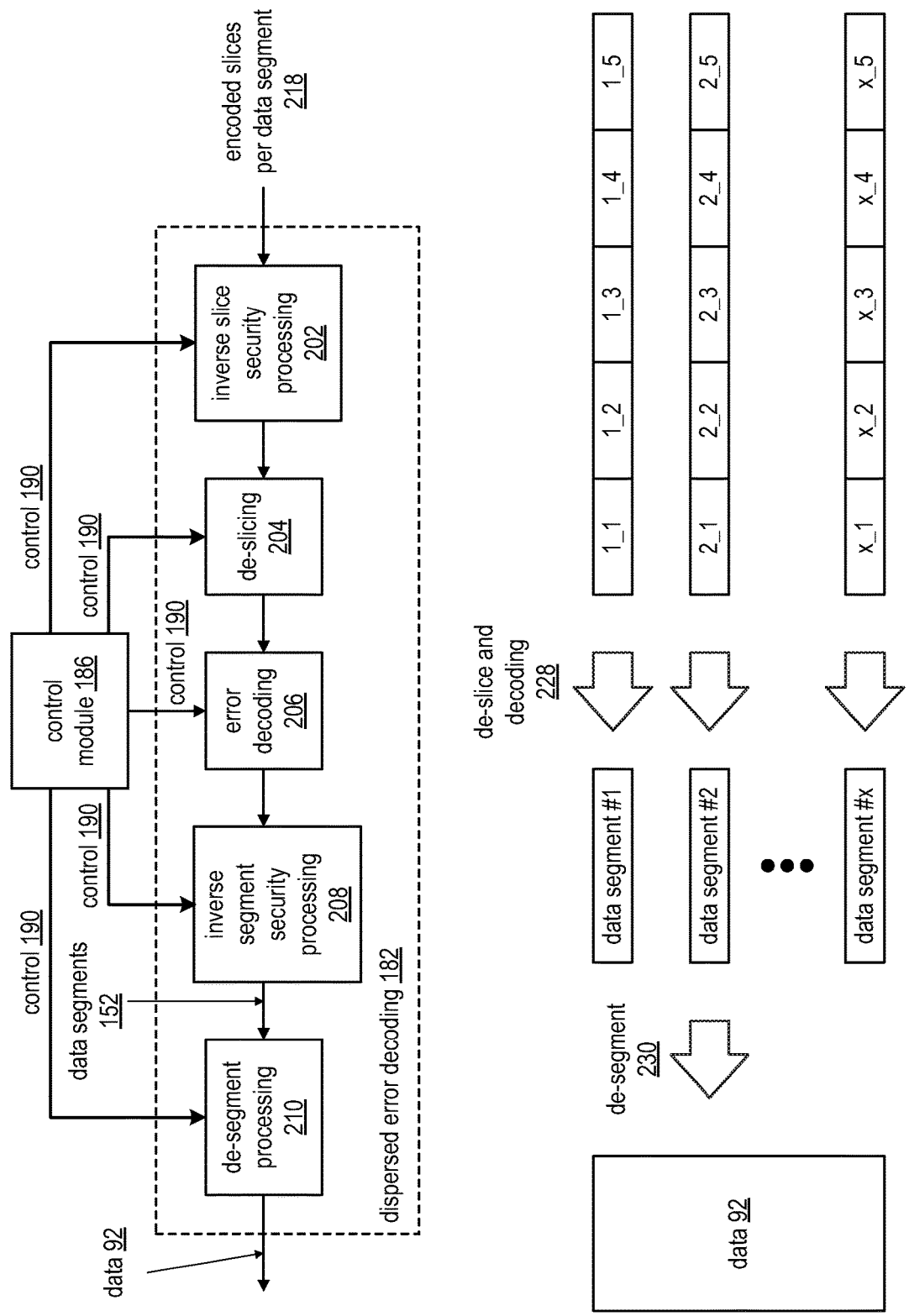
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
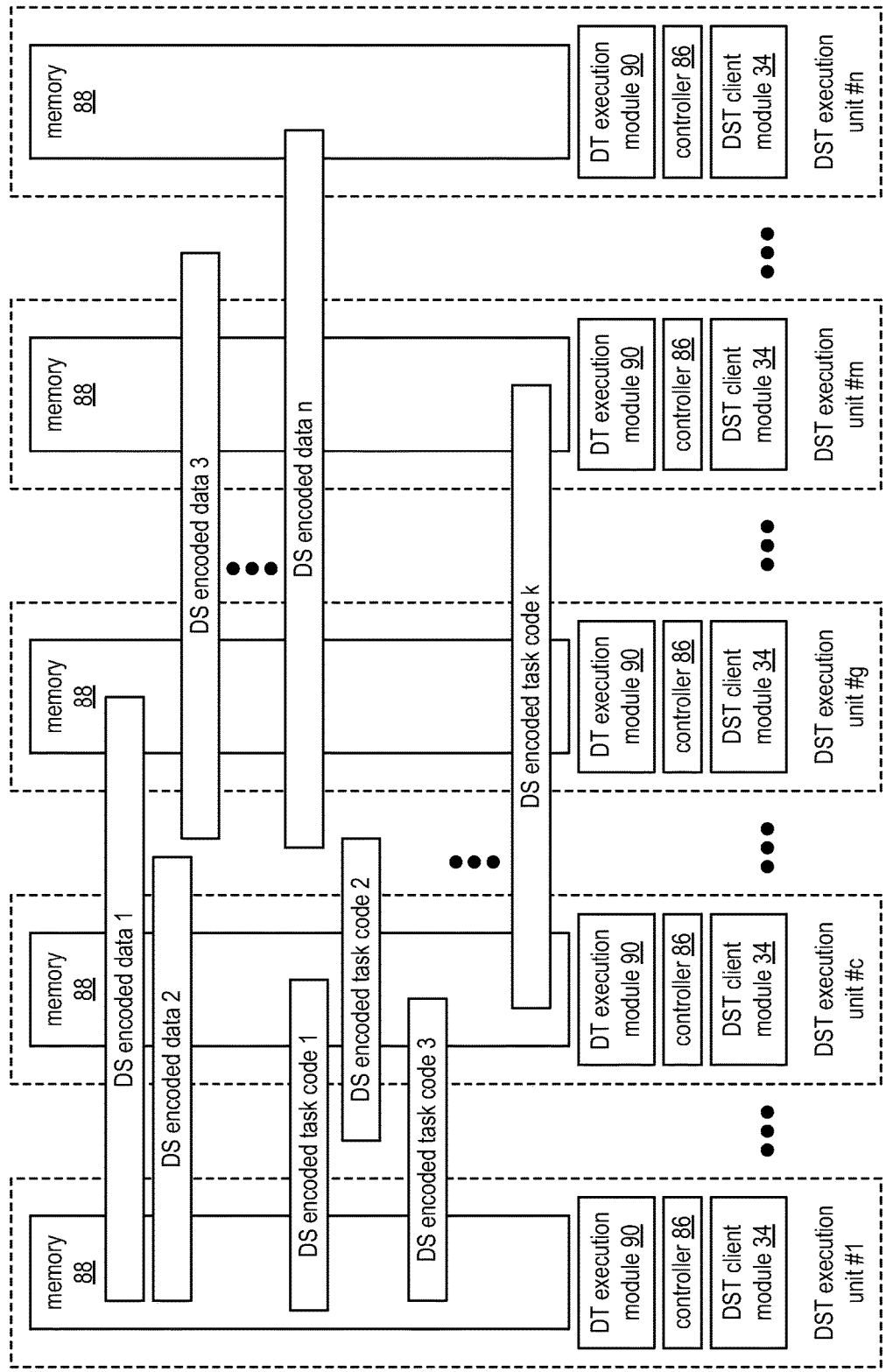
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
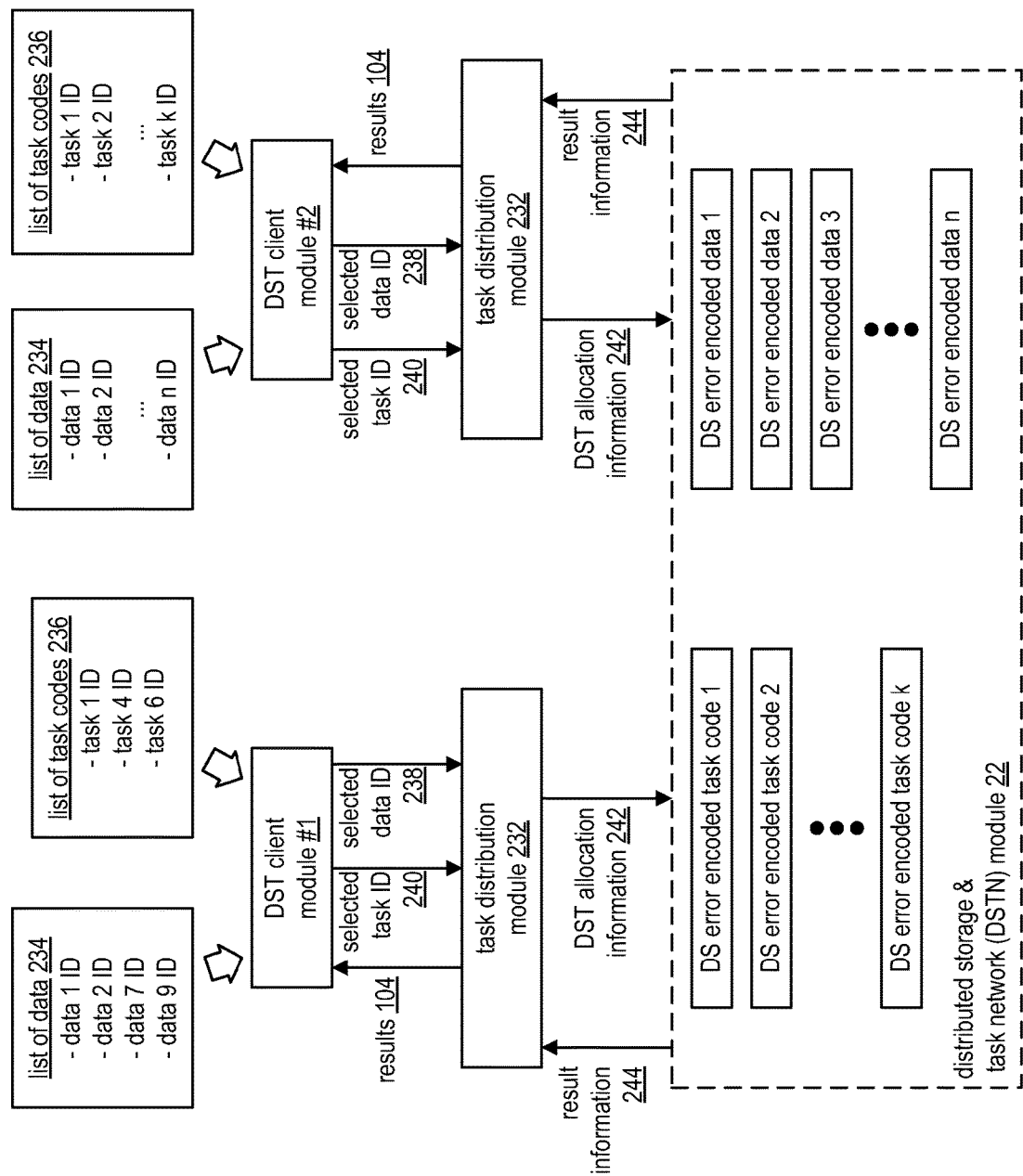
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
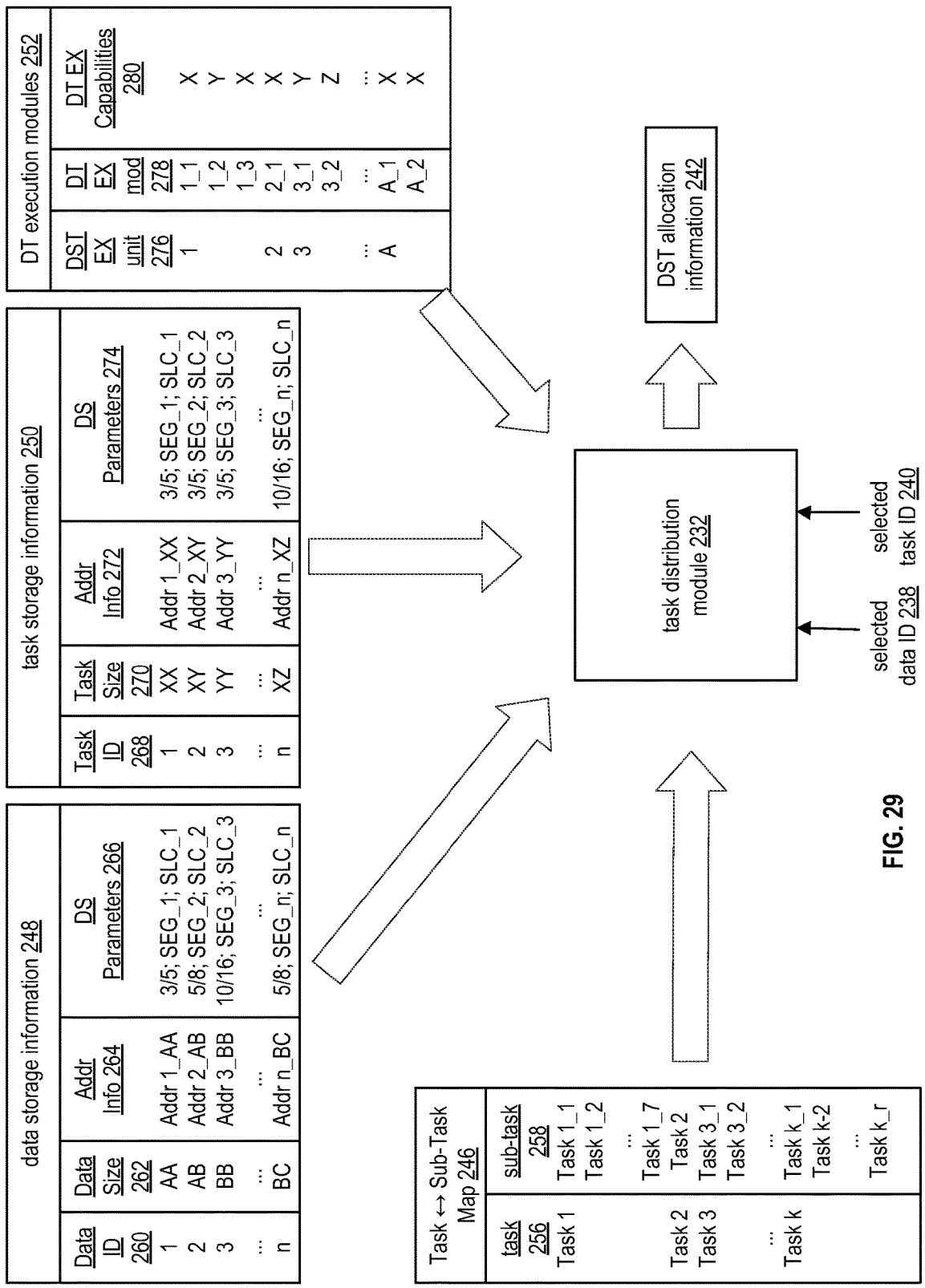
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
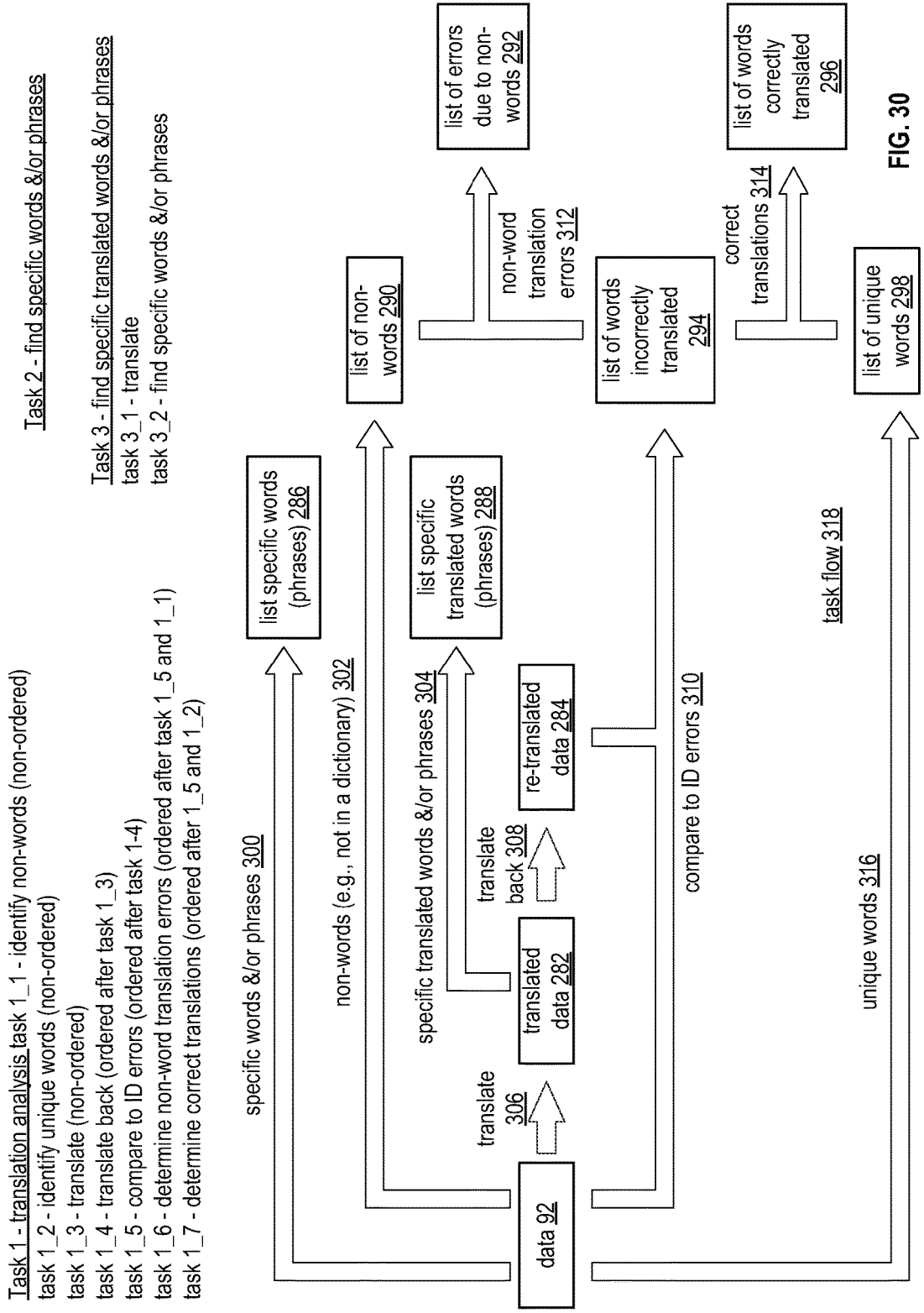
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
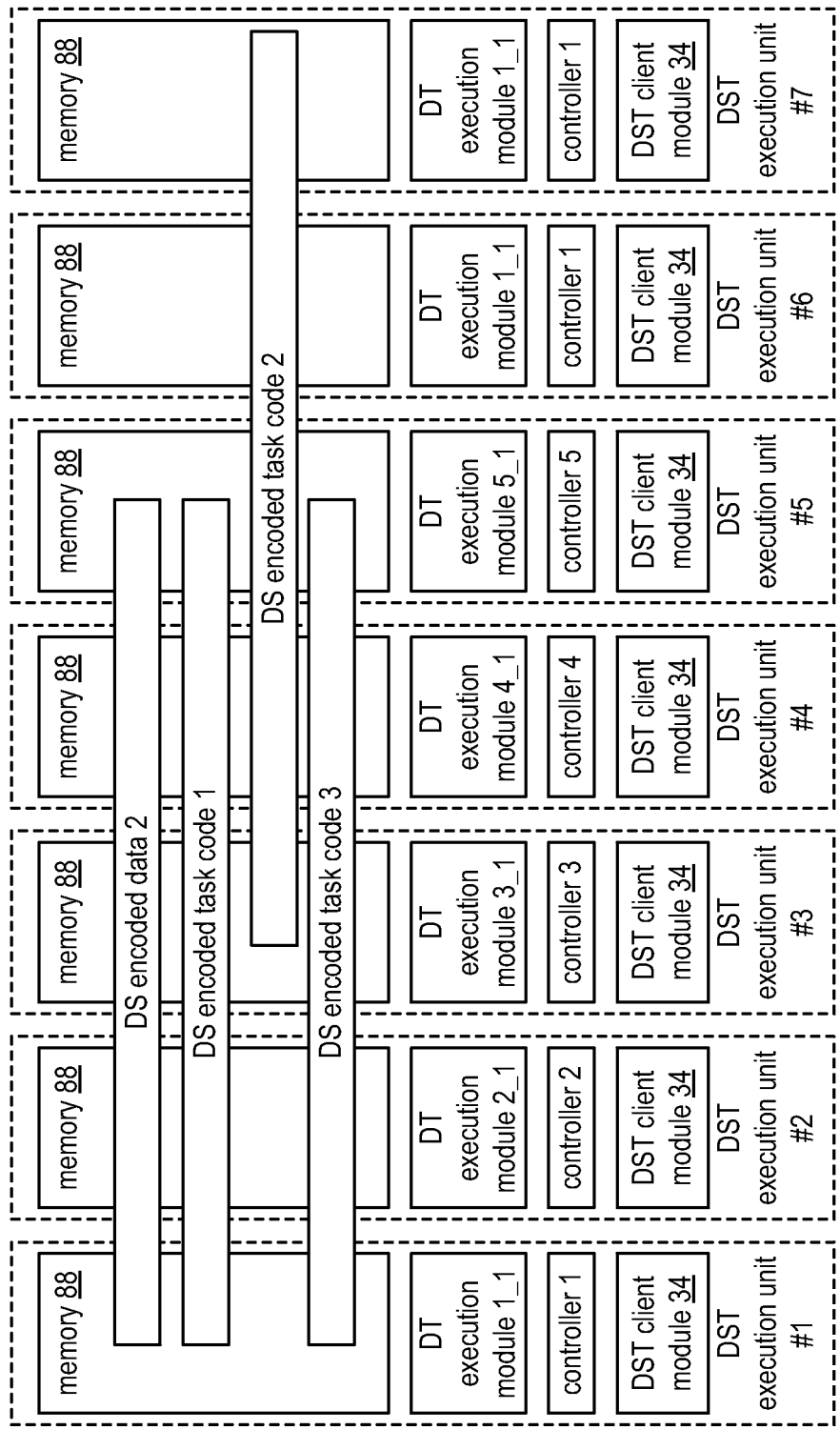
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
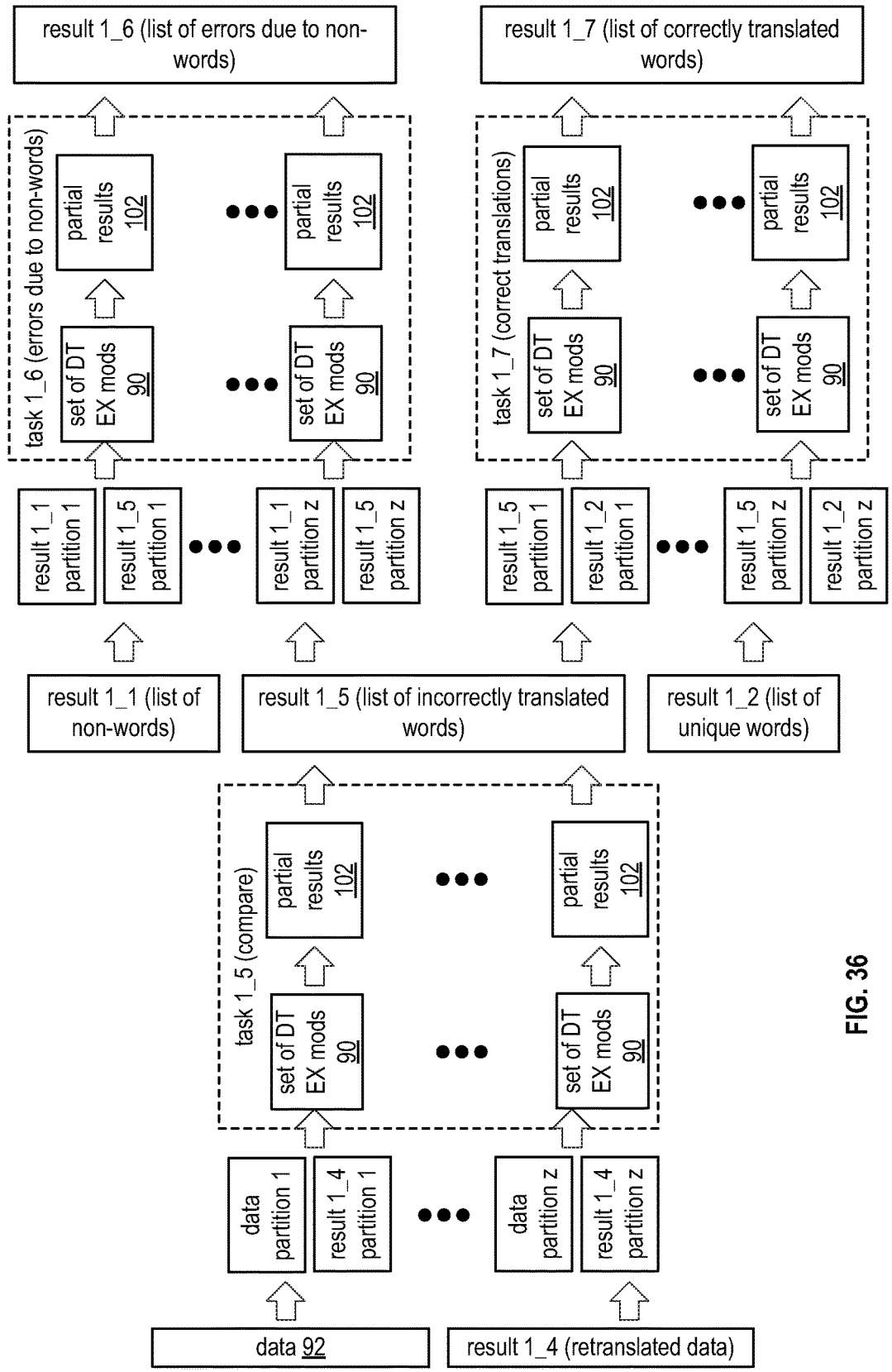

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2).

To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
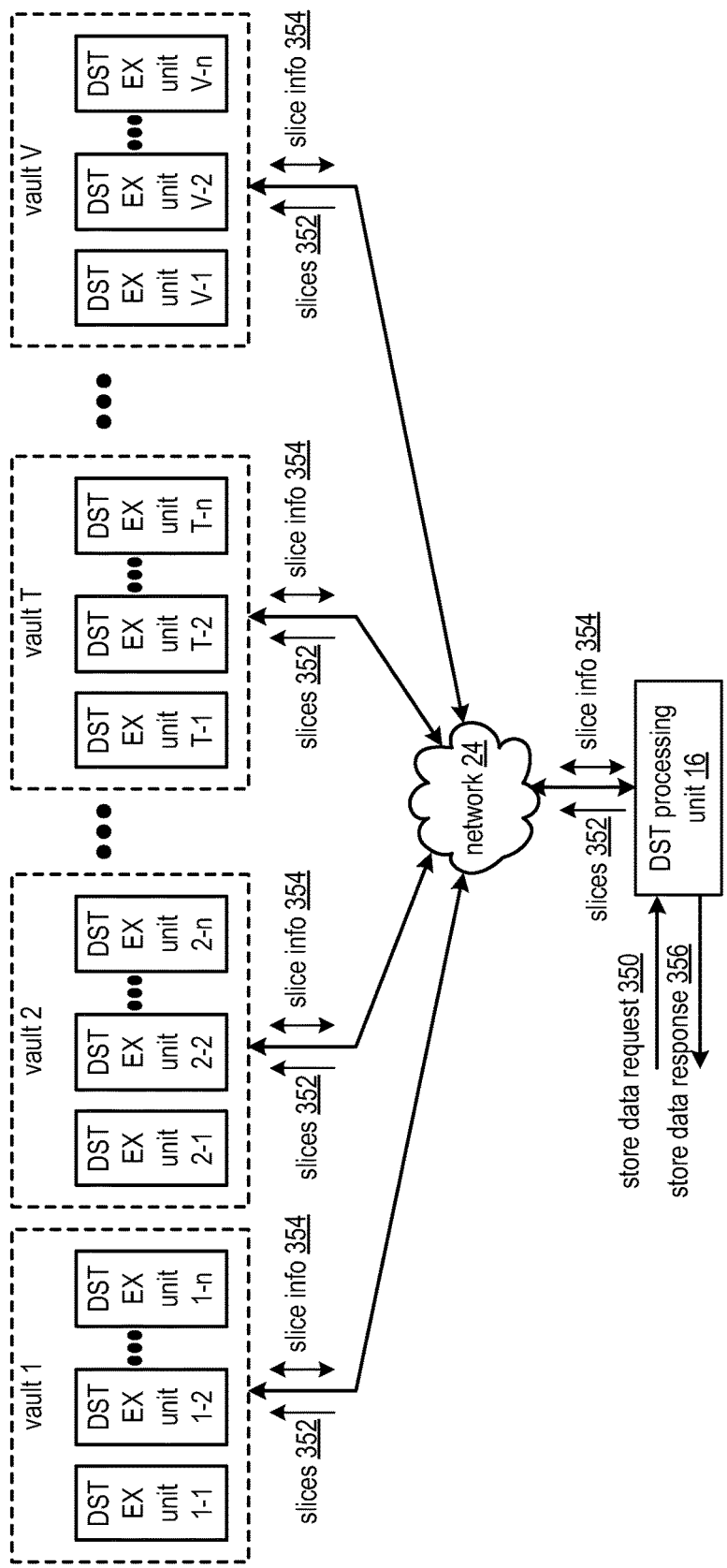
FIG. 40A is a schematic block diagram of a dispersed storage network in accordance with the present invention.

FIG. 40A is a schematic block diagram of a dispersed storage network (DSN) that includes a plurality of storage vaults, the network 24 of FIG. 1, and the distributed storage and task (DST) processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V-1 through V-n. Each DST execution unit may be implemented utilizing the DST execution unit 36 of FIG. 1.

The DSN functions to synchronize storage of newly stored data in the plurality of storage vaults. In an example of operation of the synchronous storage of the data, the DST processing unit 16 receives a store data request 350 from a requesting entity. The store data request 350 includes one or more of a data object for storage, metadata of the data object including one or more of a data identifier a data size indicator, an identifier of the requesting entity, a data type indicator, a data owner identifier, and a synchronization level indicator. Having received the store data request 350, the DST processing unit 16 identifies the plurality of storage vaults for storage of the data object. The identifying may be based on one or more of the metadata of the data object, an interpretation of system registry information, a predetermination, and an interpretation of a request. For example, the DST processing unit 16 identifies the storage vaults 1-V based on the identifier of the requesting entity.

Having identified the plurality of storage vaults, for each storage vault of the plurality of storage vaults, the DST processing unit 16 generates a corresponding plurality of sets of encoded data slices 352 in accordance with dispersal parameters associated with the storage vault. As a specific example, the DST processing unit 16 obtains the dispersal parameters for the storage vault, and when, the dispersal parameters are unique, dispersed storage error encodes the data object to produce another plurality of sets of encoded data slices 352.

Having produced the encoded data slices 352, for each storage vault of the plurality of storage vaults, the DST processing unit 16 initiates storage of the corresponding plurality of sets of encoded data slices 352. As a specific example, the DST processing unit 16 issues, via the network 24, one or more sets of write slice requests to a set of DST execution units associated with the storage vault, where the one or more sets of write slice requests includes the corresponding plurality of sets of encoded data slices 352. Having sent the encoded data slices 352 to the plurality of storage vaults for storage, the DST processing unit 16 receives, via the network 24, slice information 354 from at least some of the storage vaults. The slice information 354 includes one or more of a write slice response, a list slice request, a list slice response, a slice name, a slice revision number, a data object revision number, a slice revision number, a rollback write request, and a rollback write response.

Having received the slice information 354, the DST processing unit 16 interprets the received slice information 354 to determine how many storage vaults have successfully stored the corresponding plurality of sets of encoded data slices 352. As a specific example, for each storage vault slice information 354, the DST processing unit 16 determines whether the plurality of sets of encoded data slices have been successfully stored in at least a write threshold number of DST execution units associated with the storage vault. For instance, the DST processing unit 16 interprets write slice responses indicating success or failure of storage operations.

Having interpreted the slice information 354, when a vault threshold number (T) of storage vaults have successfully stored associated corresponding plurality of sets of encoded data slices, the DST processing unit 16 issues a store data response 356 to the requesting entity indicating successful storage and synchronization of the data. Alternatively, or in addition to, the DST processing unit 16 may abandon any storage retry process for storage of the data object in further storage vaults beyond the T number of storage vaults associated with the successful storage.

When a synchronization timeframe has expired and the number of storage vaults associated with successful storage is less than the vault threshold number, the DST processing unit 16 initiates a retry process to store the corresponding plurality of sets of encoded data slices in a storage vault associated with the unsuccessful storage. Alternatively, or in addition to, the DST processing unit 16 abandons the retry process for a particular storage vault in favor of continuing to wait and/or retry storage with other storage vaults.

Figure 40B:
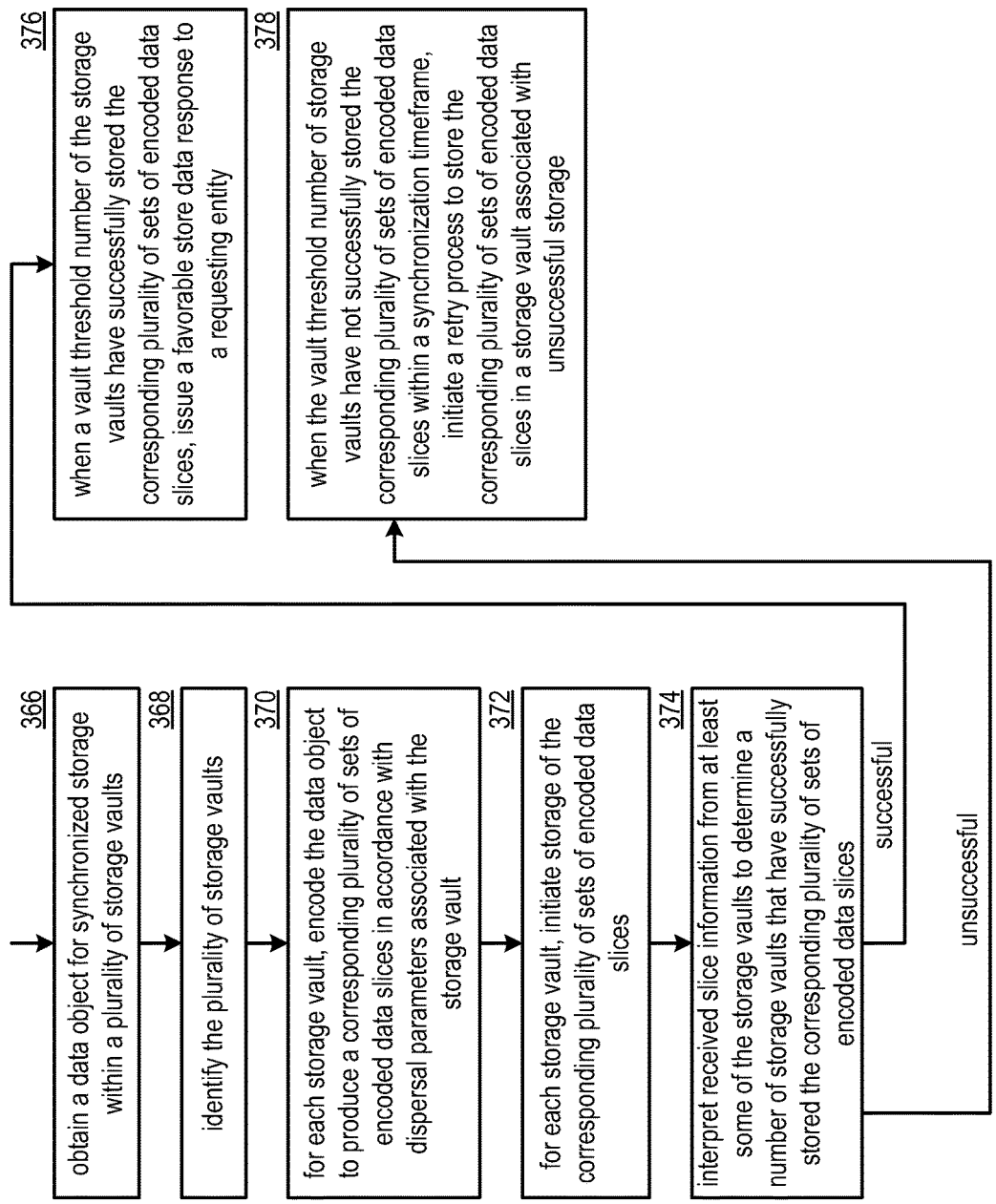
FIG. 40B is a flowchart illustrating an example of synchronizing storage of new data in a plurality of storage vaults in accordance with the present invention.

FIG. 40B is a flowchart illustrating an example of synchronizing storage of new data in a plurality of storage vaults. The method includes step 366 where a processing module (e.g., of a distributed storage and task (DST) processing unit) obtains a data object for synchronized storage within a plurality of storage vaults. The obtaining includes at least one of receiving the data object, generating the data object, and retrieving the data object. The method continues at step 368 where the processing module identifies the plurality of storage vaults. The identifying includes at least one of interpreting a request and interpreting system registry information.

For each storage vault, the method continues at step 370 where the processing module encodes the data object to produce a corresponding plurality of sets of encoded data slices in accordance with dispersal parameters associated with the storage vault. For example, the processing module determines the dispersal parameters associated with the storage vault and dispersed storage error encodes the data object using the dispersal parameters to produce the corresponding plurality of sets of encoded data slices.

For each storage vault, the method continues at step 372 where the processing module initiates storage of the corresponding plurality of sets of encoded data slices. For example, the processing module issues one or more sets of write slice requests to the storage vault, where the write slice requests includes the corresponding plurality of sets of encoded data slices. The method continues at step 374 where the processing module interprets received slice information from at least some of the storage vaults to determine a number of storage vaults that have successfully stored the corresponding plurality of sets of encoded data slices. For example, the processing module counts a number of storage vaults where each storage vault has successfully stored at least a write threshold number of encoded data slices of each set of encoded data slices of the corresponding plurality of sets of encoded data slices.

When a vault threshold number of storage vaults have successfully stored the corresponding plurality of sets of encoded data slices, the method continues at step 376 where the processing module issues a favorable store data response to a requesting entity. For example, the processing module generates the favorable store data response to indicate at least one of successful storage and synchronization, a number of storage vaults successfully stored, a number of storage vaults on successfully stored, and a number of vaults of unknown storage status.

Alternatively, when the vault threshold number of storage vaults have not successfully stored the corresponding plurality of sets of encoded data slices within a synchronization timeframe, the method continues at step 378 where the processing module initiates a retry process to store the corresponding plurality of sets of encoded data slices in a storage vault associated with unsuccessful storage. For example, the processing module identifies a storage vault associated with unsuccessful storage, identifies the storage vault for the retry process, and re-sends the corresponding plurality of sets of encoded data slices to the storage vault.

Figure 41A:
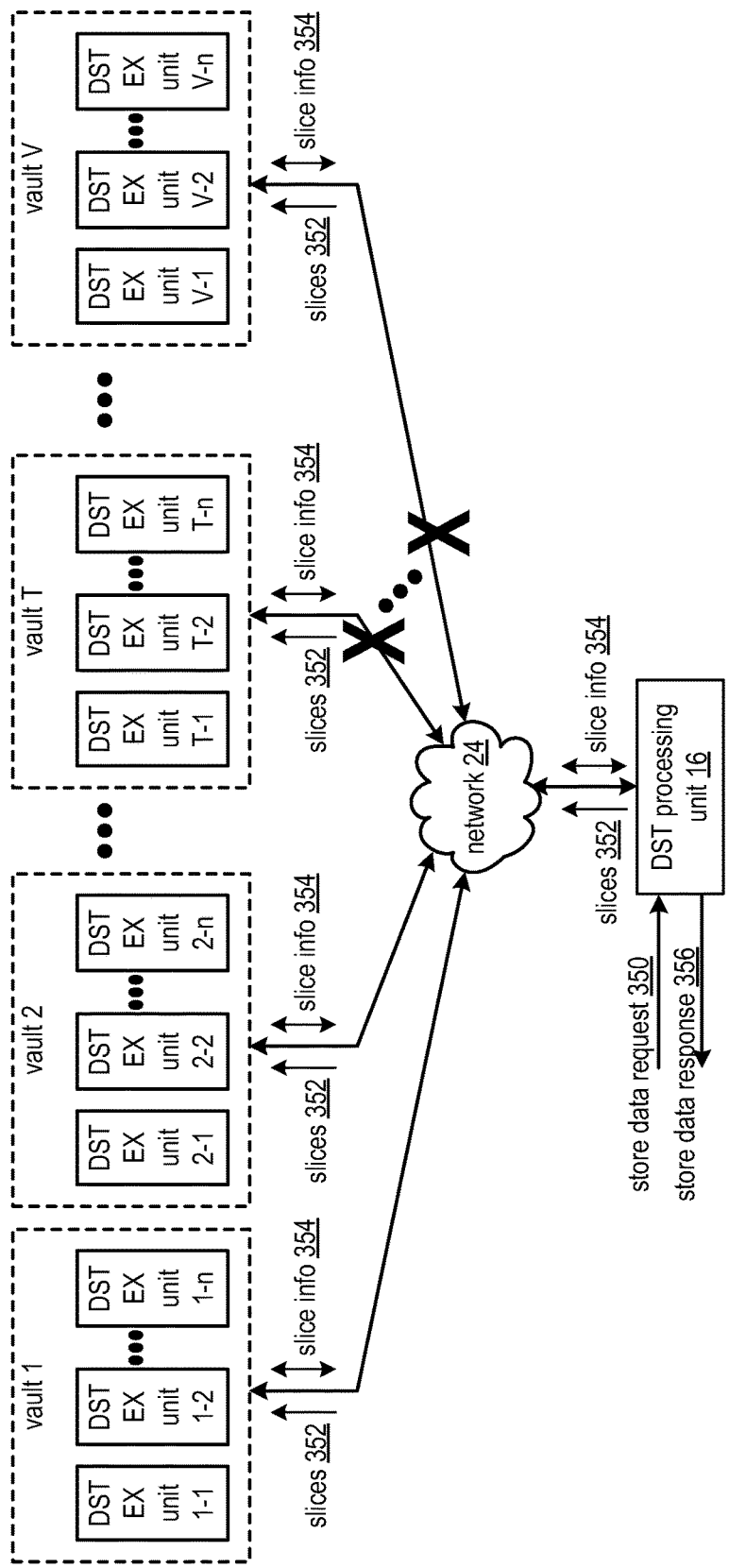
FIG. 41A is a schematic block diagram of another dispersed storage network in accordance with the present invention.

FIG. 41A is a schematic block diagram of another dispersed storage network (DSN) that includes a plurality of storage vaults, the network 24 of FIG. 1, and the distributed storage and task (DST) processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V-1 through V-n. Each DST execution unit may be implemented utilizing the DST execution unit 36 of FIG. 1.

The DSN functions to synchronize storage of newly stored data in the plurality of storage vaults. In an example of operation of the synchronous storage of the data, the DST processing unit 16 receives a store data request 350 from a requesting entity. The store data request 350 includes one or more of a data object for storage, metadata of the data object including one or more of a data identifier a data size indicator, an identifier of the requesting entity, a data type indicator, a data owner identifier, and a synchronization level indicator. Having received the store data request 350, the DST processing unit 16 identifies the plurality of storage vaults for storage of the data object. The identifying may be based on one or more of the metadata of the data object, an interpretation of system registry information, a predetermination, and an interpretation of a request. For example, the DST processing unit 16 identifies the storage vaults 1-V based on the identifier of the requesting entity.

Having identified the plurality of storage vaults, for each storage vault of the plurality of storage vaults, the DST processing unit 16 generates a corresponding plurality of sets of encoded data slices 352 in accordance with dispersal parameters associated with the storage vault. As a specific example, the DST processing unit 16 obtains the dispersal parameters for the storage vault, and when, the dispersal parameters are unique, dispersed storage error encodes the data object to produce another plurality of sets of encoded data slices 352.

Having produced the encoded data slices 352, for each storage vault of the plurality of storage vaults, the DST processing unit 16 initiates storage of the corresponding plurality of sets of encoded data slices. As a specific example, the DST processing unit 16 issues, via the network 24, one or more sets of write slice requests to a set of DST execution units associated with the storage vault, where the one or more sets of write slice requests includes the corresponding plurality of sets of encoded data slices 352. Having sent the encoded data slices to the plurality of storage vaults for storage, the DST processing unit 16 receives, via the network 24, slice information 354 from at least some of the storage vaults. The slice information 354 includes one or more of a write slice response, a list slice request, a list slice response, a slice name, a slice revision number, a data object revision number, a slice revision number, a rollback write request, and a rollback write response.

Having received the slice information 354, the DST processing unit 16 interprets the received slice information 354 to determine how many storage vaults have successfully stored the corresponding plurality of sets of encoded data slices. As a specific example, for each storage vault slice information 354, the DST processing unit 16 determines whether the plurality of sets of encoded data slices 352 have been successfully stored in at least a write threshold number of DST execution units associated with the storage vault. For instance, the DST processing unit 16 interprets write slice responses indicating success or failure of storage operations.

When the vault threshold number of storage vaults have not yet successfully stored the corresponding plurality of sets of encoded data slices within a synchronization timeframe, the DST processing unit 16 initiates a rollback process to abandon storing the data object in the plurality of storage vaults. As a specific example, the DST processing unit 16 issues, via the network 24, rollback requests to each storage vault to facilitate deletion of the plurality's of sets of encoded data slices.

Having issued the rollback request, the DST processing unit 16 generates a store data response 356 to indicate unsuccessful synchronize storage of the data object in the plurality of storage vaults. As a specific example, the DST processing unit 16 generates the store data response 356 to include an indicator of which storage vaults were unsuccessful and to include a root cause indicator for the unsuccessful storage. For instance, if one error indicated unable_to_communicate, and another error indicated invalid_credentials, then the invalid_credentials error would be returned to the requesting entity, as it provides more specific information about the error condition and about how it might be resolved. As such, each error message may be given a "specificity score" which can be used to evaluate and determine which error indicator to be returned. Having generated the store data response, the DST processing unit 16 sends the store data response 356 to the requesting entity.

Figure 41B:
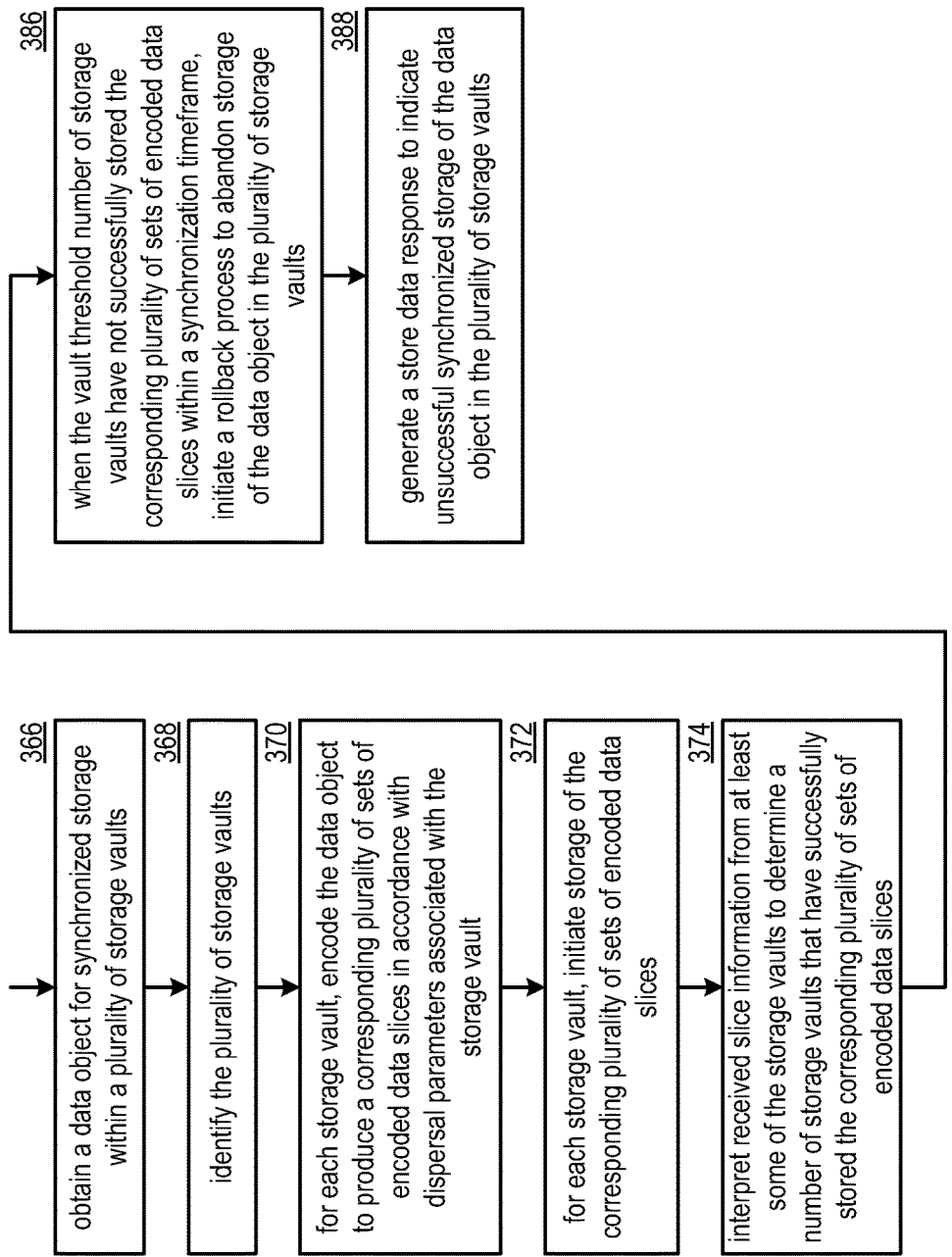
FIG. 41B is a flowchart illustrating another example of synchronizing storage of new data in a plurality of storage vaults in accordance with the present invention.

FIG. 41B is a flowchart illustrating another example of synchronizing storage of new data in a plurality of storage vaults, which includes similar steps to FIG. 40A. The method includes the steps 366-374 of FIG. 40A where a processing module (e.g., of a distributed storage and task (DST) processing unit) obtains a data object for synchronized storage within a plurality of storage vaults, identifies the plurality of storage vaults, encodes the data object for each storage vault to produce a corresponding plurality of sets of encoded data slices in accordance with dispersal parameters associated with the storage vault, initiates storage for each storage vault of the corresponding plurality of sets of encoded data slices, and interprets received slice information from at least some of the storage vaults to determine a number of storage vaults that have successfully stored the corresponding plurality of sets of encoded data slices.

When the vault threshold number of storage vaults have not successfully stored the corresponding plurality of sets of encoded data slices within a synchronization timeframe, the method continues at step 386 where the processing module initiates a rollback process to abandon storage of the data object in the plurality of storage vaults. For example, the processing module issues rollback requests to each storage vault of a plurality of storage vaults to facilitate deletion of the corresponding plurality of sets of encoded data slices.

The method continues at step 388 where the processing module generates a store data response to indicate unsuccessful synchronized storage of the data object in the plurality of storage vaults. For example, the processing module identifies one or more storage vaults associated with the unsuccessful storage, and for each, identifies one or more read causes associated with the unsuccessful storage, generates the store data response to include the identities of the one or more storage vaults associated with the unsuccessful storage, and, for each storage vault, the identified one or more causes, and sends the store data response to a requesting entity.

FIGS. 42A-B are schematic block diagrams of another dispersed storage network that includes that includes the distributed storage and task (DST) processing unit 16 of FIG. 1, the network 24 of FIG. 1, and a plurality of storage units, where the plurality of storage units support a plurality of virtual storage vaults 1-V. A first virtual storage vault of the plurality of virtual storage vaults is supported by a first set of storage units (e.g., SU 1-1 through 1-*n*) of the plurality of storage units, where the first set of storage units is a sub-set of the plurality of storage units. Each storage unit may be implemented utilizing the DST execution unit 36 of FIG. 1. The DSN functions to synchronize storage of data copies in the plurality of storage vaults.

FIG. 42A illustrates steps of an example of operation of the synchronizing of the storage of the data copies in the DSN where the DST processing unit 16 receives a store data request from a requesting entity. The store data request includes one or more of a data object 457 for storage, metadata of the data object including one or more of a data identifier a data size indicator, an identifier of the requesting entity, a data type indicator, a data owner identifier, and a synchronization level indicator. Having received the store data request, the DST processing unit 16 selects at least some of the plurality of virtual storage vaults for storage of the data object 457. The selecting may be based on one or more of the metadata of the data object, an interpretation of system registry information, a predetermination, and an interpretation of a request. For example, the DST processing unit 16 selects the storage vaults 1-T based on the identifier of the requesting entity and a requirement to store a threshold number (e.g., T) of copies of the data object.

Having selected the virtual storage vaults 1-T, for each virtual storage vault of the selected the virtual storage vaults, the DST processing unit 16 generates a corresponding plurality of sets of encoded data slices in accordance with dispersal parameters associated with the virtual storage vault. As a specific example, the DST processing unit 16 obtains the dispersal parameters for the storage vault from system registry information, and when, the dispersal parameters are unique, dispersed storage error encodes the data object to produce another plurality of sets of encoded data slices. As another specific example, the DST processing unit 16 dispersed storage error encodes the data object 457 using a common set of dispersal parameters to produce one plurality of sets of encoded data slices.

Having produced the encoded data slices, for each virtual storage vault of the selected virtual storage vaults, the DST processing unit 16 initiates storage of the corresponding plurality of sets of encoded data slices. As a specific example, the DST processing unit 16 issues, via the network 24, one or more sets of write slice requests to storage units 1-1 through 1-*n*, where the one or more sets of write slice requests includes the corresponding plurality of sets of encoded data slices 1-*n*. Having sent the encoded data slices to the selected virtual storage vaults for storage, the DST processing unit 16 receives, via the network 24, storage confirmation information from at least some of the selected virtual storage vaults. The storage confirmation information includes one or more of a write slice response, a list slice request, a list slice response, a slice name, a slice revision number, a data object revision number, a slice revision number, a rollback write request, and a rollback write response. For example, the DST processing unit 16 receives, via the network 24, storage confirmation information 1, 3-T from storage units of the corresponding virtual storage vaults 1, 3-T indicating that responding plurality of sets of encoded data slices 1-*n* have been successfully stored in the selected virtual storage vaults 1, 3-T.

Having received the storage confirmation information, the DST processing unit 16 interprets the received storage confirmation information to identify a storage vault that has not yet successfully stored a corresponding plurality of sets of encoded data slices within a storage time frame. The identifying includes one or more of interpreting storage confirmation information from virtual storage vaults associated with successful storage and receiving an unsuccessful storage indication. For example, the DST processing unit 16 indicates that virtual storage vault 2 has not stored the corresponding plurality of sets of encoded data slices 1-*n* within the storage timeframe when not receiving favorable storage confirmation information 2 from the storage units of the virtual storage vault 2.

Having identified the storage vault that has not yet successfully stored the corresponding plurality of sets of encoded data slices, the DST processing unit 16 updates an entry within a synchronization queue to associate the data object with the storage vault. As a specific example of the updating, the DST processing unit 16 creates a queue 2 (QUE2) entry that includes one or more of the data object 457, the data object identifier (ID), identity of the storage vault 2 associated with the unsuccessful storage, identity of another storage vault associated with successful storage, an identifier associated with storage of the data object in the identified other storage vault associated with the successful storage; and stores the entry in the synchronization queue within the memory 88 and/or within a synchronization queue structure within one or more storage vaults (e.g., the entry is encoded to produce entry slices for storage in a virtual storage vault associated with successful storage). Having updated the entry within the synchronization queue the DST processing unit 16 may issue a store data response to the requesting entity, where the store data response includes at least a portion of the entry.

FIG. 42B illustrates further steps of the example of operation of the synchronizing of the storage of the data copies in the DSN where, when the virtual storage vault that was unsuccessful in storing the plurality of sets of encoded data slices becomes available, the DST processing unit 16 facilitates storage of the data object in the virtual storage vault. The facilitating includes the DST processing unit 16 issuing, to at least some of the plurality of storage units, a transfer request to request to transfer a copy of a set of encoded data slices. For example, the DST processing unit 16 issues, via the network 24, the transfer request 1-*n*, where the DST processing unit 16 issues a first portion that includes a transfer request 1-9 (e.g., to transfer slices 1-9) to the virtual storage vault 1, and a second portion that includes a transfer request 10-*n* (e.g., to transfer slices 10-*n*) to the virtual storage vault 3.

At least some of the plurality of storage units receives a request to transfer a copy of the set of encoded data slices from two or more source virtual storage vaults of the plurality of virtual storage vaults to a destination virtual storage vault (e.g., virtual storage vault 2) of the plurality of storage vaults, where a data segment of the data is dispersed storage error encoded to produce the set of encoded data slices. The at least some of the plurality of storage units may include the storage units associated with the two or more source virtual storage devices and the storage units associated with the destination virtual storage vault.

The at least some of the plurality of storage units may receive the request to transfer the copy of the set of encoded data slices in accordance with a variety of transfer approaches. A first transfer approach includes receiving the request to transfer in response to a determination that the destination virtual storage vault failed a write request regarding the copy of the set of encoded data slices, where the write request is an instruction to write the copy of the set of encoded data slices to each of the two or more source virtual storage vaults and to the destination virtual storage vault. For example, the virtual storage vaults 1 and 3 received the request to transfer the copy of the set of encoded data slices when the write requests to the virtual storage vault 2 failed.

A second transfer approach includes receiving the request to transfer as part of the write request to write the copy of the set of encoded data slices to each of the two or more source virtual storage vaults and to the destination virtual storage vault, where a first portion of the write request writes the respective sub-sets of encoded data slices to the storage units supporting the two or more source virtual storage vaults and a second portion to transfer the copy of the sets of encoded data slices to the storage units supporting the destination virtual storage unit. For example, slices of the set of encoded data slices are written to the virtual storage vault 4 and copies of the set of encoded data slices are copied from the virtual storage vault 4 to at least one other virtual storage vault.

Having received the request to transfer the copy, each storage unit of the at least some of the plurality of storage units obtains a slice transfer map that, for the set of encoded data slices, identifies the two or more source virtual storage vaults. The obtaining the slice transfer map includes one or more of receiving the slice transfer map, retrieving the slice transfer map from memory, and generating the slice transfer map based on the request to transfer. For example, the DST processing unit 16 retrieves the slice transfer map from the memory 88 and sends, via the network 24, the slice transfer map to the virtual storage vaults 1-3, where the slice transfer map indicates that virtual storage vault 1 is to provide slices 1-9 to the virtual storage vault 2 and the virtual storage vault 3 is to provide slices 10-n to the virtual storage vault 2. The slice transfer map may indicate any combination of transferring of slices from any storage unit of any virtual storage vault to the destination virtual storage vault.

Having obtained the slice transfer map, each storage unit of the at least some of the plurality of storage units determines whether the storage unit supports one of the two or more source virtual storage vaults. For example, the virtual storage vault 1 and interprets the obtains slice transfer map to identify slice names associated with encoded data slices of the set of encoded data slices for transfer and to associate the slice names with the virtual storage vault 1.

For each supporting storage unit that supports one of the two or more source virtual storage vaults, each supporting storage unit determines, based on the slice transfer map, a sub-set of encoded data slices of the set of encoded data slices that is stored within the one of the two or more source virtual storage vaults by the each supporting storage unit. For example, the virtual storage vault 1 identifies slices 1-9 as the sub-set of encoded data slices of the set of encoded data slices that are stored within the virtual storage vault 1.

Having determined the sub-set of encoded data slices, each supporting storage unit sends the sub-set of encoded data slices to a corresponding storage unit of the plurality of storage units that is supporting the destination virtual storage vault. The sending the sub-set of encoded data slices includes a variety of sending approaches. A first sending approach includes sending, by a first supporting storage unit, a first encoded data slice to a first corresponding storage unit of the plurality of storage units that is supporting the destination virtual storage vault (e.g., storage unit 1-1 sends, via the network 24, encoded data slice 1 to storage unit 2-1), sending, by a second supporting storage unit, a second encoded data slice to a second corresponding storage unit of the plurality of storage units that is supporting the destination virtual storage vault (e.g., storage unit 1-2 sends, via the network 24, encoded data slice 2 to storage unit 2-2), sending, by a third supporting storage unit, a third encoded data slice to a third corresponding storage unit of the plurality of storage units that is supporting the destination virtual storage vault (e.g., storage unit 1-3 sends, via the network 24, encoded data slice 3 to storage unit 2-3), and sending, by a fourth supporting storage unit, a fourth encoded data slice to a fourth corresponding storage unit of the plurality of storage units that is supporting the destination virtual storage vault (e.g., storage unit 1-4 sends, via the network 24, encoded data slice 4 to storage unit 2-4).

A second sending approach of the sending the sub-set of encoded data slices includes sending, by a first supporting storage unit, a first and a second encoded data slice to a first corresponding storage unit of the plurality of storage units that is supporting the destination virtual storage vault (e.g., storage unit 1-1 sends, via the network 24, encoded data slices 1A and 1B to storage unit 2-1), and sending, by a second supporting storage unit, a third encoded data slice to a second corresponding storage unit of the plurality of storage units that is supporting the destination virtual storage vault (e.g., storage unit 1-2 sends, via the network 24, encoded data slice 2A to storage unit 2-2).

Having received one or more encoded data slices of the copy of encoded data slices, each of the corresponding storage units of the plurality of storage units that is supporting the destination virtual storage vault changes DSN addresses of the encoded data slices of the copy of encoded data slices to reflect that the copy is stored in the destination virtual storage vault. For example, storage unit 2-1 changes a slice name (e.g., DSN address) of the received encoded data slice 1 to replace a vault identifier associated with the virtual storage vault 1 to a vault identifier associated with the virtual storage vault 2.

Having stored the copy of the encoded data slices in the destination virtual storage vault, the DST processing unit 16 updates a slice storage table to include the DSN addresses of the encoded data slices stored in the destination virtual storage vault. For example, the DST processing unit 16 receives, via the network 24, storage confirmation information 2 from the storage units of the virtual storage vault 2, where the storage confirmation information 2 includes the DSN addresses of the encoded data slices stored in the destination virtual storage vault.

FIG. 42C is a flowchart illustrating another example of synchronizing storage of data copies. In particular, a method is presented for use in conjunction with one or more functions and features described in conjunction with FIGS. 1-39, 42A-B, and also FIG. 42C. The method includes step 400 where, in a dispersed storage network (DSN) that includes a plurality of storage units, where the plurality of storage units support a plurality of virtual storage vaults, where a first virtual storage vault of the plurality of virtual storage vaults is supported by a first set of storage units of the plurality of storage units, and where the first set of storage units is a sub-set of the plurality of storage units, at least some of the plurality of storage units receives a request to transfer a copy of a set of encoded data slices from two or more source virtual storage vaults of the plurality of virtual storage vaults to a destination virtual storage vault of the plurality of storage vaults, where a data segment of data is dispersed storage error encoded to produce the set of encoded data slices. The at least some of the plurality of storage units may include the storage units associated with the two or more source virtual storage devices and the storage units associated with the destination virtual storage vault.

The receiving of a request to transfer includes a variety of receiving approaches. A first receiving approach includes receiving the request to transfer in response to a determination that the destination virtual storage vault a failed write request regarding the copy of the set of encoded data slices, where the write request is an instruction to write the copy of the set of encoded data slices to each of the two or more source virtual storage vaults and to the destination virtual storage vault. A second receiving approach includes receiving the request to transfer as part of a write request to write the copy of the set of encoded data slices to each of the two or more source virtual storage vaults and to the destination virtual storage vault, where a first portion of the write request writes the respective sub-sets of encoded data slices to the storage units supporting the two or more source virtual storage vaults and a second portion to transfer the copy of the sets of encoded data slices to the storage units supporting the destination virtual storage unit.

The method continues at step 402 where each storage unit of the at least some of the plurality of storage units obtains a slice transfer map that, for the set of encoded data slices, identifies the two or more source virtual storage vaults. The obtaining the slice transfer map includes one or more of receiving the slice transfer map, retrieving the slice transfer map from memory, and generating the slice transfer map based on the request to transfer.

The method continues at step 404 where each storage unit of the at least some of the plurality of storage units determines whether the each storage unit supports one of the two or more source virtual storage vaults (e.g., identifies an association with the set of encoded data slices). For each supporting storage unit that supports one of the two or more source virtual storage vaults, the method continues at step 406 where the each supporting storage unit determines, based on the slice transfer map, a sub-set of encoded data slices of the set of encoded data slices that is stored within the one of the two or more source virtual storage vaults by the each supporting storage unit (e.g., identify encoded data slices that the supporting storage unit is responsible for copying to the destination virtual storage vault).

The method continues at step 408 where each supporting storage unit sends the sub-set of encoded data slices to a corresponding storage unit of the plurality of storage units that is supporting the destination virtual storage vault. The sending the sub-set of encoded data slices includes a variety of sending approaches. A first sending approach includes sending, by a first supporting storage unit, a first encoded data slice to a first corresponding storage unit of the plurality of storage units that is supporting the destination virtual storage vault, sending, by a second supporting storage unit, a second encoded data slice to a second corresponding storage unit of the plurality of storage units that is supporting the destination virtual storage vault, sending, by a third supporting storage unit, a third encoded data slice to a third corresponding storage unit of the plurality of storage units that is supporting the destination virtual storage vault, and sending, by a fourth supporting storage unit, a fourth encoded data slice to a fourth corresponding storage unit of the plurality of storage units that is supporting the destination virtual storage vault.

A second sending approach of the sending the sub-set of encoded data slices includes sending, by a first supporting storage unit, a first and a second encoded data slice to a first corresponding storage unit of the plurality of storage units that is supporting the destination virtual storage vault and sending, by a second supporting storage unit, a third encoded data slice to a second corresponding storage unit of the plurality of storage units that is supporting the destination virtual storage vault.

The method continues at step 410 where each of the corresponding storage units of the plurality of storage units that is supporting the destination virtual storage vault changes DSN addresses of the encoded data slices of the copy of encoded data slices to reflect that the copy is stored in the destination virtual storage vault (e.g., change a vault identifier from a source virtual storage vault to the destination virtual storage vault). The method continues at step 412 where each of the corresponding storage units of the plurality of storage units that is supporting the destination virtual storage vault updates a slice storage table to include the DSN addresses of the encoded data slices stored in the destination virtual storage vault.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

FIG. 43A is a schematic block diagram of another dispersed storage network (DSN) that includes a set of distributed storage and task (DST) execution (EX) units and the network 24 of FIG. 1. The set of DST execution units includes an information dispersal algorithm (IDA) width number of DST execution units. For example, the set of DST execution units includes DST execution units 1-5 when the IDA width is 5. Each DST execution unit includes two or more memories, where each memory is associated with a unique memory location. For example, each DST execution unit includes four memories associated with memory locations L1-L4. Such a memory location includes at least one of a physical location within an equipment housing associated with the DST execution unit. The unique memory location may further include one or more distinguishing traits including one or more of a memory manufacturer identifier, a model number, a serial number, a time of manufacture, a software revision number, a memory age, a number of hours of operation, a historical failure record, an availability performance level, an expected meantime between failure metric, and an expected meantime to replacement metric. Each memory may be implemented utilizing the memory 88 of FIG. 3. Each DST execution unit may be implemented utilizing the DST execution unit 36 of FIG. 1.

The DSN functions to associate the memories (e.g., physical storage) with virtual addressing (e.g., a DSN address range or slice name range) utilized within the DSN in accordance with a selection approach to provide a system enhancement. A selected set of physical memories are mapped to a common DSN address range to facilitate access of encoded data slices stored in the set of selected memories, where the encoded data slices are associated with slice names that fall within the common DSN address range.

In an example of operation of the associating of the virtual addressing with selection of physical memories, a DST execution unit of the set of DST execution units detects a particular DSN address range (e.g., range 1) to be mapped to a physical memory location within a DST execution unit. The detecting includes at least one of interpreting system registry information, receiving a DSN address range assignment request, interpreting a DSN address range to memory location table to indicate that the DSN address range is unmapped, interpreting an error message, and determining to reallocate a mapping of the DSN address range from a current memory location association to a new memory location association.

One or more DST execution units of the set of DST execution units coordinates with the set of DST execution units the selection of a physical memory in each of the DST execution units of the set of DST execution units for the DSN address range in accordance with a selection approach to produce mapping information 420. The selection approaches includes at least one of a random approach, a minimize estimated correlated memory errors approach, and a selecting diverse memory types approach. The one or more DST execution units choose the selection approach based on one or more of a storage reliability level goal, historical storage reliability levels, and interpretation of system registry information, a predetermination, and an interpretation of an error message. For example, DST execution unit 2 chooses the selection approach to be the random approach on behalf of the set of DST execution units based on interpreting the system registry information.

The DST execution units perform the coordinating by exchanging, via the network 24, mapping information. The mapping information 420 includes a slice name range associated with a memory location. For example, the one or more DST execution units randomly selects memory locations when the selection approaches includes the random approach. As another example, the one or more DST execution units select memory locations to maximize differences in physical memory locations when the approach is selecting the diverse memory types. For instance, memory location 3 is selected for DST execution unit 1 (e.g., an associated memory is located within a middle of a memory rack), memory location 1 is selected for DST execution unit 2 (e.g., an associated memory is located on a left end of a memory rack), memory location 2 is selected for DST execution unit 3 (e.g., an associated memory is located off-center from the middle of a memory rack), memory location 4 is selected for DST execution unit 4 (e.g., an associated memory is located on a write end of a memory rack), and memory location 2 is selected for DST execution unit 5 (e.g., an associated memory is located off-center from the middle of a memory rack).

Having coordinating the selection of the physical memory locations, each DST execution unit updates a local DSN address to memory location table based on the mapping information 420. For example, DST execution unit 4 identifies a portion of the DSN address range associated with the DST execution unit 4 and updates a DSN address range to memory location table to associate the portion of the DSN address range with the corresponding memory location 4. As another example, the DST execution unit 4, for each sub-portion of the remaining portion of the DSN address range, identifies a corresponding other DST execution unit and associates the corresponding other DST execution unit with the sub-portion of the DSN address range to memory location table (e.g., DST execution unit 1 is associated with memory location 3, DST execution unit 2 is associated with memory location 1, DST execution unit 2 is associated with memory location 2, and DST execution unit 5 is associated with memory location 2.

Having updated the local DSN address range to memory location table, each DST execution unit utilizes the local DSN address range to memory location table when processing a subsequent slice access request that includes a slice name within the DSN address range. For example, DST execution unit 5 receives a slice access request that includes a slice name of the common DSN address range 1, accesses the local DSN address range to memory location table to identify memory location 2 as associated with the common DSN address range 1, and accesses an encoded data slice of the slice name within the memory location 2.

FIG. 43B is a flowchart illustrating an example of associating virtual addressing with physical storage. The method includes step 424 where a processing module of a plurality of processing modules (e.g., of a storage unit of a plurality of storage units) identifies a DSN address range to be mapped to a physical memory location within a storage unit of a set of storage units. The identifying includes at least one of interpreting system registry information, receiving a DSN address range assignment request, detecting that the DSN address range is unmapped, and determining to reallocate mapping of the DSN address range.

The method continues at step 426 where at least some storage units of the set of storage units coordinates selection of the physical memory location to be mapped to the DSN address range in accordance with a selection approach to produce mapping information. For example, the storage units exchange mapping information to provide the coordination. As another example, the storage units choose the selection approach and choose the physical memory location in accordance with the chosen selection approach.

The method continues at step 428 where each storage unit updates a local DSN address range to memory location table based on the mapping information. For example, the processing module identifies a portion of the DSN address range associated with a corresponding storage unit, updates the DSN address range to memory location table to associate the portion of the DSN address range with a corresponding memory location of the mapping information, and associates other sub-portions with other storage units of the set of storage units.

The method continues at step 430 where the storage unit receives a slice access request. For example, the processing module receives a slice access request from a requesting entity, where the slice access request includes at least one of a read slice request, a write slice request, a list slice request, and a delete slice request. The method continues at step 432 where the storage unit identifies a memory location corresponding to a slice name of the slice access requests based on an interpretation of the local DSN address range to memory location table of the storage unit. For example, the processing module accesses the local DSN address range to memory location table using a slice name of the slice access request to identify the memory location and accesses the memory location to process the slice access requests.

FIG. 44A is a schematic block diagram of another dispersed storage network (DSN) that includes a plurality of storage vaults, the network 24 of FIG. 1, and the distributed storage and task (DST) processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-*n*, vault 2 is implemented to include a second set of DST execution units 2-1 through 2-*n*, etc. through vault V that is implemented to include a "Vth" set of DST execution units V-1 through V-n. Each DST execution unit may be implemented utilizing the DST execution unit 36 of FIG. 1.

The DSN functions to pace ingestion of data to be stored in the plurality of storage vaults. In an example of operation of the pacing of the data to be stored in the plurality of storage vaults, the DST processing unit 16 receives a portion of a data stream 440 from a requesting entity. Having received the portion, for each storage vault, the DST processing unit 16 dispersed storage error encodes the portion of the data stream in accordance with dispersal parameters of the storage vault to produce a corresponding plurality of sets of encoded data slices 442. For example, the DST processing unit 16 obtains the dispersal parameters for the storage vault, and when the parameters are unique, dispersed storage error encodes the portion of the data stream to produce the plurality sets of encoded data slices 442, or, when the dispersal parameters are not unique, the DST processing unit 16 reuses another plurality of sets of encoded data slices 442 previously produced.

Having produced the encoded data slices 442, for each storage vault, the DST processing unit 16 facilitates storage of the corresponding plurality of sets of encoded data slices 442. For example, the DST processing unit 16 issues, via the network 24, one or more sets of write slice requests to the storage vault, where the one or more sets of write slice requests includes the corresponding plurality of sets of encoded data slices 442.

Having initiated the storage of the portion of the data stream, the DST processing unit 16 determines fastest and slowest storage vaults based on received slice information 444. For example, the DST processing unit 16 identifies a first storage vault confirming storage of the portion as the fastest storage vault and identifies a last storage vault confirming storage as the slowest storage vault. Having identified the fastest and slowest storage vaults, the DST processing unit 16 determines a fastest ingestion rate for the fastest storage vault and a slowest ingestion rate for the slowest storage vault. For example, the DST processing unit 16 divides a size of the portion by a storage time.

Having determined the fastest and slowest ingestion rates, the DST processing unit 16 determines a desired portion size based on the fastest ingestion rate and the slowest ingestion rate. For example, the DST processing unit 16 identifies a maximum allowable amount of a difference in data stored based on the fastest and slowest ingestion rates and a processing capacity level. Having determined the desired portion size, the DST processing unit 16 issues stream pacing information 446 to the requesting entity, where the stream pacing information includes one or more of the desired portion size of a next portion, a request to stop sending the data stream until a difference between an amount of data ingestion by the fastest storage vault an amount of data ingestion by the slowest storage vault is greater than a high threshold level, and a request to resume sending of the data stream when the difference is less than a low threshold level.

FIG. 44B is a flowchart illustrating an example of pacing ingestion of data into a plurality of storage vaults. The method includes step 454 where a processing module (e.g., of a distributed storage and task (DST) processing unit) receives a portion of a data stream from a requesting entity for storage in a plurality of storage vaults. For each storage vault, the method continues at step 456 where the processing module encodes the portion of the data stream in accordance with dispersal parameters of the storage vault to produce a corresponding plurality of sets of encoded data slices. For example, the processing module obtains the dispersal parameters for the storage vault and dispersed storage error encodes the portion of the data stream using the dispersal parameters to produce the plurality of sets of encoded data slices when substantially the same dispersal parameters have not already been utilized to produce encoded data slices for another storage vault.

For each storage vault, the method continues at step 458 where the processing module facilitates storage of the corresponding plurality of sets of encoded data slices in the storage vault. For example, the processing module issues write slice requests to the storage vault, where the requests includes the corresponding plurality of sets of encoded data slices, receives read slice responses, and timestamps the write slice responses when receiving responses to produce an ingestion rate for a corresponding storage vault.

The method continues at step 460 where the processing module determines an ingestion rate capability level for the plurality of storage vaults. For example, the processing module determines an ingestion rate for each storage vault based on the received write slice responses and generates the ingestion rate capability level based on a fastest ingestion rate and a slowest ingestion rate (e.g., such that required memory and processing resource utilization levels are within capability and capacity limitations).

The method continues at step 462 where the processing module issues stream pacing information to the requesting entity based on the ingestion rate capability level. For example, the processing module generates the stream pacing information to include one or more of the ingestion rate capability level for the plurality of storage vaults, a desired portion size, an estimated time of data transmission, a request to stop sending the data stream, and a request to resume sending of the data stream.

FIG. 45A is a schematic block diagram of another dispersed storage network (DSN) that includes a plurality of storage vaults, the network 24 of FIG. 1, and at least two distributed storage and task (DST) processing units 1-2. Each DST processing unit may be implemented utilizing the DST processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-*n*, vault 2 is implemented to include a second set of DST execution units 2-1 through 2-*n*, etc. through vault V that is implemented to include a "Vth" set of DST execution units V-1 through V-n. Each DST execution unit may be implemented utilizing the DST execution unit 36 of FIG. 1.

The DSN functions to synchronously store similar data in the plurality of storage vaults. In an example of operation of the synchronous storage of the similar data, the two or more DST processing units receive a data object for storage. For example, DST processing units 1-2 receives a data object A for storage in the plurality of storage vaults. Alternatively, the two or more DST processing units substantially simultaneously receive a unique data object, where each unique data object is associated with a common data identifier.

Having received the data object for storage, each DST processing unit, for each storage vault, dispersed storage error encodes the data object in accordance with dispersal parameters of the storage vault to produce a corresponding plurality of sets of encoded data slices. For example, DST processing units 1-2 each obtains the dispersal parameters for the storage vault, and when the dispersal parameters are unique, dispersed storage error encodes the data object A to produce the plurality of sets of encoded data slices. Alternatively, when the dispersal parameters are not unique, each DST processing unit reuses another plurality of sets of encoded data slices.

Having generated the encoded data slices, each DST processing unit generates a unique revision number to be associated with all of the plurality of sets of encoded data slices. The DST processing unit generates the unique revision number to include a time-based portion, an operation count portion, and a watermark portion. The time-based portion includes a real-time indicator that is ever increasing. For example, the DST processing unit interprets a system clock to produce the time-based portion. The operation count portion includes an ever increasing number for a series of related operations. For example, the DST processing unit 16 chooses a number of bits L for the operation count portion such that no more than $2^L$ operations can be generated for the same data object by a the same DST processing unit for a time resolution of the time-based portion. For instance, the DST processing unit is limited to 128 update operations on the same data object within one millisecond when the time resolution is one millisecond and the number of bits of the operation count portion is 7 (e.g., L=7). The watermark portion includes at least one of a random number, a pseudorandom number, and a result of applying the deterministic function to at least one of the data object, the data identifier, a vault identifier (ID), and a requesting entity ID.

Having generated the unique revision number, for each storage vault, each DST processing unit facilitates storage of the corresponding plurality of sets of encoded data slices utilizing the corresponding unique revision number. For example, DST processing unit 1 issues, via the network 24, a set of write slice requests to the DST execution units of the storage vault, where the set of write slice requests includes the corresponding plurality of sets of encoded data slices and the corresponding unique revision number.

Subsequent to the storage of the plurality of sets of encoded data slices, at least one of the DST processing units and a synchronizing agent facilitates a data synchronization process based on the unique revision numbers of the store data such that a plurality of sets of encoded data slices of the corresponding data object is stored in each storage vault for each unique revision number.

FIG. 45B is a flowchart illustrating an example of synchronously storing similar data. The method includes step 470 where a processing unit of two or more processing units receives a data object for storage in a plurality of storage vaults. For example, each processing unit receives a common data object. As another example, each processing unit receives a different data object that share a common data identifier. The receiving includes at least one of receiving the data object substantially simultaneously and a first processing unit generating the data object and a second processing unit receiving the data object.

For each storage vault, the method continues at step 472 where each processing unit encodes the data object in accordance with dispersal parameters of the storage vault to produce a corresponding plurality of sets of encoded data slices. For example, each processing unit obtains the dispersal parameters and dispersed storage error encodes the data object to produce the corresponding plurality of sets of encoded data slices The method continues at step 474 where each processing unit generates a unique revision number to associate with the data object. For example, each processing unit generates the unique revision number to include at least one ever increasing portion and at least one watermark portion. The ever-increasing portion includes one or more of an ever-increasing time portion and an ever increasing operation portion. The watermark portion includes at least one of a random number, a pseudorandom number, and a result of applying a deterministic function to at least a portion of one or more of the data object and the data object identifier.

For each storage vault, the method continues at step 476 where each processing unit facilitates storage of the corresponding plurality of sets of encoded data slices with the unique revision number. For example, each processing unit issues one or more sets of write slice requests to the storage vault, where the write slice requests include this corresponding plurality of sets of encoded data slices and the corresponding unique revision number.

The method continues at step 478 where at least one processing unit facilitates data synchronization between the plurality of storage vaults based on the unique revision numbers of stored data. For example, the processing unit maintains both or eliminates a revision. When maintaining, the processing unit maintains both revisions of a common data object in accordance with a predetermination when the ever-increasing portion is substantially the same. As another example, the processing unit selects a revision for elimination by at least one of a random selection, selecting a revision with a highest ever-increasing portion, and selecting a revision with a watermark portion corresponding to a priority revision.

FIG. 46A is a schematic block diagram of another dispersed storage network (DSN) that includes a plurality of S number of sites, the network 24 of FIG. 1, and one or more distributed storage and task (DST) processing units. For example, a DST processing unit 1 is utilized to store data 484 and a DST processing unit 2 is utilized to produce recovered data 486. Each DST processing unit may be implemented utilizing the DST processing unit 16 of FIG. 1. Each site includes one or more DST execution (EX) units of a set of DST execution units. For example, each site includes four DST execution units when four sites are implemented, an information dispersal algorithm (IDA) width n of a dispersed error coding function is 16, one primary encoded data slice is to be stored at each of the DST execution units, and an even distribution of DST execution units at each of the sites is utilized. For instance, DST execution units 1-4 are implemented at site 1, DST execution units 5-8 are implemented at site 2, DST execution units 9-12 are implemented at site 3, and DST execution units 13-16 are implemented at site 4. Each DST execution unit may be implemented utilizing the DST execution unit 36 of FIG. 1.

The DSN functions to access data for storage in the DST execution units of the plurality of sites. The accessing of the data includes storing the data and retrieving stored data from DST execution units at any one site to produce recovered data. In an example of operation of the storing of the data, the DST processing unit 1 receives the data 484 for storage in the n DST execution units at the S sites. The DST processing unit 1 obtains dispersal parameters that includes the IDA with and a decode threshold number, where the decode threshold number includes a minimum number of retrieved encoded data slices required to re-create a portion of the data. The obtaining includes at least one of interpreting system registry information, interpreting a query response, and receiving the dispersal parameters.

Having obtained the dispersal parameters, the DST processing unit 1 dispersed storage error encodes the data using the dispersal parameters to produce a plurality of sets of encoded data slices, where each set of encoded data slices includes the IDA width number n of the encoded data slices. Having produced the encoded data slices, the DST processing unit 1 determines a number E of extra encoded data slices to generate based on one or more of the dispersal parameters and the number of sites S, such that the data is recoverable by accessing encoded data slices that anyone of the S sites. As a specific example, the DST processing unit 1 determines the number E of extra encoded data slices in accordance with a formula: $E=k-(n/S)$. For instance, $E=10-(16/4)=6$, when the decode threshold is 10, the IDA width is 16, and the number of sites is 4, where the DST execution units are evenly distributed amongst the sites.

Having determined the number of extra encoded data slices, for each set of encoded data slices, the DST processing unit 1 dispersed storage error encodes the data to generate the E extra encoded data slices. As a specific example, the DST processing unit 1 extends an encoding matrix that was utilized to produce the plurality of sets of encoded data slices to produce an extended matrix (e.g., adding E rows to the encoding matrix) and matrix multiplies at least a portion of the extended matrix by the data to produce the extra encoded data slices. For instance, the DST processing unit 1 generates extra encoded data slices 17-22 when $E=6$.

Having generated the extra encoded data slices, the DST processing unit 1 facilitates storage of the plurality of sets of encoded data slices in the set of DST execution units. As a specific example, the DST processing unit 1 issues, via the network 24, one or more sets of write slice requests to the set of DST execution units, where the one or more sets of write slice requests includes the plurality of sets of encoded data slices and where each set of encoded data slices is substantially evenly distributed amongst the set of DST execution units (e.g., a unique encoded data slice is sent to each DST execution unit at each site).

Having facilitated the storage of the plurality of sets of encoded data slices, the DST processing unit 1 facilitates storage of the extra encoded data slices in at least one DST execution unit at each site. As a specific example, the DST processing unit 1 issues, via the network 24, another set of write slice requests to at least one DST execution unit at each site, where the other set of write slice requests includes the extra encoded data slices. For instance, the DST processing unit 1 facilitates storage of the extra encoded data slices in just one DST execution unit at site 1. As another instance, the DST processing unit 1 facilitates storage of the extra encoded data slices in each DST execution unit at site 1.

In an example of operation of the retrieving of the stored data from the DST execution units at any one site to produce the recovered data 486, the DST processing unit 2 obtains, via the network 24, from any one site, for each set of encoded data slices, the corresponding unique encoded data slices of a set of encoded data slices from each DST execution unit and from one or more of the DST execution units at the site, the extra encoded data slices to produce in total at least a decode threshold number of encoded data slices of the set of encoded data slices. For instance, the DST processing unit 2 issues read slice requests to the DST execution units 13-16 to obtain, for each set of encoded data slices, encoded data slices 13-16 and extra encoded data slices 17-22; and receives read slice responses that includes encoded data slices 13-22. Having received the decode threshold number of encoded data slices for each set of encoded data slices, the DST processing unit 2 dispersed storage error decodes each decode threshold number of encoded data slices to produce a recovered data segment and aggregates a plurality of recovered data segments to produce the recovered data 486.

FIG. 46B is a flowchart illustrating an example of accessing data. The method includes step 490 where a processing module of one or more processing modules (e.g., of a distributed storage and task (DST) processing unit of one or more DST processing units) receives data for storage in a set of storage units at S sites. The receiving may further include identifying the set of storage units and the sites based on interpreting system registry information The method continues at step 492 where the processing module dispersed storage error encodes the data using the dispersal parameters to produce a plurality of sets of n encoded data slices. For example, the processing module dispersed storage error encodes the data using an encoding matrix of the dispersal parameters to produce each plurality of sets of encoded data slices.

For each set of encoded data slices, the method continues at step 494 where the processing module determines a number E of extra encoded data slices to generate based on the dispersal parameters and the number of S sites. For example, the processing module calculates the number E of extra encoded data slices in accordance with a formula: $E=k-(n/S)$, where $k=a$ decode threshold number of the dispersal parameters, $n=an$ information dispersal algorithm (IDA) number n of the dispersal parameters, and $S=the$ number of sites.

For each set of encoded data slices, the method continues at step 496 where the processing module dispersed storage error encodes the data to generate the E extra encoded data slices. For example, the processing module encodes the data using at least a portion (e.g., E rows) of an extended portion of the encoding matrix to produce the extra encoded data slices. The method continues at step 498 where the processing module facilitates storage of the plurality of sets of n encoded data slices in the set of storage units. For example, the processing module sends the plurality of sets of encoded data slices to the storage units for storage, where one encoded data slice is sent to a corresponding one storage unit of the set of storage units when an even distribution approach is utilized.

For each set of encoded data slices, the method continues at step 500 where the processing module facilitates storage of the E extra encoded data slices in one or more storage units at each site. For example, the processing module selects one or more of available storage units as the one or more storage units (e.g., a random selection, a selection based on most favorable performance, a selection based on most favorable available storage capacity, a selection in accordance with a predetermination) and sends the extra encoded data slices to the one or more storage units at each site for storage.

When recovering the data from the set of storage units, the method continues at step 502 where the processing module selects one site for a recovery process. For example, the processing module selects based on one or more of a site performance level, a storage unit performance level, a system registry information, a request, and a favorable proximity to the site. The method continues at step 504 where the processing module obtains unique encoded data slices for each set of encoded data slices from each storage unit at the selected site. For example, the processing module issues read slice requests to each storage unit, receives read slice responses, and extracts encoded data slices as the unique encoded data slices.

The method continues at step 506 where the processing module obtains the E extra encoded data slices from the corresponding one or more storage units at the selected site. For example, the processing module identifies the one or more storage units (e.g., initiating a query, interpreting a query response, and receiving identifiers), issues read slice requests to the identified one or more storage units, receives one or more read slice responses, and extracts encoded data slices from the one or more read slice responses as the extra encoded data slices.

For each set of encoded data slices, the method continues at step 508 where the processing module combines the obtained unique encoded data slices and the obtained E extra encoded data slices to produce a decode threshold number of encoded data slices. For example, for each set, the processing module of appends the extra encoded data slices to the unique encoded data slices.

For each set of encoded data slices, the method continues at step 510 where the processing module dispersed storage error decodes the corresponding decode threshold number of encoded data slices to reproduce the data. For example, the processing module decodes each decode threshold number of encoded data slices to produce a recovered data segment and aggregates a plurality of recovered data segments to produce recovered data.

FIG. 47A is a schematic block diagram of another dispersed storage network (DSN) that includes a plurality of storage vaults, the network 24 of FIG. 1, and the distributed storage and task (DST) processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V-1 through V-n. Each DST execution unit may be implemented utilizing the DST execution unit 36 of FIG. 1.

The DSN functions to recover stored data to produce recovered data 516. In an example of operation of the recovering of the stored data, the DST processing unit 16, for each storage vault, determines a slice retrieval performance level. The determining includes at least one of performing a test (e.g., issuing a read slice requests, receiving a read slice response, interpreting timing of the response), receiving the retrieval performance level, interpreting an error message, and performing a lookup.

Having determined the slice retrieval performance level, the DST processing unit 16 selects two or more storage vaults for retrieval based on the slice retrieval performance levels. The selecting includes one or more of determining a number of the two or more storage vaults (e.g., based on a lookup, based on a requirement for a particular performance level) and identifying the two or more storage vaults associated with most favorable slice retrieval performance levels.

Having selected the two or more storage vaults, the DST processing unit 16 identifies a plurality of data segments associated with the store data for retrieval. The determining includes at least one of interpreting a dispersed hierarchical index entry associated with the stored data, performing a lookup, and receiving a number of data segments indicator.

For each data segment, the DST processing unit 16 assigns a storage vault for retrieval to produce assignment information. For example, the DST processing unit 16 maps the data segments to the selected two or more storage vaults in accordance with an assignment approach (e.g., even distribution, in accordance with the slice retrieval performance level of each storage vault).

Having assigned the storage vaults for retrieval, the DST processing unit 16 facilitates recovery of each data segment from the selected two or more storage vaults in accordance with the assignment information to produce recovered data. For example, for each data segment, the DST processing unit 16 issues, via the network 24, a set of read slice requests, receives, via the network 24, read slice responses, extracts encoded data slices from the responses, dispersed storage error decodes a decode threshold number of extracted encoded data slices to reproduce the data segment (e.g., utilizing dispersal parameters associated with the storage vault), and aggregates the reproduced data segments to produce the recovered data 516.

FIG. 47B is a flowchart illustrating an example of recovering stored data. The method includes step 520 where a processing module (e.g., of a distributed storage and task (DST) processing unit) determines to recover a data object from one or more storage vaults of a plurality of storage vaults where the data object has been synchronously stored amongst the plurality of storage vaults. For example, the processing module receives a retrieval request and identifies the plurality of storage vaults based on the retrieval request (e.g., by performing a lookup, by receiving the identities of the storage vaults).

For each storage vault, the method continues at step 522 where the processing module determines a slice retrieval performance level. The determining includes at least one of performing a lookup, initiating a test, and interpreting test results.

The method continues at step 524 where the processing module selects two or more storage vaults of the plurality of storage vaults for retrieval based on the slice retrieval performance levels. For example, the processing module determines a number based on a performance requirement and the slice retrieval performance levels, and identifies most favorably performing storage units.

The method continues at step 526 where the processing module identifies a plurality of data segments for retrieval where the data object was divided into the plurality of data objects. For example, the processing module accesses at least one of a DSN directory and a dispersed hierarchical index to determine the number of data segments.

For each data segment, the method continues at step 528 where the processing module assigns a storage vault for retrieval to produce assignment information. The sending me be based on one or more of a retrieval performance goal, a slice retrieval performance levels, and the number of storage vaults for the retrieval.

The method continues at step 530 where the processing module facilitates recovery of each data segment of the plurality of data segments from the selected two or more storage vaults. For example, the processing module sends read slice requests for data segments assigned to each of the selected two or more storage vaults, receives read slice responses, dispersed storage error decodes received encoded data slices to reproduce a plurality of data segments, and aggregates the reproduced plurality of data segments to produce recovered data.

FIG. 48A is a schematic block diagram of another dispersed storage network (DSN) that includes a plurality of storage vaults, the network 24 of FIG. 1, and the distributed storage and task (DST) processing unit 16 of FIG. 1. The DST processing unit 16 includes the memory 88 of FIG. 3. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V-1 through V-n. Each DST execution unit may be implemented utilizing the DST execution unit 36 of FIG. 1.

The DSN functions to process data access requests 536 in accordance with configuration information. The configuration information includes a plurality of configuration elements. For example, the configuration elements may include one or more of vault identifiers (IDs) 540, information dispersal algorithm (IDA) parameters 542, access controls 544, index information 546, usage levels 548, delete controls 550, versioning information 552, and synchronization information 554. The vault IDs 540 includes identifiers of each of the plurality of storage vaults and identifiers of DST execution units associated with the storage vaults. The IDA parameters 542 includes, for each storage vault, IDA parameters including one or more of an IDA width, decode threshold number, and an encoding matrix. The access controls 544 includes positive or negative access controls for individuals and/or groups of individuals and/or vaults for the plurality of storage vaults for individual access types including reading, writing, deleting, and listing. The index information 546 includes an address of a dispersed hierarchical index associated with the vaults. The usage levels 548 includes one or more of a maximum allowable amount of storage per storage vault and a maximum allowable amount storage per user. The delete controls 550 includes identifiers of requesting entities allowed to delete data objects from one or more of the storage vaults. The versioning information 552 includes an indicator to indicate whether versioning is activated where multiple versions are maintained or when versioning is deactivated when only one version is maintained. The synchronization information 554 includes parameters for frequency of synchronization checks and a maximum allowable duration for a synchronization cycle.

In an example of operation of the processing of the data access request 536, the DST processing unit 16 receives the data access request 536 from a requesting entity with regards to a data object. The data access request 536 includes at least one of a read request, a write request, a delete request, a list request, a data identifier (ID) and an identifier of the requesting entity. Having received the data access request 536, the DST processing unit 16 identifies a vault set based on the data access request, where the vault set includes one or more storage vaults affiliated with a common configuration information. The identifying includes at least one of accessing a DSN directory and accessing a dispersed hierarchical index to extract an identifier of the vault set based on the identifier of the requesting entity and the data ID.

Having identified the vault set, the DST processing unit 16 recovers the configuration information associated with the vault set. As a specific example, the DST processing unit 16 retrieves the configuration information from the memory 88. As another specific example, the DST processing unit 16 recovers the configuration information from at least one storage vault (e.g., retrieving encoded data slices, decoding retrieved encoded data slices to reproduce the configuration information). Having recovered the configuration information, the DST processing unit 16 determines whether to process the data access request based on the recovered configuration information. The determining may include verifying authorization for data access, determining whether a usage level has been violated (e.g., too much data has been stored), and determining whether deletion of data is authorized when receiving a delete request.

When processing the data access request 536, the DST processing unit 16 processes the data access request 536 in accordance with the configuration information. For example, the DST processing unit 16 accesses one or more storage vaults in accordance with the vault identifiers and IDA parameters of the configuration information associated with the vault ID. As another example, the DST processing unit 16 accesses a list of vaults, receives access responses from one or more storage vaults, and issues a data access response 538 based on received data access responses.

FIG. 48B is a flowchart illustrating an example of processing data access requests. The method includes step 560 where a processing module (e.g., of a distributed storage and task (DST) processing unit) receives a data access requests with regards to a data object. The receiving includes one or more of identifying a requesting entity, identifying a data access request type, and identifying the data object.

The method continues at step 562 where the processing module identifies a vault set based on the data access request. A plurality of storage vaults includes the vault set. The identifying includes utilizing one or more of a requesting entity identifier, a data access type, a data identifier, to access at least one of a DSN directory, a system registry information, and a dispersed hierarchical index to extract an identifier of the vault set.

The method continues at step 564 where the processing module obtains configuration information associated with the vault set. As a specific example, the processing module retrieves the configuration information from a local memory based on the identifier of the vault set. As another example, the processing module recovers the configuration information from at least one storage vault of the plurality of storage vaults.

The method continues at step 566 where the processing module determines whether to process the data access request based on the obtained configuration information associated with the vault set. For example, the processing module performs an authentication of the data access request utilizing the configuration information to produce an authorization request.

When processing the data access request, the method continues at step 568 where the processing module processes the data access request in accordance with the obtained configuration information associated with the vault set. For example, the processing module accesses one or more of the storage vaults in accordance with the data access request and the obtained configuration information, receives one or more access responses, and issues a data access response to a requesting entity in response to the data access request in accordance with the obtained configuration information.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. In a dispersed storage network (DSN) that includes a plurality of storage units, wherein the plurality of storage units support a plurality of virtual storage vaults, wherein a first virtual storage vault of the plurality of virtual storage vaults is supported by a first set of storage units of the plurality of storage units, and wherein the first set of storage units is a sub-set of the plurality of storage units, a method comprises:
receiving, by at least some of the plurality of storage units, a request to transfer a copy of a set of encoded data slices from two or more source virtual storage vaults of the plurality of virtual storage vaults to a destination virtual storage vault of the plurality of virtual storage vaults, wherein a data segment of data is dispersed storage error encoded to produce the set of encoded data slices;
obtaining, by each storage unit of the at least some of the plurality of storage units, a slice transfer map that, for the set of encoded data slices, identifies the two or more source virtual storage vaults;
determining, by each storage unit of the at least some of the plurality of storage units, whether the each storage unit supports one of the two or more source virtual storage vaults;
for each supporting storage unit that supports one of the two or more source virtual storage vaults, determining, by the each supporting storage unit and based on the slice transfer map, a sub-set of encoded data slices of the set of encoded data slices that is stored within the one of the two or more source virtual storage vaults by the each supporting storage unit; and
sending, by the each supporting storage unit, the sub-set of encoded data slices to a corresponding storage unit of the plurality of storage units that is supporting the destination virtual storage vault.

2. The method of claim 1 further comprises:
receiving the request to transfer in response to a determination that the destination virtual storage vault failed a write request regarding the copy of the set of encoded data slices, wherein the write request is an instruction to write the copy of the set of encoded data slices to each of the two or more source virtual storage vaults and to the destination virtual storage vault.

3. The method of claim 1 further comprises:
receiving the request to transfer as part of a write request to write the copy of the set of encoded data slices to each of the two or more source virtual storage vaults and to the destination virtual storage vault, wherein a first portion of the write request writes the respective sub-sets of encoded data slices to the storage units supporting the two or more source virtual storage vaults and a second portion to transfer the copy of the sets of encoded data slices to the storage units supporting the destination virtual storage vault.

4. The method of claim 1, wherein the obtaining the slice transfer map comprises one or more of:
receiving the slice transfer map;
retrieving the slice transfer map from memory; and
generating the slice transfer map based on the request to transfer.

5. The method of claim 1 further comprises:
changing, by each of the corresponding storage units of the plurality of storage units that is supporting the destination virtual storage vault, DSN addresses of the set of encoded data slices of the copy of the set of encoded data slices to reflect that the copy is stored in the destination virtual storage vault.

6. The method of claim 5 further comprises:
updating a slice storage table to include the DSN addresses of the set of encoded data slices stored in the destination virtual storage vault.

7. The method of claim 1, wherein the at least some of the plurality of storage units comprises:
the storage units associated with the two or more source virtual storage vaults; and
the storage units associated with the destination virtual storage vault.

8. The method of claim 1, wherein the sending the sub-set of encoded data slices comprises:
sending, by a first supporting storage unit, a first encoded data slice to a first corresponding storage unit of the plurality of storage units that is supporting the destination virtual storage vault;
sending, by a second supporting storage unit, a second encoded data slice to a second corresponding storage unit of the plurality of storage units that is supporting the destination virtual storage vault;
sending, by a third supporting storage unit, a third encoded data slice to a third corresponding storage unit of the plurality of storage units that is supporting the destination virtual storage vault; and
sending, by a fourth supporting storage unit, a fourth encoded data slice to a fourth corresponding storage unit of the plurality of storage units that is supporting the destination virtual storage vault.

9. The method of claim 1, wherein the sending the sub-set of encoded data slices comprises:
sending, by a first supporting storage unit, a first and a second encoded data slice to a first corresponding storage unit of the plurality of storage units that is supporting the destination virtual storage vault; and
sending, by a second supporting storage unit, a third encoded data slice to a second corresponding storage unit of the plurality of storage units that is supporting the destination virtual storage vault.

10. A non-transitory computer readable storage medium of a dispersed storage network (DSN) that includes a plurality of storage units, wherein the plurality of storage units support a plurality of virtual storage vaults, wherein a first virtual storage vault of the plurality of virtual storage vaults is supported by a first set of storage units of the plurality of storage units, and wherein the first set of storage units is a sub-set of the plurality of storage units, the non-transitory computer readable storage medium comprises:
  at least one memory section that stores operational instructions that, when executed by one or more processing modules of one or more computing devices of the DSN, causes the one or more computing devices to:
    receive, by at least some of the plurality of storage units, a request to transfer a copy of a set of encoded data slices from two or more source virtual storage vaults of the plurality of virtual storage vaults to a destination virtual storage vault of the plurality of virtual storage vaults, wherein a data segment of data is dispersed storage error encoded to produce the set of encoded data slices;
    obtain, by each storage unit of the at least some of the plurality of storage units, a slice transfer map that, for the set of encoded data slices, identifies the two or more source virtual storage vaults;
    determine, by each storage unit of the at least some of the plurality of storage units, whether the each storage unit supports one of the two or more source virtual storage vaults;
    for each supporting storage unit that supports one of the two or more source virtual storage vaults, determine, by the each supporting storage unit and based on the slice transfer map, a sub-set of encoded data slices of the set of encoded data slices that is stored within the one of the two or more source virtual storage vaults by the each supporting storage unit; and
    send, by the each supporting storage unit, the sub-set of encoded data slices to a corresponding storage unit of the plurality of storage units that is supporting the destination virtual storage vault.

11. The non-transitory computer readable storage medium of claim 10 further comprises:
  the at least one memory section stores further operational instructions that, when executed by the one or more processing modules, causes the one or more computing devices of the DSN to:
  receive the request to transfer in response to a determination that the destination virtual storage vault failed a write request regarding the copy of the set of encoded data slices, wherein the write request is an instruction to write the copy of the set of encoded data slices to each of the two or more source virtual storage vaults and to the destination virtual storage vault.

12. The non-transitory computer readable storage medium of claim 10 further comprises:
  the at least one memory section stores further operational instructions that, when executed by the one or more processing modules, causes the one or more computing devices of the DSN to:
  receive the request to transfer as part of a write request to write the copy of the set of encoded data slices to each of the two or more source virtual storage vaults and to the destination virtual storage vault, wherein a first portion of the write request writes the respective sub-sets of encoded data slices to the storage units supporting the two or more source virtual storage vaults and a second portion to transfer the copy of the sets of encoded data slices to the storage units supporting the destination virtual storage vault.

13. The non-transitory computer readable storage medium of claim 10, wherein the one or more processing modules functions to execute the operational instructions stored by the at least one memory section to cause the one or more computing devices of the DSN to obtain the slice transfer map comprises by one or more of:
  receiving the slice transfer map;
  retrieving the slice transfer map from memory; and
  generating the slice transfer map based on the request to transfer.

14. The non-transitory computer readable storage medium of claim 10 further comprises:
  the at least one memory section stores further operational instructions that, when executed by the one or more processing modules, causes the one or more computing devices of the DSN to:
  change, by each of the corresponding storage units of the plurality of storage units that is supporting the destination virtual storage vault, DSN addresses of the set of encoded data slices of the copy of the set of encoded data slices to reflect that the copy is stored in the destination virtual storage vault.

15. The non-transitory computer readable storage medium of claim 14 further comprises:
  the at least one memory section stores further operational instructions that, when executed by the one or more processing modules, causes the one or more computing devices of the DSN to:
  update a slice storage table to include the DSN addresses of the set of encoded data slices stored in the destination virtual storage vault.

16. The non-transitory computer readable storage medium of claim 10, wherein the at least some of the plurality of storage units comprises:
  the storage units associated with the two or more source virtual storage vaults; and
  the storage units associated with the destination virtual storage vault.

17. The non-transitory computer readable storage medium of claim 10, wherein the one or more processing modules functions to execute the operational instructions stored by the at least one memory section to cause the one or more computing devices of the DSN to send the sub-set of encoded data slices by:
  sending, by a first supporting storage unit, a first encoded data slice to a first corresponding storage unit of the plurality of storage units that is supporting the destination virtual storage vault;
  sending, by a second supporting storage unit, a second encoded data slice to a second corresponding storage unit of the plurality of storage units that is supporting the destination virtual storage vault;
  sending, by a third supporting storage unit, a third encoded data slice to a third corresponding storage unit of the plurality of storage units that is supporting the destination virtual storage vault; and
  sending, by a fourth supporting storage unit, a fourth encoded data slice to a fourth corresponding storage unit of the plurality of storage units that is supporting the destination virtual storage vault.

18. The non-transitory computer readable storage medium of claim 10, wherein the one or more processing modules functions to execute the operational instructions stored by the at least one memory section to cause the one or more computing devices of the DSN to send the sub-set of encoded data slices by:
  sending, by a first supporting storage unit, a first and a second encoded data slice to a first corresponding storage unit of the plurality of storage units that is supporting the destination virtual storage vault; and sending, by a second supporting storage unit, a third encoded data slice to a second corresponding storage unit of the plurality of storage units that is supporting the destination virtual storage vault.

\* \* \* \* \*